US010587706B2

(12) United States Patent
Abello et al.

(10) Patent No.: US 10,587,706 B2
(45) Date of Patent: Mar. 10, 2020

(54) METHODS AND APPARATUS TO CORRELATE A DEMOGRAPHIC SEGMENT WITH A FIXED DEVICE

(71) Applicant: The Nielsen Company (US), LLC, Schaumburg, IL (US)

(72) Inventors: Jean-Pierre Abello, Clearwater Beach, FL (US); Arun Ramaswamy, Tampa, FL (US); Jan Besehanic, Tampa, FL (US)

(73) Assignee: The Nielsen Company (US), New York, NY (US)

( * ) Notice: Subject to any disclaimer, the term of this patent is extended or adjusted under 35 U.S.C. 154(b) by 266 days.

(21) Appl. No.: 14/577,870

(22) Filed: Dec. 19, 2014

(65) Prior Publication Data
US 2016/0112522 A1    Apr. 21, 2016

Related U.S. Application Data

(60) Provisional application No. 62/066,106, filed on Oct. 20, 2014.

(51) Int. Cl.
*G06F 15/177* (2006.01)
*H04L 29/08* (2006.01)

(52) U.S. Cl.
CPC .............. *H04L 67/22* (2013.01); *H04L 67/02* (2013.01); *H04L 67/18* (2013.01)

(58) Field of Classification Search
CPC ......... H04L 67/22; H04L 67/18; H04L 67/24; H04L 67/306; H04L 67/02; G06Q 30/205;

(Continued)

(56) References Cited

U.S. PATENT DOCUMENTS

| 7,962,957 B2 * | 6/2011 | Keohane | H04L 63/1458 |
| | | | 726/13 |
| 2008/0300965 A1 * | 12/2008 | Doe | G06Q 30/0204 |
| | | | 705/7.33 |

(Continued)

FOREIGN PATENT DOCUMENTS

KR    20090020558    2/2009

OTHER PUBLICATIONS

International Bureau, "International Search Report" issued in connection with International Application No. PCT/US2015/056257, dated Jan. 29, 2016 (4 pages).

(Continued)

*Primary Examiner* — Tan Doan
(74) *Attorney, Agent, or Firm* — Hanley, Flight & Zimmerman, LLC

(57) ABSTRACT

Methods, apparatus, systems, and articles of manufacture to correlate a demographic segment with a fixed device are disclosed. An example method includes accessing a record indicating a public Internet Protocol (IP) address used by a fixed device. A monitoring data record received from a mobile device is accessed. A demographic segment of a user of the mobile device is determined. The mobile device is associated with the fixed device when an IP address of the mobile device from the monitoring data record matches the public IP address used by the fixed device. The demographic segment of the user of the mobile device is associated with the fixed device based on the association of the fixed device and the mobile device.

22 Claims, 38 Drawing Sheets

(58) Field of Classification Search
CPC ........... G06Q 30/0204; G06Q 30/0255; G06Q 30/0251; G06Q 30/0269; H04W 4/02
USPC ........................................................ 709/224
See application file for complete search history.

(56) References Cited

U.S. PATENT DOCUMENTS

| | | | | |
|---|---|---|---|---|
| 2010/0151816 A1* | 6/2010 | Besehanic | ............... | G06Q 30/02 455/405 |
| 2011/0252441 A1 | 10/2011 | Shkedi | | |
| 2011/0286374 A1* | 11/2011 | Shin | ........................ | H02J 7/025 370/311 |
| 2012/0096489 A1* | 4/2012 | Shkedi | ............... | H04N 21/4532 725/34 |
| 2013/0093592 A1* | 4/2013 | Lan | ...................... | A01G 25/167 340/602 |
| 2013/0159499 A1* | 6/2013 | Besehanic | ........... | H04L 61/1511 709/224 |
| 2013/0173034 A1* | 7/2013 | Reimann | ........... | G06F 17/30761 700/94 |
| 2013/0262184 A1 | 10/2013 | Jain et al. | | |
| 2014/0095337 A1* | 4/2014 | Pigeon | ............... | G06Q 30/0252 705/26.4 |
| 2014/0189108 A1 | 7/2014 | Frett et al. | | |
| 2014/0213283 A1 | 7/2014 | Gillett | | |
| 2015/0006255 A1* | 1/2015 | Schewel | ............ | G06Q 30/0205 705/7.34 |
| 2015/0106198 A1* | 4/2015 | Miller | ................ | G06Q 30/0255 705/14.52 |
| 2019/0182621 A1* | 6/2019 | Provost | ................. | H04W 4/025 |

OTHER PUBLICATIONS

International Bureau, "Written Opinion" issued in connection with International Application No. PCT/US2015/056257, dated Jan. 29, 2016 (8 pages).

International Bureau, "International Preliminary Report on Patentability" issued in connection with International Application No. PCT/US2015/056257, dated May 4, 2017 (10 pages).

* cited by examiner

| | FIXED DEVICE IDENTIFIER (1110) | IP ADDRESS (1120) | TIMESTAMP (1130) |
|---|---|---|---|
| 1140 | FD001 | 38.98.186.130 | 10/15/2014 12:14AM |
| 1150 | FD002 | 43.56.84.51 | 10/15/2014 3:45PM |
| 1160 | FD003 | 138.108.20.122 | 10/15/2014 8:12AM |
| 1161 | FD003 | 138.108.20.124 | 10/17/2014 4:15AM |

| | MOBILE DEVICE IDENTIFIER (1410) | MOBILE DEVICE INFORMATION (1420) | IP ADDRESS (1430) | IDENTIFIED MEDIA (1440) | TIMESTAMP (1450) |
|---|---|---|---|---|---|
| | ... | ... | ... | ... | ... |
| 1460 | MD001 | SAMSUNG GALAXY S4 | 38.98.186.130 | ENGADGET.COM | 10/15/2014 3:14PM |
| 1460 | MD001 | SAMSUNG GALAXY S4 | 38.98.186.130 | CNN.COM | 10/16/2014 10:53PM |
| 1460 | MD001 | SAMSUNG GALAXY S4 | 12.53.64.54 | ENGADGET.COM | 10/18/2014 9:23AM |
| 1460 | MD001 | SAMSUNG GALAXY S4 | 12.53.64.54 | CNN.COM | 10/18/2014 5:50 PM |
| | ... | ... | ... | ... | ... |
| 1470 | MD002 | APPLE IPHONE 5S | 38.98.186.130 | FACEBOOK.COM | 10/16/2014 3:14PM |
| 1470 | MD002 | APPLE IPHONE 5S | 38.98.186.130 | THEONION.COM | 10/16/2014 3:16PM |
| 1470 | MD002 | APPLE IPHONE 5S | 18.59.84.54 | CNN.COM | 10/18/2014 5:45 PM |
| | ... | ... | ... | ... | ... |
| 1480 | MD003 | APPLE IPAD | 201.2.46.51 | MONOPRICE.COM | 10/16/2014 3:14PM |
| 1480 | MD003 | APPLE IPAD | 201.2.46.51 | APPLE.COM | 10/16/2014 3:15PM |
| 1480 | MD003 | APPLE IPAD | 201.2.46.51 | CNN.COM | 10/16/2014 3:16PM |
| | ... | ... | ... | ... | ... |

FIG. 14

| DEMOGRAPHIC SEGMENT | MEDIA PATTERN | COMPUTED LIKELIHOOD SCORE |
|---|---|---|
| CAUCASIAN MALE, AGE 25-35 | ENGADGET.COM CNN.COM GOOGLE.COM | 100% |
| CAUCASIAN MALE, AGE 25-35 | TWITTER.COM FACEBOOK.COM GOOGLE.COM CNN.COM | 50% |
| CAUCASIAN FEMALE, AGE 25-35 | TWITTER.COM FACEBOOK.COM GOOGLE.COM INSTAGRAM.COM | 0% |

FIG. 16A

| MOBILE DEVICE IDENTIFIER | ESTIMATED DEMOGRAPHIC SEGMENT |
|---|---|
| MD001 | CAUCASIAN MALE, AGE 25-35 |
| MD002 | CAUCASIAN FEMALE, AGE 25-35 |
| MD003 | CAUCASIAN MALE, AGE 18-24 |
| ... | ... |

FIG. 16B

| FIXED DEVICE IDENTIFIER | MOBILE DEVICE IDENTIFIER | ESTIMATED DEMOGRAPHIC SEGMENT |
|---|---|---|
| FD001 | MD001 | CAUCASIAN MALE, AGE 25-35 |
| FD001 | MD002 | CAUCASIAN FEMALE, AGE 25-35 |
| FD002 | MD003 | CAUCASIAN MALE, AGE 18-24 |
| ... | ... | ... |

FIG. 18

| | 2505 | 2510 | 2515 |
|---|---|---|---|
| 2500 | FIXED DEVICE IDENTIFIER | TIMESTAMP | DETECTED HARDWARE ADDRESS |
| 2520 | FD001 | 10/18/2014 5:53 PM | DE:21:25:11:11:11 |
| 2525 | FD001 | 10/20/2014 10:15AM | 64:B9:E8:22:22:22 |
| | ... | ... | ... |

FIG. 25A

| | 2545 | 2550 |
|---|---|---|
| 2540 | HARDWARE ADDRESSES | MOBILE DEVICE TYPE |
| | ... | ... |
| 2555 | DE:21:25:00:00:00 – DE:21:33:FF:FF:FF | SAMSUNG GALAXY S4 |
| 2560 | 64:B9:E8:00:00:00 – 64:B9:E8:FF:FF:FF | APPLE IPHONE 5S |
| 2565 | 64:B9:E9:00:00:00 – 64:B9:E9:FF:FF:FF | APPLE IPAD |
| | ... | ... |

FIG. 25B

| | 2585 | 2590 | 2595 |
|---|---|---|---|
| 2580 | FIXED DEVICE IDENTIFIER | TIMESTAMP | DETECTED MOBILE DEVICE |
| 2597 | FD001 | 10/18/2014 5:53 PM | MD001 |
| 2598 | FD001 | 10/20/2014 10:15AM | MD002 |
| | ... | ... | ... |

FIG. 25C

| TIMESTAMP | FIXED DEVICE | AUDIO FROM FIXED DEVICE | MOBILE DEVICE | AUDIO FROM MOBILE DEVICE | PRESENCE DETECTED? |
|---|---|---|---|---|---|
| 10/18/2014 5:53 PM | FD001 | ~waveform~ | MD001 | ~waveform~ | YES |
| 10/18/2014 5:53 PM | FD001 | ~waveform~ | MD002 | | UNKNOWN |
| 10/20/2014 10:15AM | FD001 | ~waveform~ | MD001 | ~waveform~ | NO |
| 10/20/2014 10:15AM | FD001 | ~waveform~ | MD002 | ~waveform~ | YES |

FIG. 29

| FIXED DEVICE IDENTIFIER | IDENTIFIED MEDIA | TIMESTAMP |
|---|---|---|
| FD001 | GAME OF THRONES S04 E02 | 10/18/2014 5:53 PM |
| FD002 | FAMILY GUY S13E01 | 10/19/2014 6:42PM |
| FD001 | @MIDNIGHT S02E01 | 10/20/2014 10:15AM |

| | MEDIA | DEMOGRAPHIC SEGMENT | BASELINE PROBABILITY |
|---|---|---|---|
| 3340 { | GAME OF THRONES S04 E02 | CAUCASIAN MALE, AGE 25-35 | 70% |
| | GAME OF THRONES S04 E02 | CAUCASIAN FEMALE, AGE 25-35 | 60% |
| | GAME OF THRONES S04 E02 | CAUCASIAN MALE, AGE 18-24 | 30% |
| 3350 { | FAMILY GUY S13E01 | CAUCASIAN MALE, AGE 25-35 | 60% |
| | FAMILY GUY S13E01 | CAUCASIAN FEMALE, AGE 25-35 | 60% |
| | FAMILY GUY S13E01 | CAUCASIAN MALE, AGE 18-24 | 80% |
| 3360 { | @MIDNIGHT S02E01 | CAUCASIAN MALE, AGE 25-35 | 80% |
| | @MIDNIGHT S02E01 | CAUCASIAN FEMALE, AGE 25-35 | 40% |
| | @MIDNIGHT S02E01 | CAUCASIAN MALE, AGE 18-24 | 80% |
| | ... | ... | ... |

Columns: 3310, 3320, 3330

FIG. 33

| 3410 | 3420 | 3430 | 3440 | 3450 | 3460 | 3470 |
|---|---|---|---|---|---|---|
| FIXED DEVICE IDENTIFIER | IDENTIFIED MEDIA | TIMESTAMP | DEMOGRAPHIC SEGMENT | BASELINE PROBABILITY | MODIFIED PROBABILITY | MODIFICATION REASON |
| FD001 | GAME OF THRONES S04 E02 | 10/18/2014 5:53 PM | CAUCASIAN MALE, AGE 25-35 | 70% | 90% | MOBILE DEVICE PRESENCE DETECTED |
| FD001 | GAME OF THRONES S04 E02 | 10/18/2014 5:53 PM | CAUCASIAN FEMALE, AGE 25-35 | 60% | 50% | MOBILE DEVICE LOCATION UNKNOWN |
| FD001 | @MIDNIGHT S02E01 | 10/20/2014 10:15AM | CAUCASIAN MALE, AGE 25-35 | 80% | 20% | MOBILE DEVICE KNOWN TO BE AWAY |
| FD001 | @MIDNIGHT S02E01 | 10/20/2014 10:15AM | CAUCASIAN FEMALE, AGE 25-35 | 40% | 80% | MOBILE DEVICE PRESENCE DETECTED |
| ... | ... | ... | ... | ... | ... | ... |

FIG. 34

METHODS AND APPARATUS TO CORRELATE A DEMOGRAPHIC SEGMENT WITH A FIXED DEVICE

RELATED APPLICATIONS

This patent claims priority to U.S. Provisional Patent Application Ser. No. 62/066,106, which was filed on Oct. 20, 2014 and is hereby incorporated herein by reference in its entirety.

FIELD OF THE DISCLOSURE

This disclosure relates generally to media monitoring, and, more particularly, to methods and apparatus to correlate a demographic segment with a fixed device.

BACKGROUND

Media providers desire to present media (e.g., content and/or advertisements) to users (e.g., audience members) that are likely to favorably respond. For example, an advertiser seeks to present targeted advertisements to users to encourage the users to purchase an advertised product. Typically, media providers are not well informed about when a particular user is physically present at a media presentation location, resulting in presentation of media that might not have any impact on the user.

BRIEF DESCRIPTION OF THE DRAWINGS

FIG. 11 is an example data table that may be stored by the example central facility of FIGS. 1 and/or 7 based on the received IP address(es) from the fixed device of FIGS. 1, 2, 3, and/or 4.

FIG. 14 is an example data table that may be stored by the example central facility of FIGS. 1 and/or 7 based on monitoring data received from the example mobile device of FIGS. 1, 5, and/or 6.

FIG. 16A is an example data table that may be stored by the example central facility of FIGS. 1 and/or 7, representing media patterns associated with various potential demographic segments.

FIG. 16B is an example data table that may be stored by the example central facility of FIGS. 1 and/or 7, associating a demographic segment with the mobile device of FIGS. 1, 5, and/or 6.

FIG. 18 is an example data table that may be stored by the example central facility of FIGS. 1 and/or 7 to associate the mobile device of FIGS. 1, 5, and/or 6 with the fixed device of FIGS. 1, 2, 3, and/or 4.

FIGS. 25A, 25B, and 25C are example data tables that may be stored by the example central facility of FIGS. 1 and/or 7 to facilitate computation of the one or more probabilities that the demographic segment is physically present at the fixed device.

FIG. 29 is an example data table 2900 representing captured audio comparisons performed by the example central facility 170 of FIGS. 1 and/or 7.

FIG. 31 is an example data table 3100 representing media identifications of media presented at the fixed device 130.

FIG. 33 is an example data table representing baseline probabilities of media exposure for different demographic segments and different media.

FIG. 34 is an example data table representing modified probabilities of media exposure based on whether a mobile device associated with a demographic segment was present during a media presentation.

Wherever possible, the same reference numbers will be used throughout the drawing(s) and accompanying written description to refer to the same or like parts.

DETAILED DESCRIPTION

Figure 1:
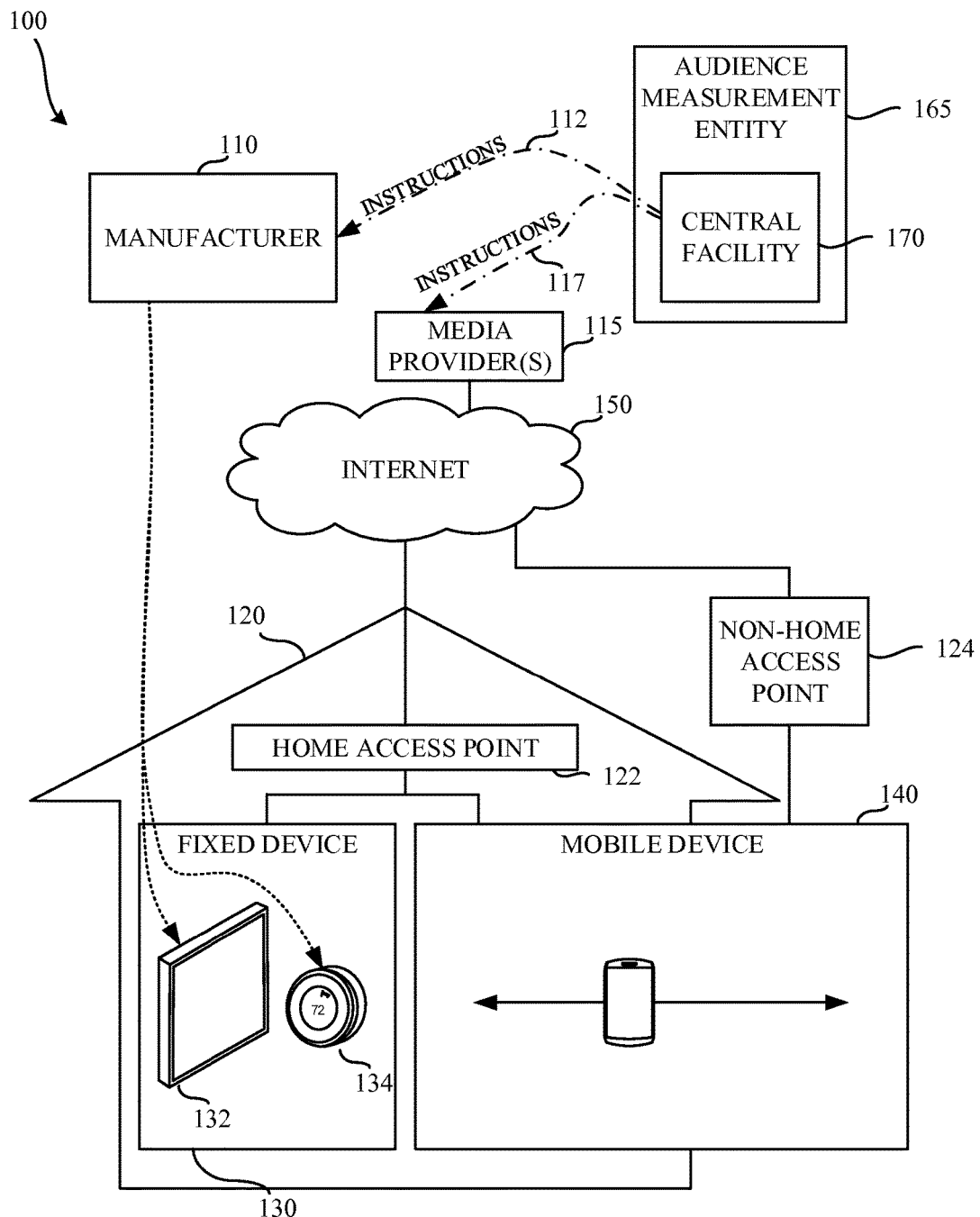
FIG. 1 is a diagram of an example system for correlating mobile device usage with a fixed device.

As used herein, a fixed device is defined to be any device that is intended to remain stationary at a media presentation location (e.g., a household) for an extended period of time (e.g., one month, one year, etc.). Fixed devices are not typically removed from the media presentation location. Example fixed devices include, for example, a television, a thermostat, a video game console (e.g., Xbox®, PlayStation®), a set top box, a digital media player (e.g., a Roku® media player, a Slingbox®, etc.), etc. Any other devices that remain at the media presentation location for extended periods of time (e.g., a desktop computer, an Internet enabled refrigerator, an Internet enabled utility meter, an Internet of Things (IoT) device, etc.) may be considered a fixed device. In some examples, the fixed device is a fixed media presentation device that presents media. Example methods, apparatus, and articles of manufacture disclosed herein correlate mobile device usage with a fixed device.

As disclosed herein, fixed devices transmit fixed device monitoring information including an Internet Protocol (IP) address of the fixed device to an Audience Measurement Entity (AME). In some examples, the fixed device monitoring information includes media monitoring information that indicates, for example, an identifier of media that was presented at the fixed device and/or within a presentation proximity of the fixed device. As used herein, a presentation proximity is defined to mean a distance where media presented by a fixed device is identifiable to (e.g., presented to) a user or mobile device.

In examples disclosed herein, the example fixed device reports the fixed device monitoring information to the AME via a manufacturer of the fixed device. Some device manufacturers implement functionality in the fixed device that reports device information such as, for example, a power state of the device (e.g., a television may report when the device was powered on or off), a status of an input of the device (e.g., an Internet enabled thermostat may report a current temperature of a temperature sensor), and/or any other information. Such information may be useful to a manufacturer because the information may indicate, for example, how many of their products are in operation, how their products are used, etc. In some examples disclosed herein, the fixed device monitoring information is transmitted directly to the AME by the fixed device. However, any other approach to acquiring the fixed device monitoring information may additionally or alternatively be used. For example, the manufacturer may relay the fixed device monitoring information to the AME.

As used herein, a mobile device is defined to be any device that is not intended to remain stationary at a media presentation location for an extended period of time. Example mobile devices include, for example, a smartphone, a tablet (e.g., an iPad®), a laptop computer, etc. Mobile devices are typically carried by a user during the day. As such, mobile devices are typically associated with a single user (and/or a limited set of users). During use of the mobile device, monitoring instructions that are provided with and/or in association with media presented by the mobile device (e.g., instructions provided as part of a webpage) are executed to transmit media monitoring data to an audience measurement entity (AME). As disclosed herein, media monitoring data is collected from mobile devices using, for example, techniques in accordance with the teachings of Blumenau, U.S. Pat. No. 6,108,637, which is incorporated by reference herein. Moreover, in some examples, media monitoring data is collected from media devices in association with presentation of streaming media using techniques disclosed in U.S. patent application Ser. Nos. 13/341,646, 13/341,661, 13/443,596, 13/793,991, 13/445,961, 13/793,974, 13/472,170, 13/767,548, 13/793,959, 13/778,108, 14/502,434, and 14/502,452, which are incorporated by reference in their entirety. As used herein, the term "media" includes any type of content and/or advertisement (e.g., audio and/or video (still or moving) content and/or advertisement) delivered via any type of distribution medium. Thus, media includes television programming, television advertisements, radio programming, radio advertisements, movies, web sites, streaming media, television commercials, radio commercials, Internet ads, etc.

When mobile devices are monitored, a demographic segment of the user of the mobile device can be estimated based on the media monitoring data collected from the mobile device. In examples disclosed herein, the demographic segment is estimated using known demographic data and known media monitoring data from panelist(s) (e.g., users who consent to being monitored and provide demographic information) of the AME. For example, if a user having an unknown demographic segment exhibits media habit(s) that match media habit(s) of a panelist (i.e., a known user), the demographic segment of the unknown user can be estimated based on the demographic segment of the panelist. Example approach(es) for estimating a demographic segment are disclosed in U.S. patent application Ser. No. 12/100,953, which is incorporated by reference herein in its entirety. In some examples, other factors may additionally be used for estimating the demographic segment of the unknown user such as, for example, a type of mobile device used by the user, a geographic region of the user, etc. The estimated demographic segment can be associated with a fixed device which, when combined with media monitoring data received from the mobile device, can be used to estimate whether a user of a particular demographic segment is physically present at the fixed device.

In examples disclosed herein, multiple approaches to associating a mobile device with a fixed device may be used. For example, when a mobile device reports media monitoring data, the media monitoring data includes a public Internet Protocol (IP) address of the mobile device. Likewise, fixed devices also report their public IP address. As used herein, the public IP address is an address that is assigned by an Internet Service Provider (ISP). ISPs typically assign a single public IP address per media presentation location (e.g., household). The public IP address assigned to a media presentation location is shared by the devices that are (1) at that media presentation location and (2) communicating via the ISP. As such, when an Internet connection is shared by multiple devices (e.g., via a wireless access point, via a router, etc.) those multiple devices use the same public IP address. However, the devices within the media presentation location are typically assigned a private IP address to enable distribution of messages received via the public IP address to the correct device. In the context of fixed and mobile devices, mobile devices can be associated with fixed devices when the public IP address of the mobile device matches (and/or exhibits a pattern of matching) the public IP address of the fixed device. Likewise, once a mobile device is associated with a fixed device (e.g., determined to be located at the same media presentation location), media monitoring data received from the mobile device can be used to establish a probability of whether the mobile device is currently located at the media presentation location.

In examples disclosed herein, an alternative approach to identifying whether a mobile device is physically present at a media presentation location involves performing a network scan at the fixed device to detect mobile devices that are using the same access point. In examples disclosed herein, a fixed device is implemented with monitoring instructions which, when executed, cause the fixed device to scan a local area network (e.g., a local area network hosted at the media presentation location) and report information to the AME regarding other devices (e.g., mobile devices) that are present at the media presentation location at the time of the scan. The scan results can be used to establish a probability of whether the mobile device is physically present at the media presentation location.

In examples disclosed herein, another alternative approach to identifying whether a mobile device is physically present at a media presentation location involves (1) capturing audio at a fixed device within the media presentation location, and (2) capturing audio at the mobile device (whether within the media presentation location or not). The captured audio from both the fixed device and the mobile device are forwarded to the AME for analysis. A central facility of the AME analyzes the captured audio to determine whether the audio from the fixed device matches the audio from the mobile device. When the audio captured at the fixed device matches the audio captured at the mobile device, it is assumed that the mobile device is physically present at the media presentation location. The audio comparison results can be used to establish a probability of whether the mobile device is at the media presentation location.

In some examples, multiple approaches may be used simultaneously. For example, while the monitoring data and/or the scan data may indicate whether the mobile device is physically present at the media presentation location, the audio comparison results may additionally be used to determine whether the mobile device was within the presentation proximity of the fixed device. As noted above, presentation proximity is defined to mean a distance where media presented by a fixed device is identifiable to (e.g., presented to) a user or mobile device. Thus, a mobile device within the same room as the fixed device is in presentation proximity of the fixed device.

In some examples, the fixed device additionally monitors media presentations occurring at and/or in presentation proximity of the fixed device. For example, a television may monitor media that is presented by the television (or other nearby media device), and report such media monitoring data to the central facility. In some examples, monitoring instructions executed by the fixed device gather media presentation information (e.g., an identifier of the presented media) by directly interfacing with media presentation functionality of the fixed device. Example techniques for gathering media presentation information directly from media presentation functionality are disclosed in U.S. application Ser. No. 14/073,656 and U.S. Pat. No. 6,353,929, which are hereby incorporated by reference in their entirety.

In some examples, rather than gathering media presentation information directly from the media presentation functionality, external media monitoring approaches, such as audio watermarking, are used. Audio watermarking is a technique used to identify media such as television broadcasts, radio broadcasts, advertisements (television and/or radio), downloaded media, streaming media, prepackaged media, etc. Existing audio watermarking techniques identify media by including (e.g., embedding) one or more codes (e.g., one or more watermarks), such as media identifying information and/or an identifier that may be mapped to media identifying information, into a media signal (e.g., into an audio and/or video component of a media signal). In some examples, the audio and/or video component is selected to have a signal characteristic sufficient to hide the watermark. As used herein, the terms "code" and "watermark" are used interchangeably and are defined to mean any identification information (e.g., an identifier) that may be inserted in, transmitted with, or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the signal(s) representing the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media and/or the signal representing the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were disclosed in Thomas, U.S. Pat. No. 5,481,294, which is hereby incorporated by reference in its entirety.

As noted above, media presentations occurring at the fixed device may be monitored. Monitoring data concerning such media presentations is transmitted to the central facility of the AME for analysis. When combined with mobile device monitoring data, probabilities can be established as to whether a user having a particular demographic segment was present for an identified media presentation. For example, if the fixed device determined that an episode of "GAME OF THRONES" was presented, mobile monitoring data that has been correlated with the fixed device and a particular demographic segment may be used to determine a probability that the particular demographic was present at the fixed device during the presentation. Such a probability may be computed because, for example, the mobile device was known to have been within the media presentation location at the time of the media presentation, the mobile device was known to have been away from the media presentation location at the time of the media presentation, etc. Such information is useful because, for example, it provides a more accurate estimate of the composition of the audience(s) of media without requiring user (e.g., audience member) logins or the like.

Audience measurement entities typically provide incentives (e.g., gift cards, cash, prizes, etc.) to panelists for their participation. As such, creating a large panel (e.g., one hundred panelists, ten thousand panelists, etc.) can be cost prohibitive. Example methods, apparatus, and articles of manufacture disclosed herein enable reductions in incentives by gathering monitoring data in a census fashion. That is, many users that monitoring data is gathered from are not panelists and, in many cases, have not provided any demographic information regarding themselves (but may have indicated their consent to being monitored (e.g., have opted in) and/or have not opted out of such monitoring). By using known panelist information (e.g., demographic information of panelists, viewing habits of panelists, etc.), the unsupplied demographic information of the non-panelist users can be estimated based on their media habits. Using such estimation reduces the amount of incentives to be given to monitored users (e.g., the panelists).

Example methods, apparatus, and articles of manufacture disclosed herein collect data in a census fashion from many different devices. As such, user privacy is a concern. In some examples, manufacturers might not fully and/or clearly inform users that monitoring information (e.g., the fixed device IP address, the mobile monitoring data) is being transmitted to the AME. To overcome this problem, example methods, apparatus, and articles of manufacture disclosed herein implement opt-out and/or opt-in procedures to enable a user to control how their monitoring data is used. In some examples, the example AME implements opt-out and/or opt-in procedures in accordance with the teachings of U.S. patent application Ser. No. 14/453,840, which is incorporated herein by reference in its entirety. However, any other approach to implementing opt-in and/or opt-out may additionally or alternatively be employed.

In some known systems, the AME provides a set top box to monitor a media presentation location. The set top box monitors media presentations within the media presentation location and reports monitoring information to the AME. Example methods, apparatus, and articles of manufacture disclosed herein enable identification of a media presentation location without the need to install a dedicated piece of metering equipment provided by the AME, such as the dedicated meter (e.g., a people meter, a media monitor, a home monitor as mentioned in Thomas, U.S. Pat. No. 5,481,294).

Moreover, set top boxes traditionally report a great deal of information to the Audience Measurement Entity including, for example, identifications of presented media, identifications of users who are present during a media presentation, etc. In contrast, example methods, apparatus, and articles of manufacture disclosed herein transmit an IP address from the fixed device to the AME. Limiting transmission to an IP address reduces an overall bandwidth requirement of the monitoring effort. Moreover, the public IP address of the fixed device (e.g., a public IP address assigned to the media presentation location) is typically a dynamic IP address assigned by an Internet Service Provider (e.g., a cable Internet provider, a digital subscriber line (DSL) provider, etc.). That is, the public IP address of the fixed device may change over time. While the IP address of the fixed device is dynamic (and may change), such IP addresses typically remain assigned to the same fixed device for extended periods of time (e.g., one day, one week, one month, etc.). By determining whether the IP address of the fixed device has changed, the fixed device further reduces bandwidth requirements of the monitoring by notifying the AME of the IP address only when the IP address has changed.

FIG. 1 is a diagram of an example environment of use 100 in which a system for correlating mobile device usage with a fixed device operates. The example environment 100 of FIG. 1 includes a fixed device 130, a mobile device 140, an example manufacturer 110, a media provider 115, the Internet 150, and multiple access points 122, 124. The example system includes a central facility 170 operated by an audience measurement entity (AME) 165. In the example of FIG. 1, the example manufacturer 110 and an example media provider 115 cooperate with the audience measurement entity 165 to cause the fixed device 130 and/or the mobile device 140 to report monitoring data to the central facility 170 of the AME via the Internet 150. In the illustrated example of FIG. 1, the fixed device 130 is physically present within a media presentation location 120. Similarly, the mobile device 140 is physically present within the media presentation location 120. However, as the mobile device 140 is mobile, the example mobile device 140 is sometimes operated outside of the media presentation location 120. The example fixed device 130 and the example mobile device 140 (when within the media presentation location 120) communicate with the Internet 150 and/or devices in communication with the Internet 150 via a home access point 122. When the example mobile device 140 is outside of the media presentation location 120, the mobile device communicates with the Internet 150 and/or devices in communication with the Internet 150 via a non-home access point (e.g., the non-home access point 124).

The example manufacturer 110 of the illustrated example of FIG. 1 manufactures the fixed device 130. As used herein, the term manufacturer includes any party that is involved in the creation and/or sale of the fixed device. For example, the manufacturer 110 may include a component assembler, a designer, an electronics company, a merchant of any type such as, an electronics retailer or a wholesaler, etc. In the illustrated example, the example central facility 170 provides machine readable instructions 112 to the manufacturer 110, and instructs the manufacturer 110 to implement IP address reporting functionality in the fixed device 130. In some examples, the fixed device 130 is implemented to report a public IP address to the manufacturer 110, which is then relayed to the central facility 170 of the AME 165. However, in some other examples, the fixed device 130 is implemented to report the public IP address directly to the central facility 170 (or to any other location and/or device) of the AME 165.

In some examples, the manufacturer 110 gathers product registration and/or usage data concerning the fixed device. To that end, the manufacturer 110 may collect product registration data from an owner of the fixed device 130. For example, when using the fixed device 130 for the first time, the user of the fixed device 130 may be asked to register the product with the manufacturer 110. In some examples, the registration information includes demographic information about the owner. Further still, in some examples, the registration information is shared with the AME to enable a better estimation of demographic information of the user of the fixed device and/or users of other devices.

The example media provider 115 of the illustrated example of FIG. 1 corresponds to any one or more media provider(s) capable of providing media for presentation at the fixed device 130 and/or at the mobile device 140. The media provided by the media provider(s) 115 can be any type of media, such as audio, video, multimedia, etc. Additionally or alternatively, the media can correspond to live (e.g., broadcast) media, stored media (e.g., on-demand content), etc. The example media provider 115 provides a webpage(s) to the fixed device 130 and/or the mobile device 140 that includes machine readable monitoring instructions 117 which, when executed by the fixed device 130 and/or the mobile device 140 cause the fixed device 130 and/or the mobile device to report monitoring information to the central facility 170. Example implementations of such monitoring instructions are disclosed in Blumenau, U.S. Pat. No. 6,108,367. In the illustrated example, the instructions 117 are provided to the media providers 115 by the central facility 170. While in the illustrated example the monitoring instructions 117 are transmitted as part of and/or linked to by a webpage, the monitoring instructions 117 may be provided to the client device in any other fashion. For example, the monitoring instructions may be embedded within media (e.g., in an advertisement to be presented in an iframe of a webpage) to be presented at the fixed device 130 and/or the mobile device 140, the monitoring instructions may be implemented in an application (e.g., an "app") provided by the media provider 115, and/or the instructions may be embedded in a media player.

The example media presentation location 120 of the illustrated example of FIG. 1 is a home of a consumer. However, in some examples, the media presentation location is a location other than a home such as, for example, a library, a retail establishment, a public location, etc. In the illustrated example, the media presentation location 120 includes a home access point 122 that is in communication with the Internet 150 via a service provider. The example home access point 122 of the illustrated example of FIG. 1 is a router that enables multiple devices within the media presentation location 120 to communicate via the Internet 150. In the illustrated example, the home access point 122 hosts a wireless local area network (LAN) using, for example, WiFi. However, any other past, present, and/or future approach to hosting a local area network may additionally or alternatively be used. The home access point 122 issues a private IP address to each device that is communicatively coupled to the home access point 122. The private IP address enables devices on the LAN (e.g., the fixed device 130 and/or the mobile device 140) to communicate with the home access point 122.

As mentioned above, within the LAN hosted by the example home access point 122, individual devices (e.g., the example fixed device 130, the example mobile device 140) are given private IP address. In the illustrated example, the private IP addresses are assigned using a dynamic host of protocol (DHCP). When a device within the LAN transmits a request to a resource outside the LAN (e.g., on the Internet 150), the example home access point 122 translates the originating private IP address of the device making the request to the public address of the example home access point 122 before relaying request outside the LAN (e.g. to the destination). Thus, when the resource outside the LAN receives the request, the resource is able to transmit a return response to the LAN. On the return path, the example home access point 122 translates the destination IP address of the response to the private IP address of the requesting device so that the return message may be delivered to the device that made the original request.

In some examples, multiple fixed devices 130 are present in the media presentation location 120. Each such fixed device 130 may attempt to transmit information to the central facility 170. However, this amount of data may be unnecessary as, for example, another fixed device 130 has already reported the information (e.g., the public IP address). Reducing (e.g., eliminating) redundant transmission of data by, for example, transmitting the information in one compressed transmission, as compared to many separate uncompressed transmissions, increases bandwidth efficiency. As such, in some examples, the example home access point 122 aggregates and/or filters information as it is transmitted to the central facility 170. For example, if one of the fixed devices is an Internet enabled motion sensor (e.g., a motion sensor as part of a home security system), the example fixed device does not need to report every movement detected, but only higher-level events like "a person entered the house." The example home access point can, in some examples, compare data transmitted from different fixed devices in the media presentation location such as smartphones, connected cars and other sensors such as a garage door opener. This distributed approach to data collection and aggregation using the Internet of Things (IoT) capabilities of in home electronics results in an overall reduction (e.g., elimination) of redundant information that is transmitted to the central facility, thereby reducing the processing requirements of the central facility 170 and the bandwidth requirements of the home access point 122. To implement such culling, in some examples, the home access point 122 includes a cache to store recent transmissions to the central facility. When receiving information from a fixed device for transmission to the central facility, the example home access point consults the cache to determine if the same information was transmitted to the central facility within a threshold period of time (e.g., one hour, one day, etc.). If the example home access point 122 determines that the same information was transmitted to the central facility within the threshold period of time, the example home access point 122 disregards the attempted transmission to the central facility 170.

The example non-home access point 124 of the example of FIG. 1 is an access point that is used by the mobile device 140 when the mobile device is not within the media presentation location 120. In the illustrated example, the non-home access point 124 provides a cellular network enabling the mobile device 140 to communicate via the Internet 150. In the illustrated example, the cellular network is a long term evolution (LTE) network. However, any other type(s) of cellular networks may additionally or alternatively be used. Moreover, the non-home access point 124 may provide any other past, present, and/or future network connection such as, for example, an Ethernet connection, a WiFi connection, a Bluetooth connection, etc.

As noted above, the example fixed device 130 may be implemented by any device that is intended to remain stationary at a media presentation location (e.g., a household) for an extended period of time (e.g., one month, one year, etc.). Fixed devices are not typically removed from the media presentation location. Example fixed devices include, for example, a television 132, a thermostat 134, a video game console (e.g., Xbox®, PlayStation®), a set top box, a digital media player (e.g., a Roku® media player, a Slingbox®, etc.), a garage door opener, a motion sensor, etc. Such example fixed devices may be implemented by Internet of Things (IoT) devices. IoT devices are network connected devices that communicate with other network connected devices and/or servers. IoT devices include, for example, Internet enabled thermostats, Internet enabled refrigerators, Internet enabled microwaves, home automation systems, home security system sensors, etc.

In the illustrated example, the fixed device 130 determines and reports a public IP address to the manufacturer 110 and/or the central facility 170. In the illustrated example, the public IP address is reported using a hypertext transfer protocol (HTTP) request, POST message, or GET message. However, any other message type and/or format may additionally or alternatively be used.

In some examples, the example fixed device 130 performs a network scan to identify mobile devices that are in communication with the home access point 122 (i.e., within the media presentation location 120). The example scan is performed by determining potential internal (e.g., private) IP addresses, and transmitting a message to the potential IP address(es). In the illustrated example, an Internet Control Message Protocol (ICMP) message (commonly referred to as a "ping") is used. However, any other type(s) and/or number of message(s) may addition ally or alternatively be used. In some examples, when it is discovered that a device is present at the potential IP address, the example fixed device 130 performs a lookup of a hardware address (e.g., a media access control address (MAC), a serial number, a name of the device, etc.) of the device communicating using the tested private IP address to identify the device responding at the tested IP address. In the illustrated example, the lookup is performed using an Address Resolution Protocol (ARP) table. Example approaches to implementing and/or accessing the ARP table are disclosed in U.S. patent application Ser. No. 13/931,750, which is incorporated herein by reference in its entirety. The identified hardware address is transmitted to the central facility 170. Hardware addresses for similar types of devices (e.g., devices having the same make and/or model) are typically similar. As such, the central facility 170 stores one or more tables identifying patterns of hardware addresses used by different manufacturers. These table(s) can be used to identify the type of a given device based on its corresponding hardware address. Such identification is useful because it enables identification of mobile devices associated with fixed devices and facilitates a determination of whether the identified device is physically present at the media presentation location. An example fixed device 130 including network scanning functionality is described in further detail in connection with FIG. 3.

While in the illustrated example, an ARP table is used to identify devices responding at a tested IP address, any other approach to identifying the device at the tested IP address may additionally or alternatively be used. For example, a port scan of the tested IP address may be performed to identify one or more ports (e.g., a Transmission Control Protocol (TCP) port) on which the identified device is responsive. To perform the port scan, the example fixed device 130 identifies a starting port number and an ending port number. The example fixed device 130 requests a response from each port of the tested IP address from the starting port number to the ending port number. In examples disclosed herein, ports 0 through 1023 are defined as Well Known Ports by the Internet Assigned Numbers Authority (IRNA), and are prohibited from use without registration. As such, the Well Known Ports are frequently used by devices to host services via a network. Accordingly, in some examples the starting port number is 0, and the ending port number is 1023. However, any other port range may additionally or alternatively be used. Moreover, multiple ranges and/or select ports may be used. Upon receiving responses and/or an indication of no response (e.g., a timeout), the example fixed device 130 stores the responses and/or analyzes the responses to identify the device at the tested IP address. A signature of ports on which the tested IP address is responsive and/or the responses received via those ports may be used to identify the device at the tested IP address. For example, an Apple iPhone may be responsive via port 1000, whereas an Android device may not.

In some examples, the example fixed device 130 is structured to capture audio. For example, the fixed device may include a microphone or other audio sensor. Likewise, audio is also captured by the microphone or audio sensor of the mobile device 140. Both the example fixed device and the example mobile device 140 transmit the captured audio to the central facility 170. By comparing the received audio, the example central facility 170 can determine whether the mobile device 140 was within presentation proximity of the fixed device 130 at the time the audio was captured. An example fixed device 130 structured to capture audio is described in further detail in connection with FIG. 4.

The example mobile device 140 of the illustrated example of FIG. 1 is a device that is capable of presenting media provided by the media provider(s) 115. The example mobile device 140 may be, for example, a tablet, a laptop computer, a smart phone, etc. In the illustrated example, the mobile device 140 reports monitoring data to the central facility 170. Monitoring data is reported based on monitoring instructions 117 received from the media provider 115 (e.g., the monitoring instructions 117 may include an instruction to collect specific data and an instruction to transmit a message to the central facility 170 concerning the collected information). In some examples, the monitoring instructions are structured in accordance with the teachings of Blumenau, U.S. Pat. No. 6,108,637. However, any other approach to providing and/or structuring monitoring instructions, and/or reporting monitoring data to a central facility may additionally or alternatively be employed (e.g., a meter may be downloaded to the fixed device 130 and/or the mobile device 140 from the AME 165).

In the illustrated example, the mobile device 140 is associated with a single user. However, in some examples, the mobile device 140 may be associated with multiple users. In the illustrated example, the mobile device 140 communicates via the home access point 122 when the mobile device 140 is within the media presentation location 120. The example mobile device 140 communicates via any number of different access points (e.g., access points similar to the non-home access point 124) when the mobile device 140 is outside of the media presentation location 120. Because the example mobile device 140 communicates using multiple different access points, the example central facility 170, based on an IP addresses reported as part of the monitoring data, can determine whether the mobile device 140 is within the media presentation location 120 or outside the media presentation location 120.

The example audience measurement entity (AME) 165 of the illustrated example of FIG. 1 is a neutral third party (such as The Nielsen Company (US), LLC) who does not source, create, and/or distribute media and can, thus, provide unbiased ratings and/or other media monitoring statistics. To create the unbiased ratings and/or other media monitoring statistics, the AME 165 operates a central facility 170. The example central facility 170 includes one or more servers that collect monitoring data from multiple fixed device(s) (e.g., the fixed device 130) and/or the mobile device(s) (e.g., the mobile device 140) and, based on the collected information, and develops audience measurement statistics and/or prepares reports. Although only one central facility 170 is shown in FIG. 1, many facilities may be provided for collecting the data. In some examples, these data collection facilities are structured in a tiered approach with many satellite collection facilities collecting data and forwarding the same to one or more central facilities 170.

Figure 2:
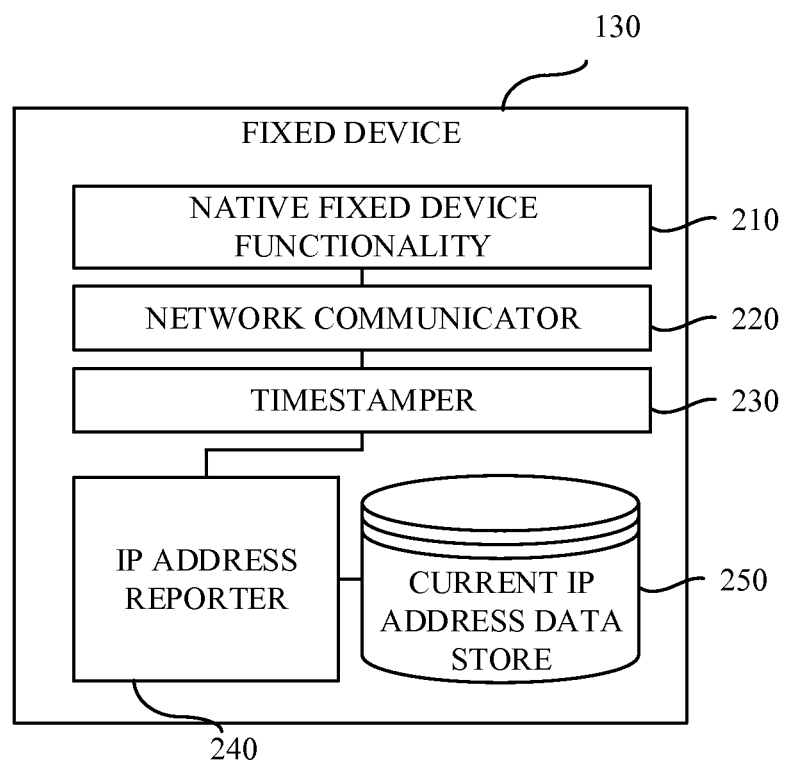
FIG. 2 is a block diagram of an example implementation of the fixed device of FIG. 1.

FIG. 2 is a block diagram of an example implementation of the fixed device 130 of FIG. 1. In the example of FIG. 2, the fixed device 130 is a consumer electronics device that has been enhanced to provide monitoring capabilities. The example fixed device 130 of FIG. 2 includes native fixed device functionality 210, a network communicator 220, a timestamper 230, an IP address reporter 240, and a current IP address data store 250.

The example native fixed device functionality 210 of the illustrated example of FIG. 2 includes any functionality included by the manufacturer 110 for that particular fixed device 140. For example, if the fixed device 130 were a television, the native fixed device functionality 210 may include a display, an infrared receiver, speakers, a tuner, software, firmware, etc. If, for example, the fixed device 130 were an Internet enabled thermostat, the native fixed device functionality 210 may include a temperature sensor, a display, and one or more switches for controlling a heating, ventilation, and air-condition (HVAC) system. In some examples, the example native fixed device functionality 210 enables other components of the fixed device 130 to interact with the native fixed device functionality 210. For example, in some examples, the native fixed device functionality 210 may present media presentation information such as, for example, an identification of media that is being presented, to other components of the fixed device such as, for example, the audio capturer 470 and/or the example media monitor 480 described below in connection with FIG. 4.

The example network communicator 220 of the illustrated example of FIG. 2 transmits data to the manufacturer 110 and/or the central facility 170. In the illustrated example of FIG. 2, the example network communicator 220 transmits a public IP address of the fixed device 130 to the manufacturer 110 and/or the central facility 170. However, in some examples disclosed herein, the network communicator 220 may additionally or alternatively transmit other data. For example, the example network communicator 220 may transmit scan results indicating information regarding mobile devices that are in communication with the home access point 122 (e.g., within the media presentation location 120), the example network communicator 220 may transmit media identification information, the example network communicator 220 may transmit captured audio, etc.

In the illustrated example, the data is transmitted to the central facility 170 using a Hypertext Transfer Protocol (HTTP) Post request. However, any other method of transmitting data and/or metadata may additionally or alternatively be used. Because, in the illustrated example, an HTTP message is used, the network communicator 220 may embed cookie data in the HTTP message that identifies the fixed device that is transmitting the data (assuming the transmission is to an Internet domain that has set such a cookie). In some examples, the fixed device identifier is transmitted as part of an HTTP header, while data is transmitted in a payload of the HTTP message. Because the fixed device identifier is included in the HTTP message, the central facility 170 can identify the fixed device associated with the transmission.

While in the illustrated example the example HTTP message is used to convey the data to the central facility 170, any other approach to transmitting data may additionally or alternatively be used such as, for example, a file transfer protocol (FTP), HTTP Secure (HTTPS), an HTTP Get request, Asynchronous JavaScript and extensible markup language (XML) (AJAX), etc. In some examples, the data is not transmitted to the central facility 170. Instead, the data may be first transmitted to a manufacturer 110 which may relay the data to the central facility 170. In the illustrated example, the data is transmitted in near real-time (e.g., streamed) to the central facility 170. As used herein, near real-time is defined to be transmission of data within a short time duration (e.g., one minute) of the identification, generation, and/or detection of the data. However, in some examples, the data may be stored (e.g., cached, buffered, etc.) for a period of time before being transmitted to the central facility 170.

In some examples, the example network communicator 220 is implemented according to a software development kit (SDK) provided to the manufacturer 110 by the AME 165 (e.g., in association with the instructions 112 shown in FIG. 1). In such an example, the manufacturer 110 includes instructions (e.g., executable code) provided as part of the SDK in the fixed device 130 to implement, modify, and/or control the example network communicator 220. However, in some examples, the example network communicator 220 is implemented to interact with a cloud application programming interface (API) hosted by an HTTP interface of the central facility 170. Using a cloud API does not require implementation of instructions provided as part of an SDK in the fixed device 130. Instead, when using the cloud API, the network communicator 220 of this example is implemented using an HTTP stack (e.g., libraries and/or other executable code) that is already present on the fixed device 130. As a result, fewer additional instructions are needed to implement the network communicator 220. Using fewer instructions results in lowered memory requirements of the fixed device. Implementing the example network communicator 220 using the cloud API is also typically more cost effective for the manufacturer 110 than implementing instructions from an SDK because, for example, many fixed devices already include the ability to transmit HTTP messages, thereby reducing the programming and/or development expenses of the manufacturer 110. Moreover, the lowered cost and/or development efforts required to implement the cloud API result in many more devices (e.g., IoT devices) that are implemented to interact with the cloud API, thereby providing additional monitoring information and enhancing the reliability of the results of the monitoring effort.

The example timestamper 230 of the illustrated example of FIG. 2 generates a timestamp indicative of a date and/or time that an event occurred (e.g., an IP address was determined, a network scan was performed, etc.) Timestamping (e.g., applying a time to an event) enables accurate identification and/or correlation of the fixed device 130 with the media presentation location 120 and/or mobile device(s) 140 that are within the media presentation location 120. In the illustrated example, the timestamper 230 determines the date and/or time using a clock of the fixed device 130. However, in some examples, the timestamper 230 determines the date and/or time by requesting the date and/or time from an external time source, such as a National Institute of Standards and Technology (NIST) Internet Time Service (ITS) server. However, any other approach to determining a timestamp may additionally or alternatively be used.

The example IP address reporter 240 of the illustrated example of FIG. 2 identifies a current public IP address of the fixed device 130, and reports the public IP address to the central facility 170. In the illustrated example, the example IP address reporter 240 is implemented by the manufacturer 110 based on, for example, the SDK provided by the AME in the instructions 112. In such an example, the example IP address reporter 240 is implemented in the fixed device 130 prior to usage of the fixed device 130 at the media presentation location 120. In some examples, the example IP address reporter 240 is downloaded to the fixed device 130 from the manufacturer 110 and/or the AME 165 after and/or while the fixed device 130 has been used at the media presentation location 120 (e.g., via an update and/or software installation). In the illustrated example, the example IP address reporter 240 determines the public IP address of the fixed device 130 by tracing an Internet route to the manufacturer 110. To perform the trace route function, the example IP address reporter 240 transmits one or more messages, each having an increasing time to live (TTL) value. In the illustrated example, the first message has a TTL value of two. However, any other TTL value may additionally or alternatively be used. As each message is transmitted towards its destination, each intervening router reduces the TTL value until the TTL value reaches zero. When the TTL value reaches zero, the router decrementing the TTL value to zero transmits an Internet Control Message Protocol (ICMP) time exceeded message back to the source. The ICMP time exceeded message includes an IP address of the router returning the ICMP time exceeded message. The example IP address reporter 240 records the IP addresses returned as a result of the TTL values reaching zero. As noted above, the first message has a TTL value of two. The TTL value of two is used because there is typically one router (e.g., the home access point 122) between the fixed device 130 and a router that reports the public IP address.

The example IP address reporter 240 of FIG. 2 inspects the IP addresses returned in the ICMP time exceeded message(s). The example IP address reporter 240 determines the public IP address by selecting the IP address that was returned as a result of the lowest TTL value that is a public IP address. The Internet Assigned Numbers Authority (IRNA) specifies particular blocks of IP addresses that are only to be used as private IP addresses. For example, the IP address ranges of 10.0.0.0-10.255.255.255, 172.16.0.0-172.31.255.255, and 192.168.0.0-192.168.255.255 are reserved for use as private IP addresses. All other IP addresses are for use as public IP addresses. While in the illustrated example, Internet protocol version four (IPv4) addresses are used, any other networking and/or addressing protocol may additionally or alternatively be used such as, for example, Internet protocol version six (IPv6). The example IP address reporter 240 of FIG. 2 consults the example current IP address data store 250 to determine if the public IP address is different from a stored current IP address. If the IP address is different (e.g., the public IP address has changed) the changed IP address is reported to the manufacturer 110 and/or the central facility 170, and the changed IP address is stored in the current IP address data store 250.

The current IP address data store 250 of the illustrated example of FIG. 2 may be any device for storing data such as, for example, flash memory, magnetic media, optical media, etc. Furthermore, the data stored in the current IP address data store 250 may be in any format such as, for example, binary data, comma separated data, tab delimited data, structured query language (SQL) structures, etc. While, in the illustrated example, the current IP address data store 250 is illustrated as a single database, the current IP address data store 250 may be implemented by any number and/or type(s) of database(s). In the illustrated example, the example current IP address data store 250 is implemented by the manufacturer 110 based on, for example, the SDK provided by the AME in the instructions 112. In such an example, the example current IP address data store 250 is configured within a memory of the fixed device 130 prior to usage of the fixed device 130 at the media presentation location 120. In some examples, the example current IP address data store 250 is configured after and/or while the fixed device 130 has been used at the media presentation location 120 (e.g., via an update and/or software installation).

Figure 3:
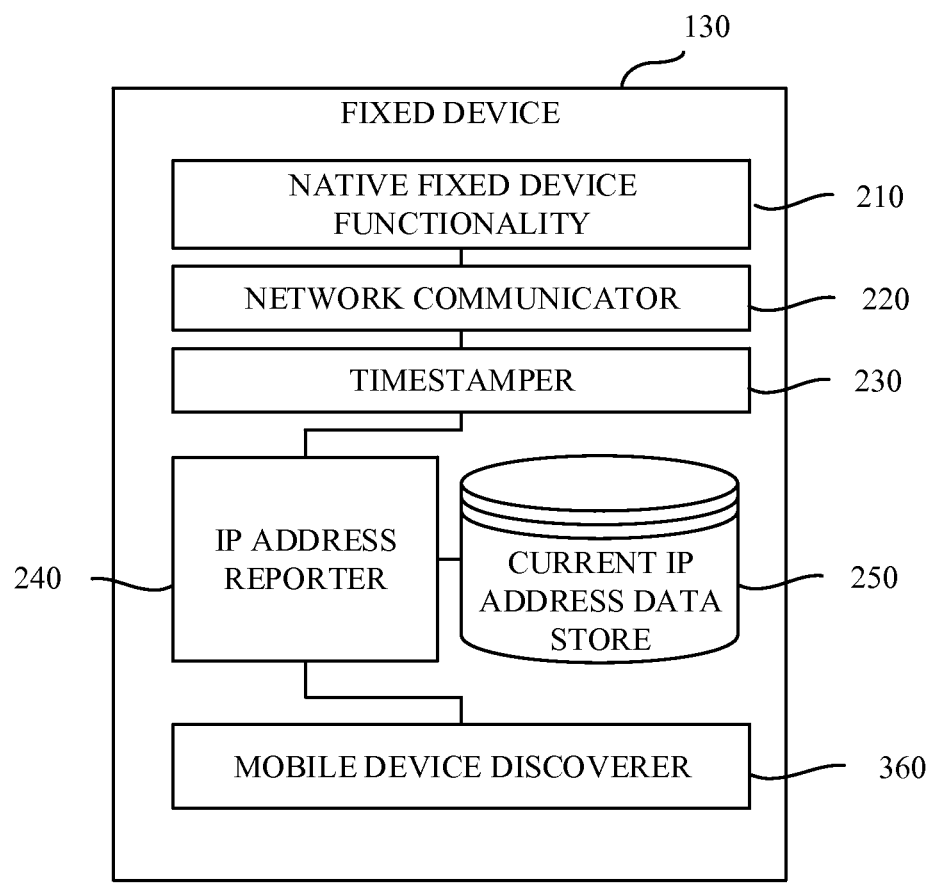
FIG. 3 is a block diagram of an alternative implementation of the example fixed device of FIG. 1.

FIG. 3 is a block diagram of an alternative implementation of the example fixed device 130 of FIG. 1. In addition to the circuitry of the example fixed device 130 of FIG. 2 (numbered in FIG. 3 using the same reference numbers as used in FIG. 2), the example fixed device 130 of the illustrated example of FIG. 3 includes a mobile device discoverer 360, which enables discovery of a mobile device 140 that is in communication with the example home access point 122 (e.g., within the media presentation location 120). In the illustrated example, the example mobile device discoverer 360 is implemented by the manufacturer 110 based on, for example, the SDK provided by the AME in the instructions 112. In such an example, the example mobile device discoverer 360 is implemented in the fixed device 130 prior to usage of the fixed device 130 at the media presentation location 120. In some examples, the example mobile device discoverer 360 is configured after and/or while the fixed device 130 has been used at the media presentation location 120 (e.g., via an update and/or software installation).

The example mobile device discoverer 360 communicates via the network communicator 220 to perform a scan of the local area network (LAN) hosted by the home access point 122. In the illustrated example, the scan is triggered on a periodic basis (e.g., after a threshold time has elapsed such as, for example, fifteen minutes, two hours, three days, etc.) from an immediately prior scan. However, the scan may be triggered in any other periodic and/or aperiodic fashion. To begin the scan, the example mobile device discoverer 360 determines a private IP address of the fixed device 130. Many home routers (e.g., the example home access point 122) allocate private IP addresses using a single subnet (e.g., a subnet containing private IP address from 192.168.1.0 through 192.168.1.255). As such, to avoid scanning all potential private IP addresses, the example mobile device discoverer 360 selects a subnet that includes the private IP address of the fixed device 130. The example mobile device discoverer 360 transmits an ICMP Echo request (commonly referred to as a "ping") via the network communicator 220 to the potential IP address(es), and awaits a response to each request. If the response is received from the tested IP address, the example mobile device discoverer 360 performs a lookup of a hardware address (e.g., a media access control address (MAC), a serial number, a name of the device, etc.) of the device communicating using the tested IP address. In the illustrated example, the lookup is performed using an Address Resolution Protocol (ARP) table. In the illustrated example, the ARP table is maintained by the network communicator 220. The ARP table is updated by the network communicator 220 as IP addresses of devices in communication with the fixed device 130 (e.g., devices responding to the ICMP Echo requests of the network scan) are changed. Example approaches to implementing and/or accessing the ARP table are disclosed in U.S. patent application Ser. No. 13/931,750, which is incorporated herein by reference in its entirety. The identified hardware address is transmitted to the central facility 170. In some examples, the timestamper 230 generates a timestamp indicating a time at which the network scan was performed, which is also transmitted to the central facility 170. Hardware addresses for similar types of devices (e.g., devices having the same make and/or model) are typically similar. As such, the central facility 170, stores one or more tables identifying patterns of hardware addresses used by different manufacturers. These table(s) can be used to identify the type of a given device based on its corresponding hardware address. Such identification is useful because it enables identification of mobile devices associated with fixed devices and facilitates a determination of whether the identified device is physically present at the media presentation location.

Figure 4:
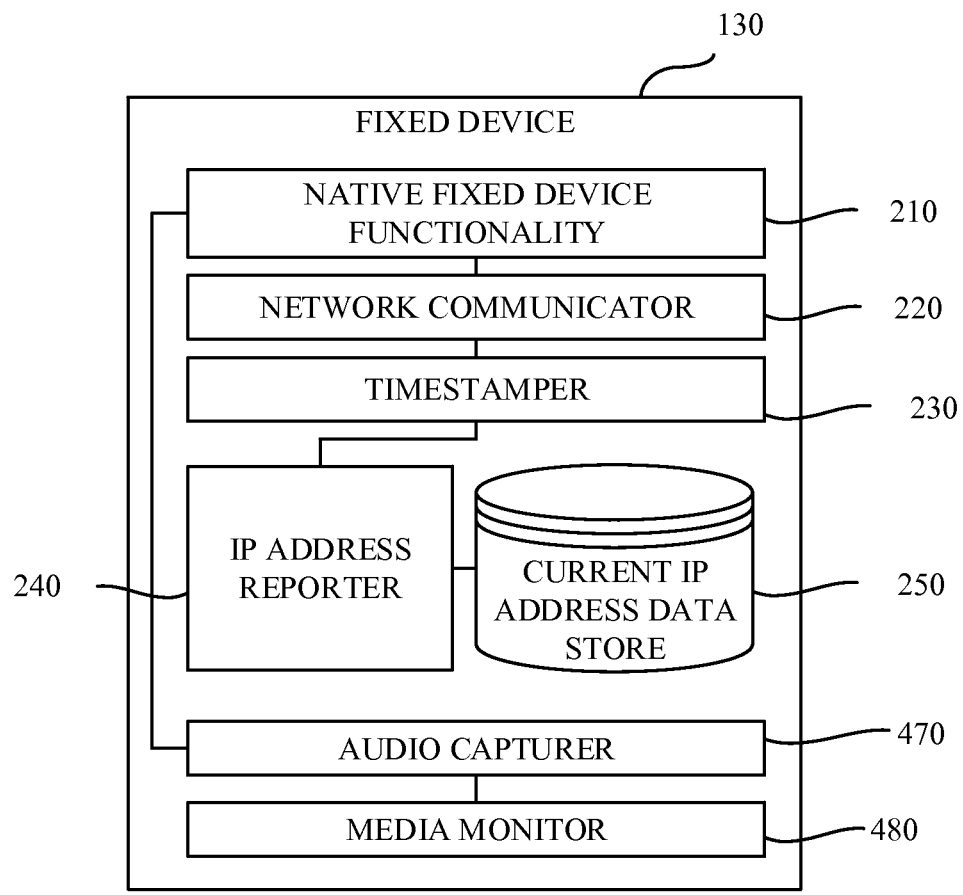
FIG. 4 is a block diagram of an alternative implementation of the example fixed device of FIG. 1.

FIG. 4 is a block diagram of an alternative implementation of the example fixed device 130 of FIG. 1. In addition to the circuitry of the example fixed device 130 of FIG. 2 (numbered in FIG. 4 using the same reference numbers as used in FIG. 2), the example fixed device 130 of the illustrated example of FIG. 4 includes an audio capturer 470 and a media monitor 480 to enable audio monitoring.

The example audio capturer 470 of the illustrated example of FIG. 4 is an internal microphone. The microphone receives ambient sound including audible media presented in the vicinity of the fixed device 130. Alternatively, the audio capturer 470 may be implemented by a line input connection, and/or may be implemented to interface directly with the media presentation functionality of the fixed device 130. The line input connection may allow an external microphone to be used with the fixed device 130. Advantageously, an external microphone may be placed in a location that might receive better quality audio than an internal microphone of the fixed device 130. Additionally or alternatively, the audio capturer 470 may be implemented by a radio frequency receiver. The radio frequency receiver might allow for wireless microphones to be placed in a location that might receive better audio quality than an internal microphone of the fixed device 130.

The example media monitor 480 of the illustrated example of FIG. 4 determines media identifiers from audio received by the audio capturer 470. As used herein, a "media identifier" is any type of data, metadata, and/or information associated with, inherent to, embedded with, inferable from and/or injected into media, and which may be used to identify that media. Audience measurement codes (e.g., watermarks), public or private identifiers in bit streams (e.g., program identification (PID) headers) closed captioning information, signatures, metadata or any other type(s) of data can serve as media identifiers. A media identifier is generally not noticeable to the audience during playback, but this is not necessarily so. Signatures may be any unique or semi-unique aspects of media (e.g., luminance characteristics, audio spectrum characteristics, etc.) that may be used to identify the media based on a comparison to reference signatures. Via the network communicator 220, the example media monitor 480 reports the media identifier to the central facility 170. Reporting the media identifier to the central facility 170 enables the central facility to determine what media was presented at the fixed device and, when combined with information concerning the location of mobile devices associated with the fixed device, enables the central facility 170 to determine demographic segments that may have been present for the media presentation.

While example implementations of fixed devices are disclosed in connection with the illustrated examples of FIGS. 2, 3, and/or 4, these example implementations may combined in any fashion. For example, the example IP address reporter 240, the example current IP address data store 250, the example mobile device discoverer 360, the example audio capturer 470, and/or the example media monitor 480 may be implemented in a same fixed device.

Figure 5:
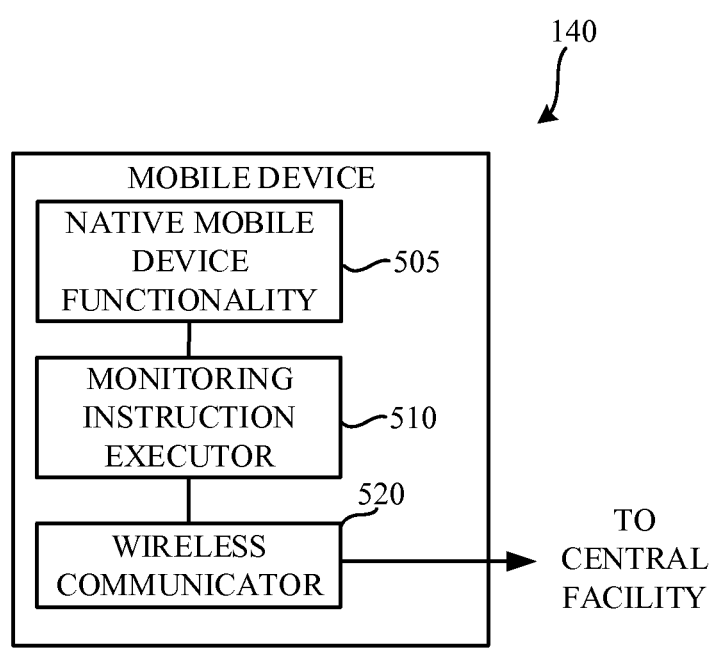
FIG. 5 is a block diagram of an example implementation of the mobile device of FIG. 1.

FIG. 5 is a block diagram of an example implementation of the mobile device of FIG. 1. The example mobile device 140 of FIG. 5 includes native mobile device functionality 505, a monitoring instruction executor 510, and a wireless communicator 520.

The example native mobile device functionality 505 of the illustrated example of FIG. 5 includes any functionality for performing mobile device operations. For example, the native mobile device functionality 505 may include a mobile device operating system (e.g., Google Android, Apple iOs, etc.) and/or applications. In some examples, the example native mobile device functionality 505 enables other components of the mobile device 140 to interact with the native mobile device functionality 505 such as, for example, programming libraries and/or function calls.

The example monitoring instruction executor 510 of the illustrated example of FIG. 5 executes monitoring instructions received from, for example, the media provider 115. In the illustrated example, the monitoring instructions are provided by the media provider 115 as part of a webpage. In the illustrated example, the monitoring instructions are JavaScript instructions which, when executed, cause the monitoring instruction executor 510 to gather and transmit monitoring information to the central facility 170. In such an example, the monitoring instruction executor 510 is a browser that executes JavaScript instructions. In the illustrated example, the monitoring instructions cause the example monitoring instruction executor 510 to identify a webpage presented via a browser (and/or other application) of the mobile device and to transmit identification of the same to the central facility 170. However, the example monitoring instruction executor 510 may identify any other type of information such as, for example, an identifier of media displayed on the webpage and/or, more generally, media displayed by the mobile device. For example, the example monitoring instruction executor 510 may execute, monitoring instructions to return metadata to the central facility 170 as disclosed in co-pending U.S. patent application Ser. Nos. 13/341,646, 13/341,661, 13/443,596, 13/793, 991, 13/445,961, 13/793,974, 13/472,170, 13/767,548, 13/793,959, and 13/778,108, which are incorporated by reference in their entirety.

In some examples, rather than implementing the monitoring instructions as part of a webpage, the monitoring instructions may be implemented as part of an application (e.g., an "app"). In such examples, the app may be downloaded and/or otherwise installed on the mobile device 140 and may collect monitoring data regarding media presented within the app and/or by other apps. In such an example, the monitoring instruction executor 510 is implemented according to an SDK provided by the AME 165. Additionally or alternatively implementing the monitoring instructions as an app is useful because it enables monitoring of media in cases where the media presentation would otherwise not be monitored such as, for example, where the media presentation is made by an application that does not execute monitoring instructions (e.g., by an application different from the app and that has not been implemented using the SDK). In some examples, the app may be implemented to execute monitoring instructions in accordance with the teachings of U.S. patent application Ser. No. 13/828,971, which is incorporated by reference in its entirety.

In the illustrated example, the monitoring data is transmitted to the central facility 170 using a Hypertext Transfer Protocol (HTTP) Post request. However, any other method of transmitting data and/or metadata may additionally or alternatively be used. Because, in the illustrated example, an HTTP message is used, the wireless communicator 520 may embed cookie data in the HTTP message that identifies a user and/or a device that is transmitting the media presentation data (assuming the transmission is to an Internet domain that has set such a cookie). In some examples, the user and/or device identifier is transmitted as part of an HTTP header, while other media presentation data (e.g., a duration of the media, metadata, a timestamp, etc.) are transmitted in a payload of the HTTP message. Because the user and/or device identifier is included in the HTTP message, the central facility 170 can identify the user and/or the device as associated with the media presentation. In some examples, the users are panelists and the cookie data that includes the user and/or device identifier is set by the central facility 170 to enable subsequent instances of monitored media presentation data to be associated with the panelist. However, in some other examples, the users are not panelists and the demographic information is collected and/or otherwise requested from a database proprietor (e.g., Facebook, Experian, Twitter, etc.) using approaches such as those described in Mazumdar, U.S. Pat. No. 8,370,489, which is hereby incorporated by reference in its entirety.

In the illustrated example, the monitoring data is transmitted to the central facility 170 via the example wireless communicator 520. The example wireless communicator 520 of the illustrated example of FIG. 5 is a wireless radio that communicates with a home access point such as the home access point 122 and/or a non-home access point such as the non-home access point 124. In the illustrated example, the wireless communicator 520 includes a WiFi radio for communicating with the home access point 122, and a cellular radio for communicating with the non-home access point(s). However, any other number and/or type(s) of radios may additionally or alternatively be used. The example wireless communicator 520 may communicate using any past, present, and/or future communication protocols such as, for example, WiFi, Global System for Mobile Communications (GSM), code division multiple access (CDMA), long term evolution (LTE), etc.

In the illustrated example, the monitoring information is transmitted to the central facility 170 using an HTTP message. However, any other approach to transmitting data may additionally or alternatively be used such as, for example, a file transfer protocol (FTP), HTTP Secure (HTTPS), an HTTP Get request, Asynchronous JavaScript and extensible markup language (XML) (AJAX), etc. In the illustrated example, the media presentation data is transmitted in near real-time (e.g., streamed) to the central facility 170. However, in some examples, the monitoring data may be stored (e.g., cached, buffered, etc.) for a period of time before being transmitted to the central facility 170.

Figure 6:
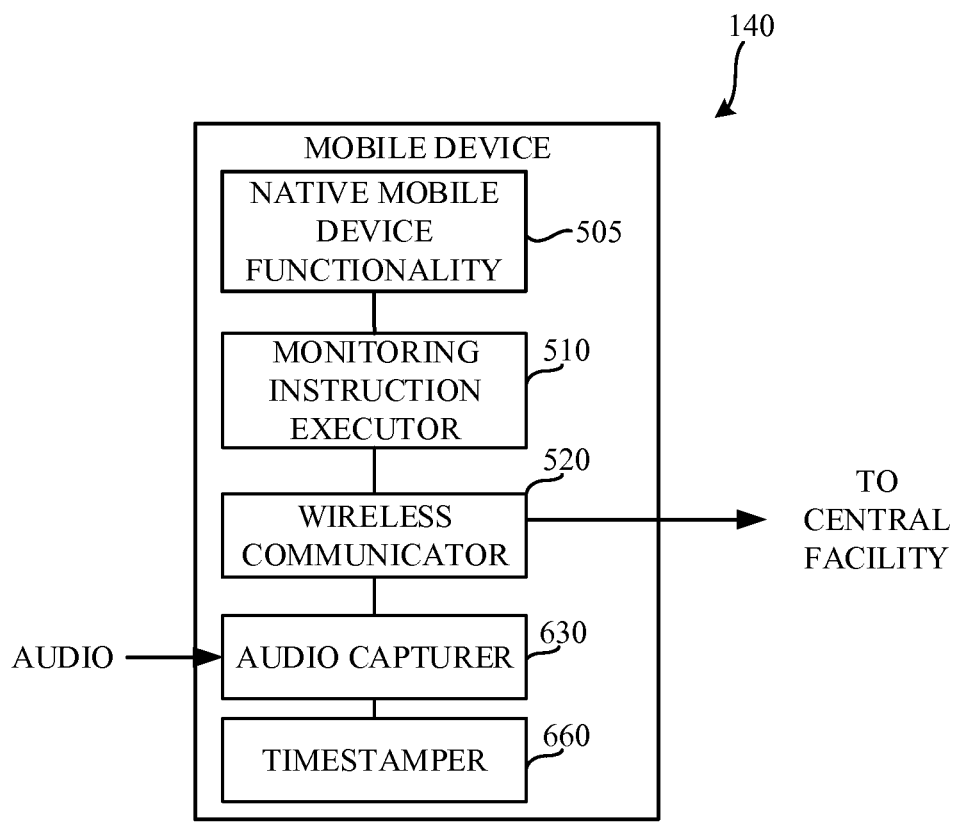
FIG. 6 is a block diagram of an alternative implementation of the example mobile device of FIG. 1.

FIG. 6 is a block diagram of an alternative implementation of the example mobile device 140 of FIG. 1. In addition to the circuitry of the example mobile device 140 of FIG. 5 (numbered in FIG. 6 using the same reference numbers as used in FIG. 5), the example mobile device 140 of the illustrated example of FIG. 6 includes an audio capturer 630 and a timestamper 660.

The example audio capturer 630 of the illustrated example of FIG. 6 is an internal microphone. The microphone receives ambient sound including audible media presented in the vicinity of the mobile device 140. In the illustrated example, the audio samples are short duration samples (e.g., one second, two seconds, etc.). In some examples, the audio samples are only collected when permission to collect such samples is given. Permission for collection of the audio samples may be given, for example, upon installation of an app containing the monitoring instruction executor 510. In the illustrated example, the collected audio samples are transmitted to the central facility 170 and are compared with audio samples transmitted to the central facility 170 by the example fixed device 130. Based on whether the audio samples match, the central facility 170 can determine whether the mobile device 140 was within presentation proximity of the fixed device 130.

The example timestamper 660 of the illustrated example of FIG. 6 generates a timestamp indicative of a date and/or time that an event occurred (e.g., a monitoring instruction was executed, an audio sample was captured, etc.) Timestamping (e.g., applying a time to an event) enables accurate identification of when the mobile device 140 was/is physically present at the media presentation location 120 and/or in presentation proximity to a fixed device 130 of the media presentation location 120. In the illustrated example, the timestamper 660 determines the date and/or time using a clock of the mobile device 140. However, in some examples, the timestamper 660 determines the date and/or time by requesting the date and/or time from an external time source, such as a National Institute of Standards and Technology (NIST) Internet Time Service (ITS) server. However, any other approach to determining a timestamp may additionally or alternatively be used.

Figure 7:
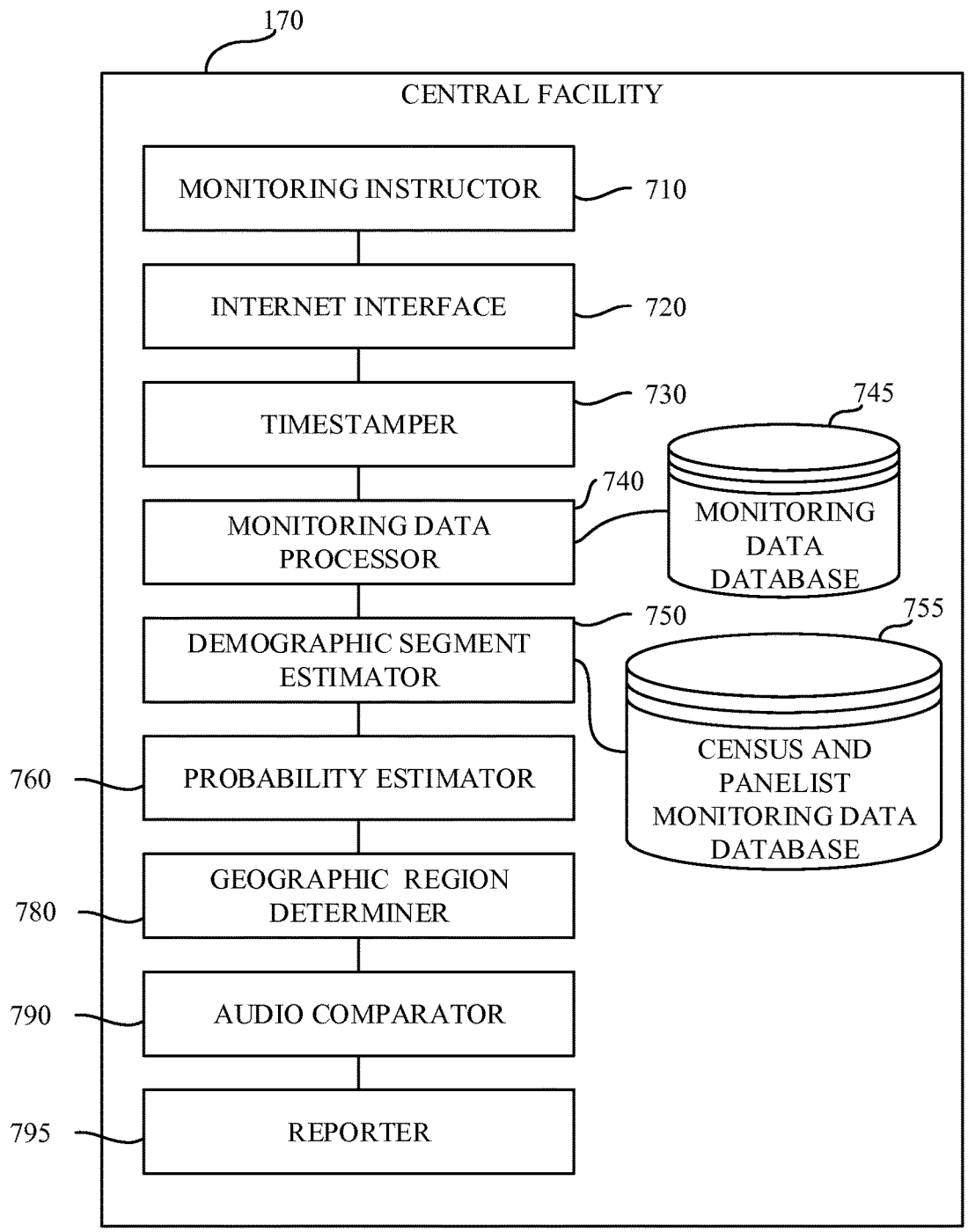
FIG. 7 is a block diagram of an example implementation of the example central facility of FIG. 1.

FIG. 7 is a block diagram of an example implementation of the example central facility 170 of FIG. 1. The example central facility 170 includes a monitoring instructor 710, an Internet interface 720, a timestamper 730, a monitoring data processor 740, a monitoring data database 745, a demographic segment estimator 750, a census and panelist monitoring data database 755, a probability estimator 760, a geographic region determiner 780, an audio comparator 790, and a reporter 795.

The example monitoring instructor 710 of the illustrated example of FIG. 7 provides monitoring instructions (e.g., in an SDK) to the manufacturer 110 and/or media provider(s) 115. In the illustrated example, the example monitoring instructor 710 instructs the manufacturer 110 to cause fixed devices that are created, sold, and/or developed by the manufacturer 110 to report a public IP address of the fixed device 130 to the central facility 170. In the illustrated example, the example monitoring instructor 710 provides monitoring instructions (e.g., in an SDK) to the media provider(s) 115 for delivery to the mobile device(s) 140 (e.g., by associating the instructions in their media, by including monitoring instructions in an app, etc.). The monitoring instructions, when executed by the mobile device 140, cause the mobile device 140 to report monitoring data to the central facility 170.

The example Internet interface 720 of the illustrated example of FIG. 7 receives messages that include monitoring data from the fixed device 130 and/or the mobile device 140. In the illustrated example, the monitoring data received from the fixed device 130 includes, for example, a public IP address of the fixed device 130, an indication of the number and/or identification of devices present on the same local area network as the fixed device 130, an identification of media presented at and/or within presentation proximity of the fixed device 130, etc. In the illustrated example, the monitoring data received from the mobile device 140 includes, for example, an identifier of the mobile device, a public IP address of the mobile device, an identification of media presented at the mobile device 140 (e.g., a website identified by, for example, a universal resource locator (URL), a domain name, etc.), an audio sample of audio presented within the vicinity of the mobile device 140, etc.

The example timestamper 730 of the illustrated example of FIG. 7 generates a timestamp indicative of a date and/or time that an event occurred (e.g., monitoring data was received, etc.) Timestamping (e.g., applying a time to an event) enables accurate determinations to be made concerning whether the mobile device 140 was within the media presentation location 120 at a particular time because, for example, data from the mobile device and the fixed device are compared when such timestamps are in alignment. In the illustrated example, the timestamper 730 determines the date and/or time using a clock of the central facility 170. However, in some examples, the timestamper 730 determines the date and/or time by requesting the date and/or time from an external time source, such as a National Institute of Standards and Technology (NIST) Internet Time Service (ITS) server. However, any other approach to determining a timestamp may additionally or alternatively be used.

The example monitoring data processor 740 of the illustrated example of FIG. 7 creates associations of mobile devices with fixed devices based on patterns identified in the monitoring data received via the Internet interface 720. Based on the created associations, the monitoring data processor 740 analyzes patterns within the monitoring data to determine a probability that the mobile device 130 is physically present at the same location as the fixed device 140 (e.g., within the media presentation location). For example, the monitoring data processor 740 may analyze a history of public IP addresses used by the mobile device 140 to determine whether the mobile device 140 was communicating via the home access point 122 (e.g., the mobile device 140 was within the media presentation location 120) or via a non-home access point (e.g., the non-home access point 124) (e.g., the mobile device 140 was not within the media presentation location 120).

The example monitoring data database 745 of the illustrated example of FIG. 7 may be implemented by any device for storing data such as, for example, flash memory, magnetic media, optical media, etc. Furthermore, the data stored in the monitoring data database 745 may be in any format such as, for example, binary data, comma separated data, tab delimited data, structured query language (SQL) structures, etc. While, in the illustrated example, the monitoring data database 745 is illustrated as a single database, the example monitoring data database 745 may be implemented by any number and/or type(s) of database(s). The example monitoring data database 745 stores monitoring data received from the fixed device 130 and monitoring data received from the mobile device 140. In the illustrated example, the example monitoring data database 745 stores processed monitoring data during analysis of the monitoring data received from the mobile and fixed devices and/or results of such analysis.

The example demographic segment estimator 750 of the illustrated example of FIG. 7 estimates a demographic segment of a user associated with the mobile device 140. In the illustrated example of FIG. 7, the example demographic segment estimator 750 estimates the demographic segment of a user of the mobile device by aggregating identifiers of media presented by the mobile device and comparing the aggregated identifiers to patterns of users having a known demographic to determine if the media habits of the mobile device matched those of the known user. Identification of the demographic segment of a user of the mobile device (instead of the demographic segment of a user of the fixed device) enables more accurate identification of the demographic segment because a single user is typically associated with a mobile device whereas multiple users are associated with a fixed device. In the illustrated example, the known demographics of the known user are stored in the example census and panelist monitoring data database 755. The known demographic data is stored as a result of other monitoring efforts such as, for example, panelist monitoring systems (e.g., by requesting demographic data from panelists when the register for a panel). In some examples, the device type of the mobile device 140 is additionally or alternatively used when estimating demographic segments of user mode device. Different device types may, in some examples, be more closely related to different demographic segments. For example, a user of an Apple iPad made provide a strong indication that the user is a Caucasian male between the ages of 18 and 24. In the illustrated example, while monitoring data received from the mobile device is used to estimate the demographic segment of the user associated with the mobile device, any other identifiers and/or considerations may be used to estimate the demographic segment such as, for example, a location of the mobile device, a carrier (e.g., an Internet Service Provider) used by the device, a version number of the device, etc.

In some examples, instead of or in addition to consulting the census and panelist monitoring data database 755, the example demographic segment estimator 750 consults a database proprietor (e.g., a social network provider such as Facebook) in accordance with the teachings of Mazumdar, U.S. Pat. No. 8,370,489, which is hereby incorporated by reference in its entirety. In such an example, the example demographic segment estimator 750 may consult the example census and panelist monitoring data database 755 to verify and/or adjust the estimated demographic segment.

The example census and panelist monitoring database 755 of the illustrated example of FIG. 7 may be implemented by any device for storing data such as, for example, flash memory, magnetic media, optical media, etc. Furthermore, the data stored in the example census and panelist monitoring database 755 may be in any format such as, for example, binary data, comma separated data, tab delimited data, structured query language (SQL) structures, etc. While, in the illustrated example, the example census and panelist monitoring database 755 is illustrated as a single database, the example census and panelist monitoring database 755 may be implemented by any number and/or type(s) of database(s). The data stored in the example census and panelist monitoring data database 755 enables the demographic segment estimator 750 to estimate a demographic segment of a user of a mobile device based on the monitoring data received in association with that mobile device.

The example probability estimator 760 of the illustrated example of FIG. 7 estimates a probability that a user of a mobile device (associated with an estimated demographic segment) is within the media presentation location 120. In the illustrated example of FIG. 7, the probability estimator 760 estimates the probability that the user is within the media presentation location by aggregating monitoring data associated with the mobile device and classifying usage identified in the monitoring data as having occurred within the media presentation location or as having occurred outside the meeting presentation location. In the illustrated example, the probability estimator 760 separate the aggregated information into time blocks. In the illustrated example, the time blocks are fifteen minute increments. However, any other duration may alternatively be used. Within each time block, the probability estimator 760 computes a ratio (e.g., a probability) of communications that originated from a public IP address matching that of the fixed device to communications that do not originate from that public IP address matching the fixed device.

In some examples where media monitoring information of the fixed device is reported to the central facility, the example probability estimator 760 estimates the probability that person(s) in a particular demographic segment were present during an identified media presentation. The example probability estimator 760 of FIG. 7 performs such estimation by identifying a baseline probability that a particular demographic was exposed to the media, and modifying the baseline probability based on the known and/or estimated location of the mobile device.

While the compared data gives an indication of whether a mobile device was present at a media presentation location, a user of a mobile device is not likely to permanently carry that device. For example, the mobile device may be forgotten at home when the user leaves for work, the mobile device may be misplaced, the mobile device may be left in another room while at home to charge a battery of the mobile device, etc. As such, while the location of the mobile device provides a strong indication of the location of a user of the mobile device, there are exceptions where the location of the mobile device is not an accurate indication of the location of the user.

For example, if the probability estimator determines that, at the same time a media presentation occurred at a fixed device, the mobile device associated with the fixed device was not at the media presentation location (e.g., the mobile device was known to be at a different location), the probability estimator 760 may decrease the probability that the demographic segment of the user associated with the mobile device was present for the identified media presentation. Conversely, if the mobile device was at the media presentation location associated with the fixed device, the probability estimator 760 may increase the probability that the demographic segment of the user associated with the mobile device was present for the identified media presentation. Moreover, if the probability estimator determines that the mobile device is at the media presentation location, but is in a room separate from the fixed device, the probability estimator 760 may increase the probability that the demographic segment of the user associated with the mobile device was present for the identified media presentation to a lesser extent than if the mobile device was detected in the same room as the fixed device. Finally, if the location of the mobile device is unknown, the probability estimator 760 may modify the probability that the demographic segment of the user associated with the mobile device was present for the media presentation based on the estimated probability that the user was at home.

The example geographic region determiner 780 of the illustrated example of FIG. 7 determines the geographic region of the fixed device 130. In the illustrated example, the geographic region determiner 780 determines the geographic region of the fixed device by performing an IP address to location lookup. In the illustrated example, geographic region determiner 780 uses the public IP address of the fixed device 130 for the lookup. In the illustrated example, the example geographic region determiner 780 performs the lookup against a database containing geographic location to IP address information. An example database containing such information may be hosted by, for example, an Internet Service Provider (ISP), an Internet registry (e.g., the American Registry for Internet Numbers (ARIN)), etc. In some examples, the database containing the geographic location to IP address information is stored in the census and panelist monitoring data database 755 and is based on, for example, location information provided by panelists (e.g., when providing demographic information when joining a panel). In the illustrated example, the location resulting from the lookup is a global positioning system (GPS) coordinate. Using the identified coordinates, the geographic region determiner 780 of the example of FIG. 7 identifies a geographic region (e.g., a zip code) of the location. In some examples, probabilities of whether a demographic segment is physically present in a media presentation location are aggregated by zip code (e.g., by accessing the PRIZM database, by averaging probabilities among different fixed devices within the zip code). The aggregated probabilities are useful to advertisers because advertisers may modify what advertisements are presented in a particular region based on who is expected to be within a media presentation location in the geographic region. For example, advertisers may target advertisements towards demographic segment 1 in Chicago, Ill., between the hours of 1 PM and 4 PM, because people in demographic segment 1 are the most likely demographic segment to be home during that time window.

The example audio comparator 790 of the illustrated example of FIG. 7 compares audio samples to assist in determining whether the mobile device was present within a media presentation location at a particular time. In the illustrated example, the audio comparator 790 calculates a similarity score between audio received from a fixed device and audio received from a mobile device. When used in combination with other location information (e.g., the public IP address of the mobile device matches the public IP address of the fixed device), the similarity score can be used to identify whether the mobile device was physically present within the media presentation location and/or within presentation proximity of the fixed device. As used herein, the audio received from the fixed device and the audio received from the mobile device are compared when timestamps associated with the received audio represent approximately the same time. As used herein, timestamps represent the same time when the timestamps represent times within one second of each other. This approach is useful because, even if the mobile device is in a different location and is presented with the same media as is presented at the fixed device, it is likely that there will be other recorded variations in the audio sample (e.g., external noises such as a conversation, other media, etc.). In such an example, even if the same media were presented, the audio samples are unlikely to be a perfect match to each other. If the similarity score meets or exceeds a similarity threshold, the example audio comparator determines that the mobile device within presentation proximity of the fixed device (e.g., within the media presentation location). If a similarity score does not meet or exceed the similarity threshold, the example audio comparator 790 determines that the mobile device was not within presentation proximity of the fixed device (e.g., was not within the media presentation location 120).

The example reporter 795 of the illustrated example of FIG. 7 prepares a report concerning whether a demographic segment is expected to be within a particular media presentation location at a particular time. In some examples, the report is aggregated to represent whether a demographic segment within a geographic region is expected to be present within at any media presentation location within that geographic region (as opposed to a particular media presentation location) at a particular time. Such reports are useful for advertisers because they enable advertisers to select advertisements that are most likely to have an impact on the demographic population that is exposed to their advertisements. In some examples, the example reporter 795 prepares a report concerning historic media presentation activity. The historic report includes, for example, metrics concerning whether a particular demographic segment was present during a known media presentation. Such a report is useful because it enables media providers to understand the reach of their media.

While an example manner of implementing the example fixed device 130 of FIG. 1 is illustrated in FIGS. 2, 3, and/or 4, an example manner of implementing the example mobile device 140 of FIG. 1 is implemented in FIGS. 5 and/or 6, and an example manner of implementing the example central facility 170 of FIG. 1 is illustrated in FIG. 7, one or more of the elements, processes and/or devices illustrated in FIGS. 1, 2, 3, 4, 5, 6, and/or 7 may be combined, divided, re-arranged, omitted, eliminated and/or implemented in any other way. Further, the example native fixed device functionality 210, the example network communicator 220, the example timestamper 230, the example IP address reporter 240, the example mobile device discoverer 360, the example audio capturer 470, the example media monitor 480, and/or, more generally, the example fixed device of FIGS. 1, 2, 3, and/or 4, the example native mobile device functionality 505, the example monitoring instruction executor 510, the example wireless communicator 520, the example audio capturer 630, the example timestamper 660, and/or, more generally, the example mobile device 140 of FIGS. 1, 5, and/or 6, and/or the example monitoring instructor 710, the example Internet interface 720, the example timestamper 730, the example monitoring data processor 740, the example demographic segment estimator 750, the example probability estimator 760, the example geographic region determiner 780, the example audio comparator 790, the example reporter 795, and/or, more generally, the example central facility 170 of FIGS. 1 and/or 7 may be implemented by hardware, software, firmware and/or any combination of hardware, software and/or firmware. Thus, for example, any of the example native fixed device functionality 210, the example network communicator 220, the example timestamper 230, the example IP address reporter 240, the example mobile device discoverer 360, the example audio capturer 470, the example media monitor 480, and/or, more generally, the example fixed device of FIGS. 1, 2, 3, and/or 4, the example native mobile device functionality 505, the example monitoring instruction executor 510, the example wireless communicator 520, the example audio capturer 630, the example timestamper 660, and/or, more generally, the example mobile device 140 of FIGS. 1, 5, and/or 6, and/or the example monitoring instructor 710, the example Internet interface 720, the example timestamper 730, the example monitoring data processor 740, the example demographic segment estimator 750, the example probability estimator 760, the example geographic region determiner 780, the example audio comparator 790, the example reporter 795, and/or, more generally, the example central facility 170 of FIGS. 1 and/or 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example native fixed device functionality 210, the example network communicator 220, the example timestamper 230, the example IP address reporter 240, the example mobile device discoverer 360, the example audio capturer 470, the example media monitor 480, and/or, more generally, the example fixed device of FIGS. 1, 2, 3, and/or 4, the example native mobile device functionality 505, the example monitoring instruction executor 510, the example wireless communicator 520, the example audio capturer 630, the example timestamper 660, and/or, more generally, the example mobile device 140 of FIGS. 1, 5, and/or 6, and/or the example monitoring instructor 710, the example Internet interface 720, the example timestamper 730, the example monitoring data processor 740, the example demographic segment estimator 750, the example probability estimator 760, the example geographic region determiner 780, the example audio comparator 790, the example reporter 795, and/or, more generally, the example central facility 170 of FIGS. 1 and/or 7 is/are hereby expressly defined to include a tangible computer readable storage device or storage disk such as a memory, a digital versatile disk (DVD), a compact disk (CD), a Blu-ray disk, etc. storing the software and/or firmware. Further still, the example fixed device 130 of FIGS. 1, 2, 3, and/or 4, the example mobile device 140 of FIGS. 1, 5, and/or 6, and/or the example central facility 170 of FIGS. 1 and/or 7 may include one or more elements, processes and/or devices in addition to, or instead of, those illustrated in FIGS. 1, 2, 3, 4, 5, 6, and/or 7, and/or may include more than one of any or all of the illustrated elements, processes and devices.

Figure 8:
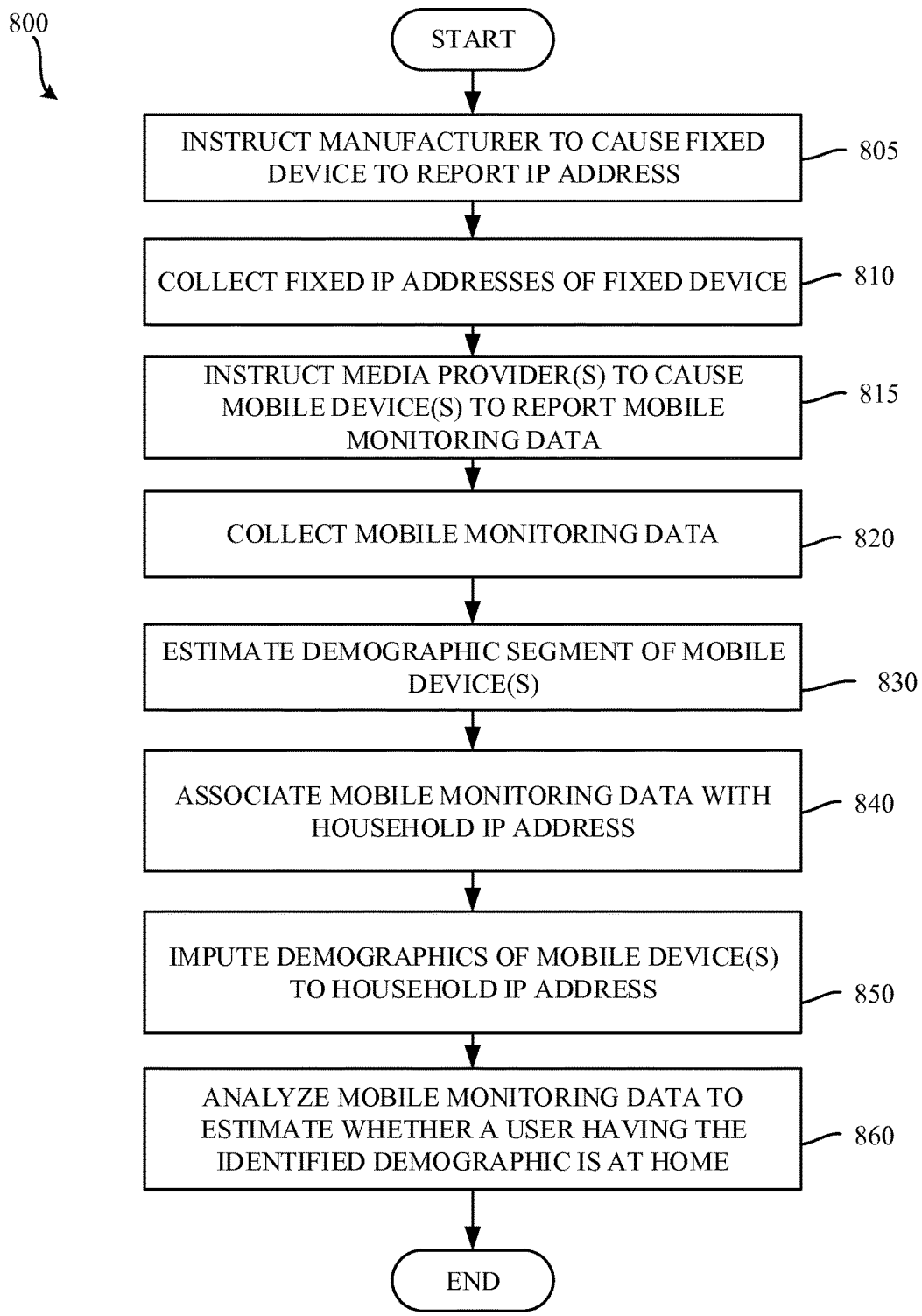
FIG. 8 is a flowchart representative of example machine-readable instructions which may be executed by the example central facility of FIGS. 1 and/or 7.
Figure 9:
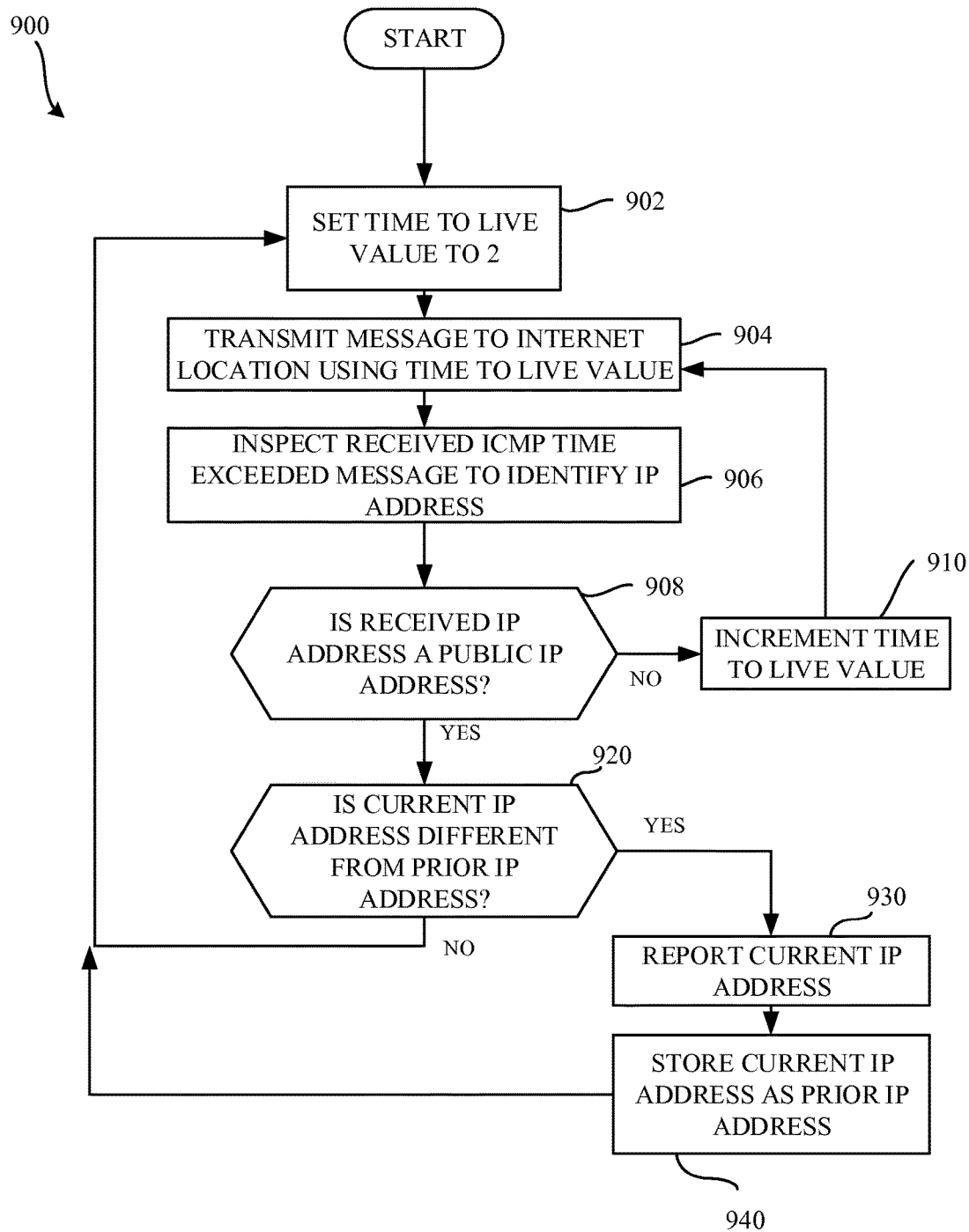
FIG. 9 is a flowchart representative of example machine-readable instructions which may be executed by the example fixed device of FIGS. 1, 2, 3, and/or 4 to report an IP address.
Figure 12:
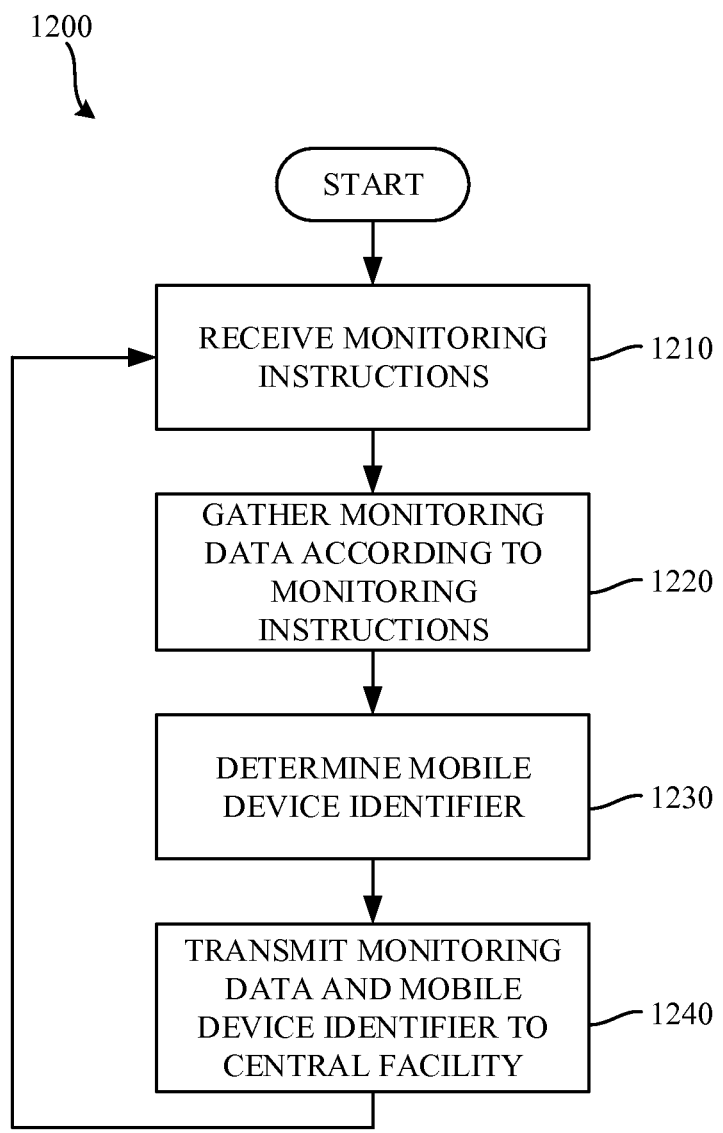
FIG. 12 is a flowchart representative of example machine-readable instructions which may be executed by the example mobile device of FIGS. 1, 5, and/or 6 to report monitoring data to the central facility of FIGS. 1 and/or 7.
Figure 23:
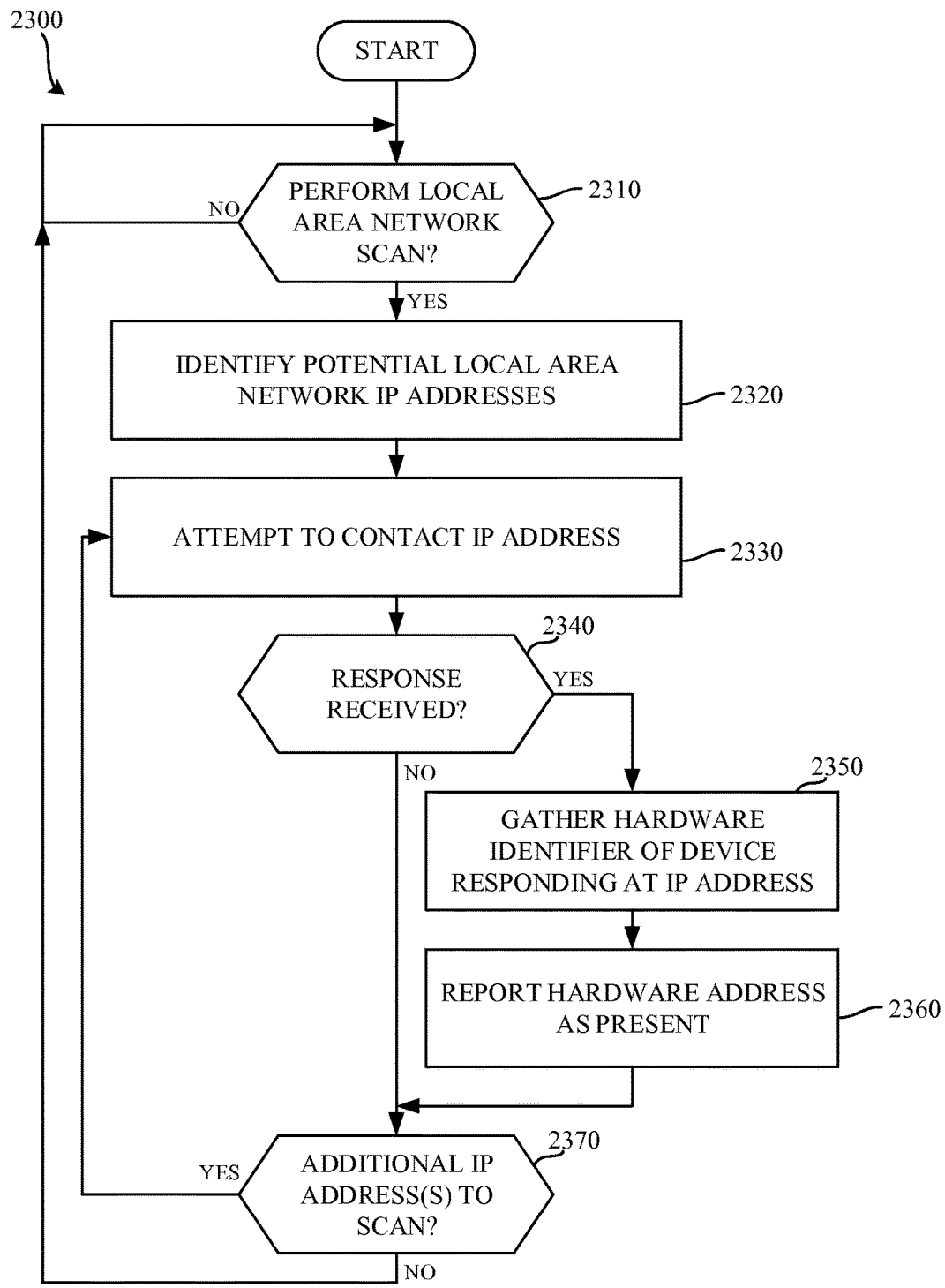
FIG. 23 is a flowchart representative of example machine-readable instructions which may be executed by the example fixed device of FIGS. 1, 2, 3, and/or 4 to perform a scan of a local area network.
Figure 26:
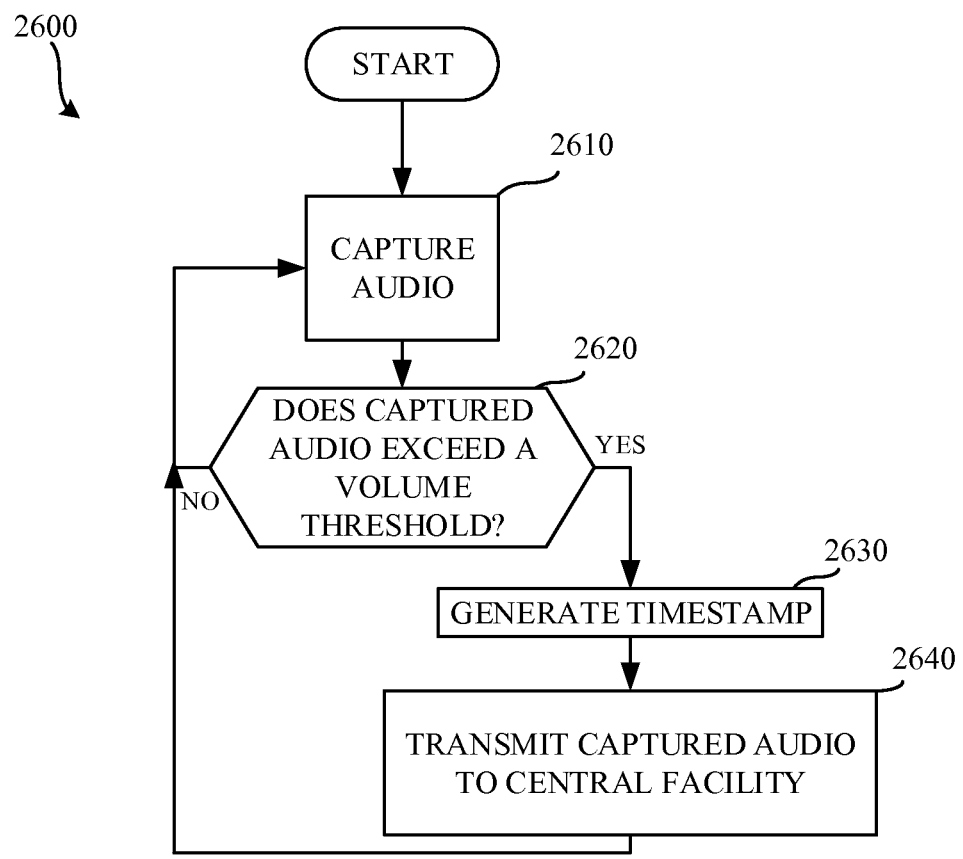
FIG. 26 is a flowchart representative of example machine-readable instructions which may be executed by the example fixed device 130 of FIGS. 1, 2, 3, and/or 4 to capture audio and relay the captured audio to the central facility 170 of FIGS. 1 and/or 7.

Flowcharts representative of example machine readable instructions for implementing the example fixed device 130 of FIGS. 1, 2, 3, and/or 4 are shown in FIGS. 9, 23, 26, and/or 30. Flowcharts representative of example machine-readable instructions for implementing the example mobile device 140 of FIGS. 1, 5, and/or 6 are shown in FIGS. 12 and/or 27. Flowcharts representative of example machine readable instructions for implementing the example central facility 170 of FIGS. 1 and/or 7 are shown in FIGS. 8, 10, 13, 15, 17, 17A, 19, 21, 24, 28, and/or 32. In these examples, the machine readable instructions comprise a program(s) for execution by a processor such as the processor 3512 shown in the example processor platform 3500 discussed below in connection with FIG. 35, the processor 3612 shown in the example processor platform 3600 discussed below in connection with FIG. 36, and/or the processor 3712 shown in the example processor platform 3700 discussed below in connection with FIG. 37. The program may be embodied in software stored on a tangible computer readable storage medium such as a CD-ROM, a floppy disk, a hard drive, a digital versatile disk (DVD), a Blu-ray disk, or a memory associated with the processor 3512, 3612, 3712, but the entire program and/or parts thereof could alternatively be executed by a device other than the processor 3512, 3612, 3712 and/or embodied in firmware or dedicated hardware. Further, although the example program is described with reference to the flowcharts illustrated in FIGS. 8, 9, 10, 12, 13, 15, 17, 17A, 19, 21, 23, 24, 26, 27, 28, 30, and/or 32, many other methods of implementing the example fixed device 130, the example mobile device 140, and/or the example central facility 170 may alternatively be used. For example, the order of execution of the blocks may be changed, and/or some of the blocks described may be changed, eliminated, or combined.

As mentioned above, the example processes of FIGS. 8, 9, 10, 12, 13, 15, 17, 17A, 19, 21, 23, 24, 26, 27, 28, 30, and/or 32 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 8, 9, 10, 12, 13, 15, 17, 17A, 19, 21, 23, 24, 26, 27, 28, 30, and/or 32 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 8 is a flowchart representative of example machine-readable instructions which may be executed by the example central facility 170 of FIGS. 1 and/or 7. The example process 800 of FIG. 8 represents an end-to-end procedure that may be performed by the central facility 170 to correlate a demographic segment of a mobile device with a fixed device. The example process 800 of the illustrated example of FIG. 8 begins when the example central facility 170 instructs the manufacturer 110 to implement the fixed device 130 to report a public IP address of the fixed device. (Block 805). In the illustrated example, the instructions include an SDK for implementation as part of the fixed device. However, in some examples, the instructions instruct the manufacturer 110 to implement the fixed device to interact with a cloud API of the central facility 170.

As a result of the implementation, the example central facility 170 collects IP address(es) associated with fixed devices. (Block 810). In the illustrated example, the central facility 170 receives the IP address information from the fixed devices as a result of the IP address reporter 240 transmitting the IP address information to the central facility 170. However, in some examples, the example fixed device(s) 130 transmit the IP address information to the manufacturer 110, and the manufacturer relays the information to the central facility 170. In some examples, instead of autonomously receiving information from the manufacturer 110, the central facility 170 requests the data from the manufacturer 110. An example procedure for collecting IP addresses from fixed devices is further described in connection with FIG. 10.

In the illustrated example, the central facility 170 provides instructions to media provider(s) 115 who, when presenting media to the mobile device 140, include monitoring instructions that cause the mobile device 140 to collect monitoring data and transmit the monitoring data to the central facility 170. (Block 815). In the illustrated example, the instructions provided to the media provider(s) 115 are part of an SDK. In the illustrated example, the media provider(s) 115 provide JavaScript instructions to the mobile device 140 to cause the mobile device to collect and transmit the monitoring data to the central facility 170. However, in some examples, the instructions are part of an application that is transmitted to and/or otherwise installed on the mobile device 140. The example central facility 170 of the illustrated example collects mobile monitoring data from mobile device(s). (Block 820). An example procedure for collecting mobile monitoring data is further described in connection with FIG. 13.

The example central facility 170 analyzes the mobile monitoring data associated with a given mobile device to estimate a demographic segment of a user of that mobile device. (Block 830). In the illustrated example, the central facility 170 consults prior census and/or panelist monitoring data to identify a likely demographic segment of the user of the mobile device. This process is repeated for each mobile device identified in the collected data. An example procedure for estimating the demographic segment is further described in connection with FIG. 15.

The example central facility 170 associates mobile devices with a respective one of the fixed devices. (Block 840). In the illustrated example, the association of a mobile device with a fixed device is based on mobile monitoring data received from the mobile device under analysis and the public IP address(es) received from the fixed devices. When, for example the mobile device under analysis frequently uses the same public IP address as a certain one of the fixed devices, the central facility identifies that mobile device as associated with that certain one of the fixed devices having the same public IP address. The process of block 840 is repeated for each mobile device identified in the collected data. An example procedure for associating a mobile device with a fixed device is further described in connection with FIG. 17. Having associated mobile devices with a respective one of the fixed devices (Block 840) and estimated demographic segment(s) of the mobile device(s) (Block 830), the central facility 170 imputes demographic segments of the mobile devices to the fixed devices. (Block 850). In the illustrated example, the demographic segments are imputed by retrieving the demographic segment(s) of the mobile device(s) and associating them with the corresponding fixed device(s) stored in the monitoring data database 745. In some examples, the association(s) of the fixed device with the mobile device(s) and/or the demographic segment(s) is permanent. However, in practice, devices may be sold (e.g., may be used by different users), users may begin to exhibit different habits than they previously exhibited (e.g., the user may be come associated with a different demographic, the user may no longer frequent a particular location, etc.). As such, the associations of the mobile device and fixed device may be periodically and/or a-periodically re-evaluated to ensure that the associations are current.

The example central facility 170 analyzes mobile monitoring data received from a given mobile device to estimate whether the user and, thus, the demographic segment identified as associated with the user of the given mobile device, is physically present at a media presentation location of the associated fixed device. (Block 860). In the illustrated example, the mobile monitoring data is used to determine whether the mobile devices are present. However, any other approach for determining whether a mobile device is physically present at a same location as a fixed device may additionally or alternatively be used. For example, audio segments respectively captured by the fixed device 130 and the mobile device 140 may be compared to determine whether the mobile device 140 is within presentation proximity of the fixed device 130. Moreover, the fixed device 130 may perform a network scan to determine whether the mobile device is in communication with a home access point 122 that is used by the fixed device 130. An example procedure for analyzing mobile monitoring data is further described in connection with FIG. 19. The analysis of block 860 is repeated for each mobile device identified in the collected data.

FIG. 9 is a flowchart representative of example machine-readable instructions which may be executed by the example fixed device 130 of FIGS. 1, 2, 3, and/or 4 to report an IP address. The example process 900 of the illustrated example of FIG. 9 begins when the IP address reporter 240 sets a time to live (TTL) value of a message to be sent to an Internet location to an initial start value (e.g., two). (Block 902). As noted above, a TTL value of two is used as the initial start value because there is typically one router (e.g., the home access point 122) between the fixed device 130 and a router that reports the public IP address. The IP address reporter 240 transmits a test message to an Internet location (e.g., the manufacturer 110, the central facility 170, the media provider 115, etc.) and awaits a response. (Block 904). As the test message is transmitted towards its destination, each intervening router reduces the TTL value until the TTL value reaches zero. When the TTL value reaches zero, the router decrementing the TTL value to zero transmits an Internet Control Message Protocol (ICMP) time exceeded message back to the source. The ICMP time exceeded message includes an IP address of the router returning the ICMP time exceeded message. The example IP address reporter 240 inspects the received ICMP time exceeded message to identify the IP address of the router that decremented the TTL value to zero. (Block 906).

The IP address reporter 240 determines whether the returned IP address is a public IP address. (Block 908). The example IP address reporter determines whether the IP address is a public address by determining whether the IP address is outside a range of IP addresses that are defined to be private IP addresses by the Internet Assigned Numbers Authority (IRNA). If the address is not a public address (e.g., the address is a private address), the example IP address reporter increments the TTL value to a new value one larger than the previously used TTL value (e.g., the initial start value if this is the second test message to be sent) (Block 910) and transmits a subsequent message using the incremented TTL value. (Block 904). Thus, for example, if the initial TTL start value was two and a second test message is to be sent, the TTL value is set to three for the next test message. If a third test message is to be sent, the TTL value of the third message is set to four (i.e., one higher than the TTL value of the prior message). This procedure is repeated until a public IP address is returned from a router reducing the TTL value of the corresponding test message to zero. The public IP address returned by this process is the public IP address used by the fixed device. However, any other past, present, and/or future approach to determining a public IP address used by fixed device may additionally or alternatively be used.

The example IP address reporter 240 determines whether the current public IP address of the fixed device is different from a prior public IP address of the fixed device. (Block 920). In the illustrated example, the IP address reporter 240 consults the current IP address data store 250 to determine whether the current public IP address of the fixed device matches the prior public IP address of the fixed device. If the current IP address matches the prior IP address (e.g., the IP address has not changed), control returns to block 902, and the example IP address reporter 240 continues to monitor the current IP address of the fixed device 130. In some examples, the IP address determiner 240 waits until a threshold amount of time has elapsed before performing the determination of the public IP address again. If the current public IP address does not match the prior public IP address (e.g., the IP address has changed) (Block 920), the IP address reporter 240 reports the current public IP address to the central facility 170. (Block 930). In the illustrated example, the IP address reporter 240 reports the new public IP address by transmitting an HTTP message to the central facility that includes a fixed device identifier such as, for example, a serial number of the fixed device, a hardware address of the fixed device, a device name, and the new public IP address. In the illustrated example, the fixed device identifier is set by the manufacturer 110. However any other approach to identifying the fixed device may additionally or alternatively be used.

The IP address reporter 240 stores the current public IP address as the prior public IP address in the current IP address data store 250. (Block 940.) Storing the current public IP address is done for later comparison so that the public IP address is only transmitted to the central facility when it changes. This has the effect of reducing the overall amount of data transmitted from the fixed device to the central facility 170. However, any other approach to transmitting IP address from the fixed device to the central facility 170 may additionally or alternatively be used. For example, the IP address may be periodically transmitted to the central facility (e.g., without regard to whether the IP address has changed).

Figure 10:
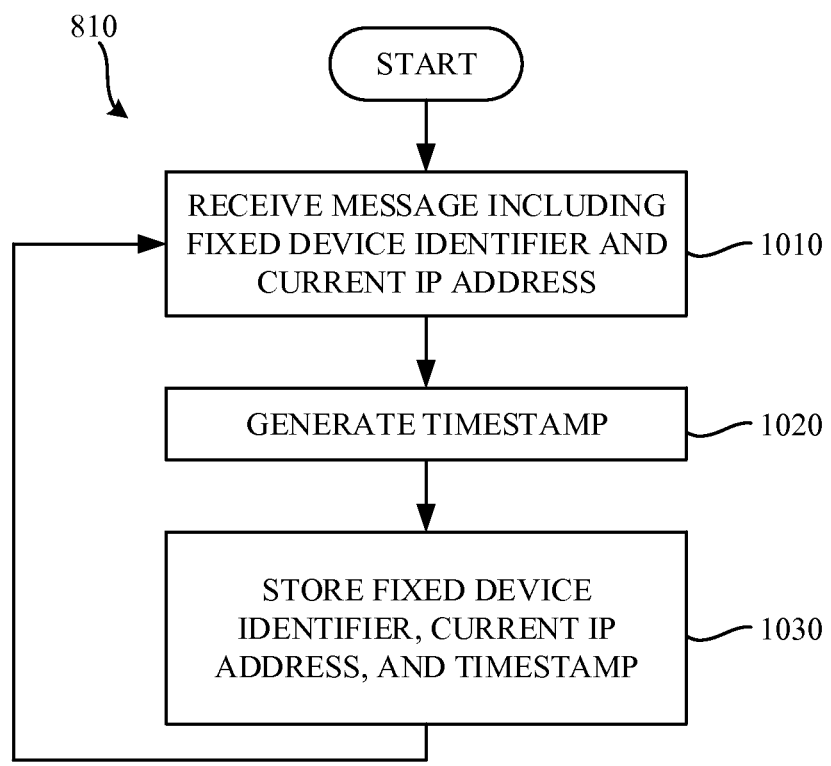
FIG. 10 is a flowchart representative of example machine-readable instructions which may be executed by the example central facility of FIGS. 1 and/or 7 to receive a reported IP address from the fixed device of FIGS. 1, 2, 3, and/or 4.

FIG. 10 is a flowchart representative of example machine-readable instructions which may be executed by the example central facility 170 of FIGS. 1 and/or 7 to receive a reported IP address from the fixed device 130 of FIGS. 1, 2, 3, and/or 4. The example process 810 of the illustrated example of FIG. 10 begins when the Internet interface 720 receives a message from the fixed device identifying the current public IP address of the fixed device 130. (Block 1010). In the illustrated example, the messages are HTTP messages. However, any other past, present, and/or future type of message may additionally or alternatively be used. In the illustrated example, the received message includes the current public IP address and a fixed device identifier of the corresponding fixed device. However, the message may include any other data from the fixed device such as, for example, a software version of the fixed device, a manufacturer name, etc.

The example timestamper 730 then generates a timestamp. (Block 1020). In the illustrated example, the timestamp represents the time at which the message was received by the central facility 170. In some examples, the public IP address used by the fixed device 130 may be dynamic and may change over time. As such, the central facility uses the timestamp to indicate time intervals at which the fixed device was using a particular IP address.

The example monitoring data processor 740 then stores the fixed device identifier, the current public IP address, and the timestamp in the monitoring data database 745. (Block 1030). An example data table 1100 is shown in the example of FIG. 11 and illustrates example data that may be stored by the example monitoring data processor 740.

FIG. 11 is an example data table that may be stored by the example central facility 170 of FIGS. 1 and/or 7 based on the received IP address(es) from the fixed device 130 of FIGS. 1, 2, 3, and/or 4. The example data table 1100 of the illustrated example of FIG. 11 includes a fixed device identifier column 1110, an IP address column 1120, and a timestamp column 1130. The example data table 1100 includes three example rows 1140, 1150, 1160 that illustrate example data that may be stored in the monitoring data database 745. While in the illustrated example, three rows are shown for the sake of ease of explanation, in practice, the example Internet interface 720 will store many additional rows accounting for many additional fixed devices reporting their public IP address. In the illustrated example of FIG. 11, the example data table 1100 includes four rows 1140, 1150, 1160, 1161 that correspond to three different fixed devices (e.g., devices respectively corresponding to identifiers FD001, FD002, and FD003). However, in some examples, multiple rows may correspond to the same fixed device and may represent a change(s) of the public IP address used by the fixed device over time. For example, the third row 1160 and the fourth row 1161 correspond to the same fixed device (e.g., the fixed device identified as FD003), and indicate a change of the public IP address used by the fixed device FD003 from 138.108.20.122 to 138.108.20.124.

FIG. 12 is a flowchart representative of example machine-readable instructions which may be executed by the example mobile device 140 of FIGS. 1, 5, and/or 6 to report monitoring data to the central facility 170 of FIGS. 1 and/or 7. The example process 1200 of the illustrated example of FIG. 12 begins when the example monitoring instruction executor 510 of the example mobile device 140 executes a monitoring instruction from a media provider. (Block 1210). In the illustrated example, the monitoring instruction is provided to the monitoring instruction executor 510 as part of accessing a webpage (e.g., as a JavaScript instruction contained in the HTML or referenced by the HTML). However, the monitoring instruction may be provided in any other fashion. For example, the monitoring instruction may be provided as part of an application (e.g., an "app") to be executed by the mobile device 140.

The monitoring instruction executor 510 executes the monitoring instructions to gather monitoring data. (Block 1220). In the illustrated example the monitoring instruction causes the monitoring instruction executor 510 to identify a URL of media that is being presented (e.g., a URL of the webpage). However, the monitoring instructions may cause the monitoring instruction executor 510 to gather any other data such as, for example, a current state of the mobile device (e.g., a current volume level, a current brightness of a display of the mobile device, etc.).

The monitoring instruction executor 510 then determines a mobile device identifier. (Block 1230). In the illustrated example, the mobile device identifier is stored in a memory of the mobile device and is transmitted as cookie data when communicating with the central facility 170. If, for example, the monitoring instruction executor 510 is unable to determine a mobile device identifier, the gathered monitoring data may be transmitted to the central facility 170 without a mobile device identifier.

The wireless communicator 520 then transmits the monitoring data in a mobile device identifier to the central facility 170. (Block 1240). In the illustrated example, the monitoring data and mobile device identifier are transmitted as an HTTP message. However, any other past, present, and/or future approach to transmitting monitoring data to a central facility may additionally or alternatively be used. As noted above, in the illustrated example, the mobile device identifier is transmitted in a header of the HTTP message as cookie data. However, the mobile device identifier may be transmitted in any other fashion such as, for example, within the payload of the HTTP message.

Figure 13:
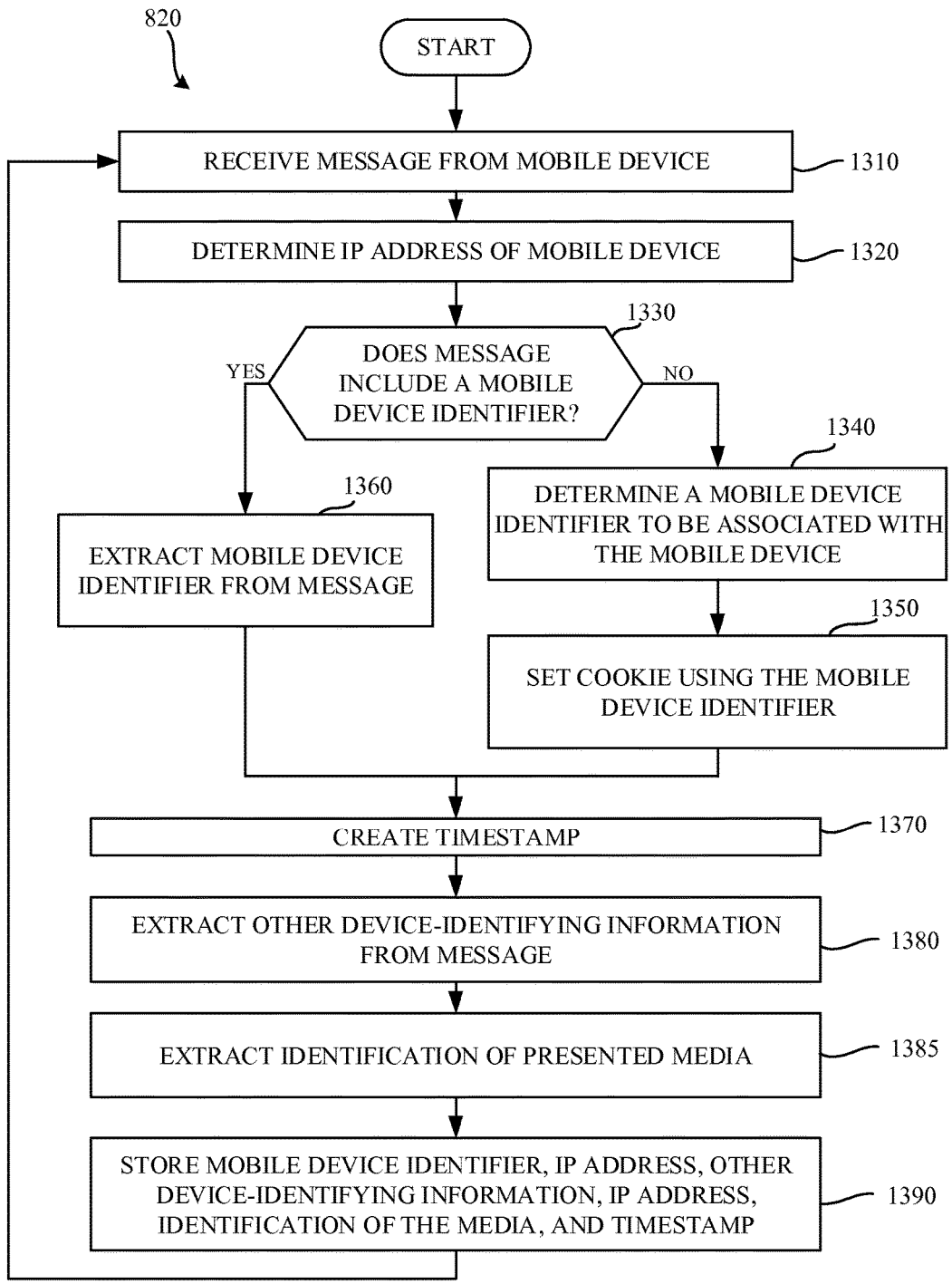
FIG. 13 is a flowchart representative of example machine-readable instructions which may be executed by the example central facility of FIGS. 1 and/or 7 to receive the monitoring data from the example mobile device of FIGS. 1, 5, and/or 6.

FIG. 13 is a flowchart representative of example machine-readable instructions which may be executed by the example central facility 170 of FIGS. 1 and/or 7 to receive the monitoring data from the example mobile device 140 of FIGS. 1, 5, and/or 6. The example process 820 of the illustrated example of FIG. 13 begins when the Internet interface 720 receives an HTTP message from the mobile device. (Block 1310). The monitoring data processor 740 determines a public IP address of the mobile device. (Block 1320). In the illustrated example, the public IP address of the mobile device is the public IP address from which the HTTP message was received. When, for example, the mobile device is using the home access point 122, the public IP address of the mobile device will match the public IP address of the fixed device 130. When, for example, the mobile device is not communicating via the home access point 122 (e.g., the mobile device is communicating via the non-home access point 124) the public IP address of the mobile device will not match the public IP address of the fixed device 130.

The monitoring data processor 740 inspects the message to determine if the message includes a mobile device identifier. (Block 1330). In the illustrated example, the monitoring data processor inspects the header of the received HTTP message for cookie data that indicates the mobile device identifier. However, any other approach to determining whether the message includes a mobile device identifier may additionally or alternatively be used. For example, the payload of the message can be parsed for the identification. If the message includes a mobile device identifier, the example monitoring data processor 740 extracts the mobile device identifier from the message. (Block 1360). If the message does not include a mobile device identifier, the example monitoring data processor 740 determines a mobile device identifier to be associated with the mobile device (Block 1340) by, for example, randomly and/or pseudo-randomly selecting an alphanumeric identifier that is not already associated with another mobile device and recording it in association with the data received from the message. In this example, the monitoring data processor 740 instructs the Internet interface 720 to transmit a message to the mobile device to set a cookie using the determined mobile device identifier. (Block 1350). In subsequent messages, the mobile device 140 will include the mobile device identifier (e.g., the cookie), thereby allowing the monitoring data processor to extract the mobile device identifier from the subsequent message.

Control proceeds from block 1360 or 1350 to block 1370. At block 1370, the example timestamper 730 creates a timestamp at which the message was received from a mobile device. Creating a timestamp indicating when the message was received from a mobile device 140 enables the central facility 170 to determine whether the mobile device 140 was at the media presentation location 120 at the time the message was received.

The monitoring data processor 740 extracts other device identifying information from the message received from the mobile device 140. (Block 1380). In some examples, the HTTP message includes a user agent field in a header of the HTTP message. The user agent field identifies the application (e.g., a browser, an app, etc.) that is transmitting the message. In some examples, the user agent field identifies a type of the mobile device (e.g., an Apple iPad, a Samsung Galaxy, etc.). By extracting the other device identifying information from the user agent field, the monitoring data processor 740 enables identification of the type of mobile device. In some examples, the type of the mobile device is useful when a network scan is performed by the fixed device 130, as the type of the device may be used to identify whether that particular device was present at a time of the network scan (e.g., if no device of that type is present, the mobile device was not present).

The example monitoring data processor 740 inspects the message received from the mobile device to extract identification data identifying the presented media. (Block 1385). In the illustrated example, the identification data for the presented media is a universal resource locator (URL) of the media. However, any other media identifying information may additionally or alternatively be used such as, for example, a domain name, a code, metadata, an ID3 tag, etc.

The example monitoring data processor 740 stores the mobile device identifier, the IP address, the other device identifying information, the identification data identifying the media, and the timestamp in the monitoring data database 745. The example process 820 of FIG. 13 is repeated as messages are received from the mobile device(s). In some examples, multiple instances of the process 820 of FIG. 13 may be executed in parallel (e.g., by executing multiple threads on one or more processing cores and/or virtual machines) to accommodate messages received from the mobile device(s). An example data table 1400 is shown in the illustrated example of FIG. 14 and illustrates example data that may be stored by the monitoring data processor 740 in the example monitoring data database 745.

FIG. 14 is an example data table 1400 that may be populated by the example central facility 170 of FIGS. 1 and/or 7 based on monitoring data received from the example mobile device 140 of FIGS. 1, 5, and/or 6. The example data table 1400 of FIG. 14 includes an example mobile device identifier column 1410, an example mobile device information column 1420, an example IP address column 1430, an identified media column 1440, and an example timestamp column 1450. The example data table 1400 of FIG. 14 includes three sets of rows corresponding to monitoring data received from three different mobile devices (e.g., MD001 (rows 1460), MD002 (rows 1470), and MD003 (rows 1480)). While, in the illustrated example, a limited number of rows are shown for simplicity of explanation, in practice, many additional rows corresponding to monitoring data from many different mobile devices may be stored. In the illustrated example of FIG. 14, the rows 1460 represent monitoring data associated with the mobile device MD001. As shown in the example data table 1400, mobile device MD001 is a Samsung Galaxy S4 that visited ENGADGET.COM and CNN.COM from the IP addresses of 38.98.186.130 and 12.53.64.54. In the illustrated example of FIG. 14, the rows 1470 represent monitoring data associated with the mobile device MD002. As shown in the example data table 1400, mobile device MD002 is an Apple iPhone 5S that visited FACEBOOK.COM, THEONION.COM, and CNN.COM from the IP addresses of 38.98.186.130 and 18.59.84.54. In the illustrated example of FIG. 14, rows 1480 represent monitoring data associated with a mobile device MD003. As shown in the example data table 1400, mobile device MD003 is an Apple iPad that visited MONOPRICE.COM, APPLE.COM, and CNN.COM from the IP address of 201.2.46.51. In the illustrated example, MD001 and MD002 both used the IP address of 39.98.186.130, which (referring to row 1140 of FIG. 11) is associated with fixed device FD001. As such, mobile devices MD001 and MD002 are associated with fixed device FD001.

Figure 15:
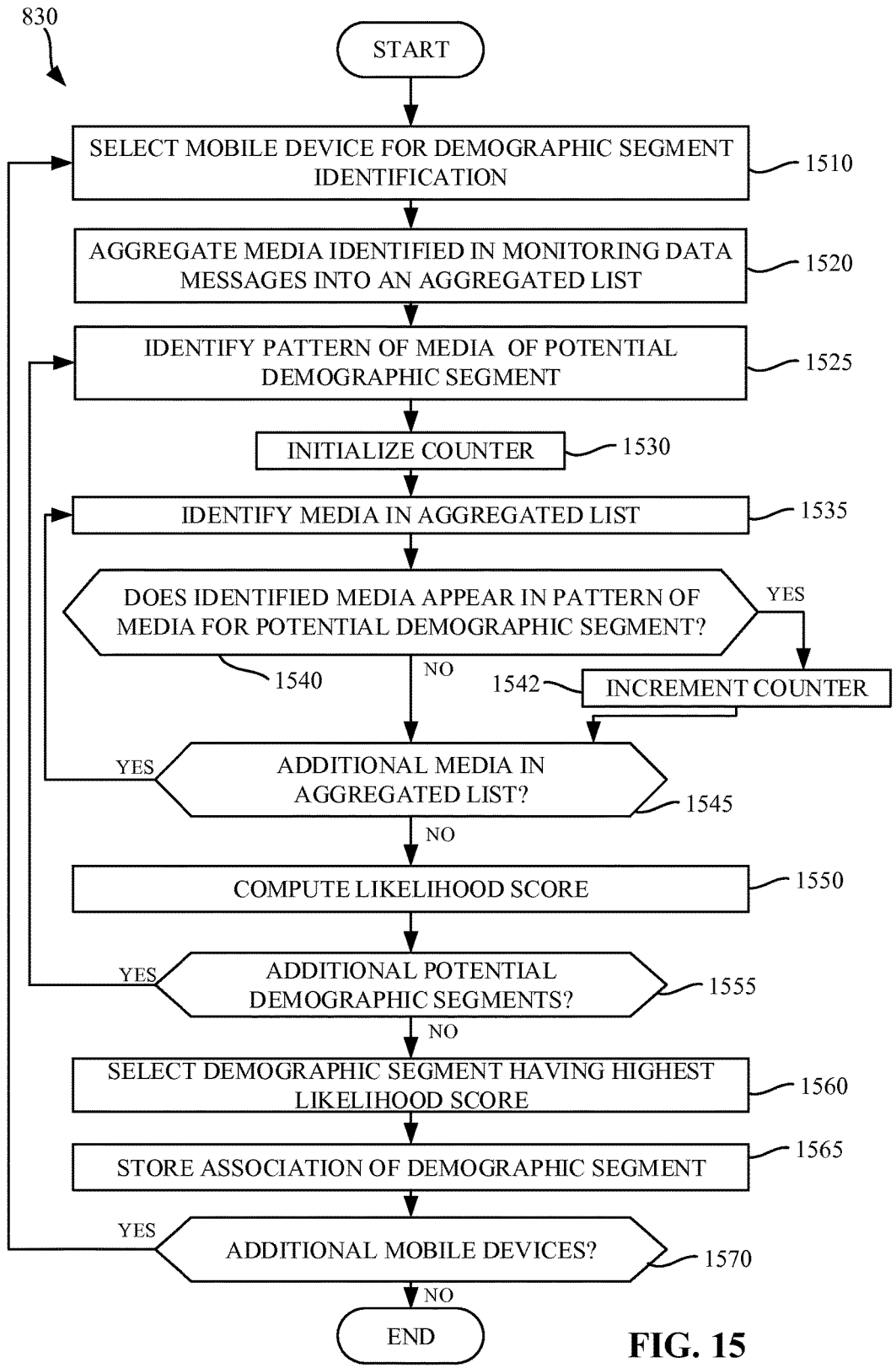
FIG. 15 is a flowchart representative of example machine-readable instructions which may be executed by the example central facility of FIGS. 1 and/or 7 to associate a demographic segment with the mobile device of FIGS. 1, 5, and/or 6 based on the received monitoring data.

FIG. 15 is a flowchart representative of example machine-readable instructions which may be executed by the example central facility 170 of FIGS. 1 and/or 7 to associate a demographic segment with the mobile device 140 of FIGS. 1, 5, and/or 6 based on the received monitoring data. The example process 830 of the illustrated example of FIG. 15 begins when the demographic segment estimator 750 selects a mobile device for demographic segment identification. (Block 1510). In the illustrated example, using the identifier of a given mobile device, the demographic segment estimator 750 aggregates media identified in monitoring data messages received from the mobile device to form an aggregated list. (Block 1520). To form the aggregated list, the example demographic segment estimator 750 selects media identifiers reported in the mobile monitoring data associated with the selected mobile device and removes duplicate media identifiers. For example, if a mobile device visited a particular website multiple times, those multiple website visits are considered a single visit. Aggregating the media reduces the search space of known media habits to demographic segment information. The smaller search space results in processing efficiency as the same media identifiers are not needlessly re-processed.

The example demographic segment estimator 750 selects a pattern of media of a potential demographic segment. (Block 1525). The pattern includes identifiers of different media that are known to be associated with the potential demographic segment. Example patterns for different potential demographic segments are shown in the example data table 1600 of the illustrated example of FIG. 16A. The example data table 1600 of the illustrated example of FIG. 16A is stored in the example census and panelist monitoring data database 755. In the illustrated example, the census and panelist monitoring data database 755 is sourced with information from other monitoring efforts (e.g., panelist monitoring systems) and includes media patterns associated with demographic segments. The example data table 1600 of the illustrated example of FIG. 16A indicates that a first demographic segment (row 1625) has a pattern of being presented media from the ENGADGET.COM, CNN.COM, and GOOGLE.COM domains.

The example demographic segment estimator 750 initializes a counter to zero. (Block 1530). The example demographic segment estimator 750 identifies media appearing in the aggregated list. (Block 1535). In the illustrated example, the aggregated list for the example mobile device MD001 includes the ENGADGET.COM and CNN.COM domains (from rows 1460 of the illustrated example of FIG. 14). The example demographic segment estimator 750 determines if the identified media appears in the pattern of media for the potential demographic segment. (Block 1540). In the illustrated example of FIG. 16A, the ENGADGET.COM domain name appears in the first example demographic segment (row 1625), but does not appear in a second demographic segment (row 1630) or in a third demographic segment (row 1635). If the identified media appears in the pattern of media for the potential demographic segment (Block 1540), the example demographic segment estimator 750 increments the counter. (Block 1542). The example demographic segment estimator 750 determines if there is additional media in the aggregated list. (Block 1545). If additional media exists, the example demographic segment estimator 750 identifies the media (Block 1535) and increments the counter (Block 1542) if the identified media appears in the pattern of media for the potential demographic segment. (Block 1540).

Once the identified media of the aggregated list has been processed, the example demographic segment estimator computes a likelihood score representing the likelihood that the given mobile device should be associated with the potential demographic segment. (Block 1550). In the illustrated example, the likelihood score is computed by dividing the value of the counter by a count of the number of identified media in the aggregated list (e.g., five matches divided by twenty five media in the list results in a 0.2 likelihood score). However, any other approach to computing the likelihood score may additionally or alternatively be used. For example, instead of aggregating the list of media identified in the mobile monitoring data, the list may be processed in its un-aggregated form.

The example demographic segment estimator 750 identifies whether additional potential demographic segments exist for analysis. (Block 1555). If so, control returns to block 1525 and the example demographic segment estimator 750 proceeds to identify a pattern of media for the next potential demographic segment and compute a likelihood score for that potential demographic segment in the manner described above. The process of blocks 1525-1555 continues until all demographic segments have been analyzed (e.g., a "no" result breaks from block 1555 to block 1560).

Example likelihood scores for various potential demographic segments are shown in the example computed likelihood score column 1620 of FIG. 16A. The computed likelihood score column 1620 represents likelihood scores that the mobile device MD001 should be associated with the demographic segment identified in the example demographic segment column 1610.

After the demographic segments are all analyzed (Block 1555), the example demographic segment estimator 750 selects the demographic segment having the highest likelihood score. (Block 1560). The selected demographic segment is stored in association with the mobile device under analysis. (Block 1565). An example data table 1650 shown in the illustrated example of FIG. 16B illustrates example associations of a mobile device and an estimated demographic segment. The example demographic segment estimator 750 identifies whether there are other mobile devices that have not yet had an estimated demographic segment identified. (Block 1570). If additional mobile devices exist, control returns to block 1510 and their respective demographic segments are estimated by the example demographic segment estimator in the manner described above. The process of blocks 1510-1570 continues until demographic segments associated with each mobile device has been analyzed (e.g., a "no" result breaks from block 1570 to terminate the process of FIG. 15).

FIG. 16B is an example data table that may be stored by the example central facility 170 of FIGS. 1 and/or 7, associating demographic segment(s) with respective mobile device(s) 140 of FIGS. 1, 5, and/or 6. The example data table 1650 of the illustrated example of FIG. 16B includes a mobile device identifier column 1610 and an estimated demographic segment column 1630. The example data table 1650 includes three rows 1670, 1675, 1680 associating three mobile devices (e.g., MD001, MD002, and MD003) with corresponding demographic segments. In the illustrated example, three rows are shown for the sake of simplicity of explanation. However, in practice, many additional rows representative of many additional mobile devices may additionally be stored.

Figure 17:
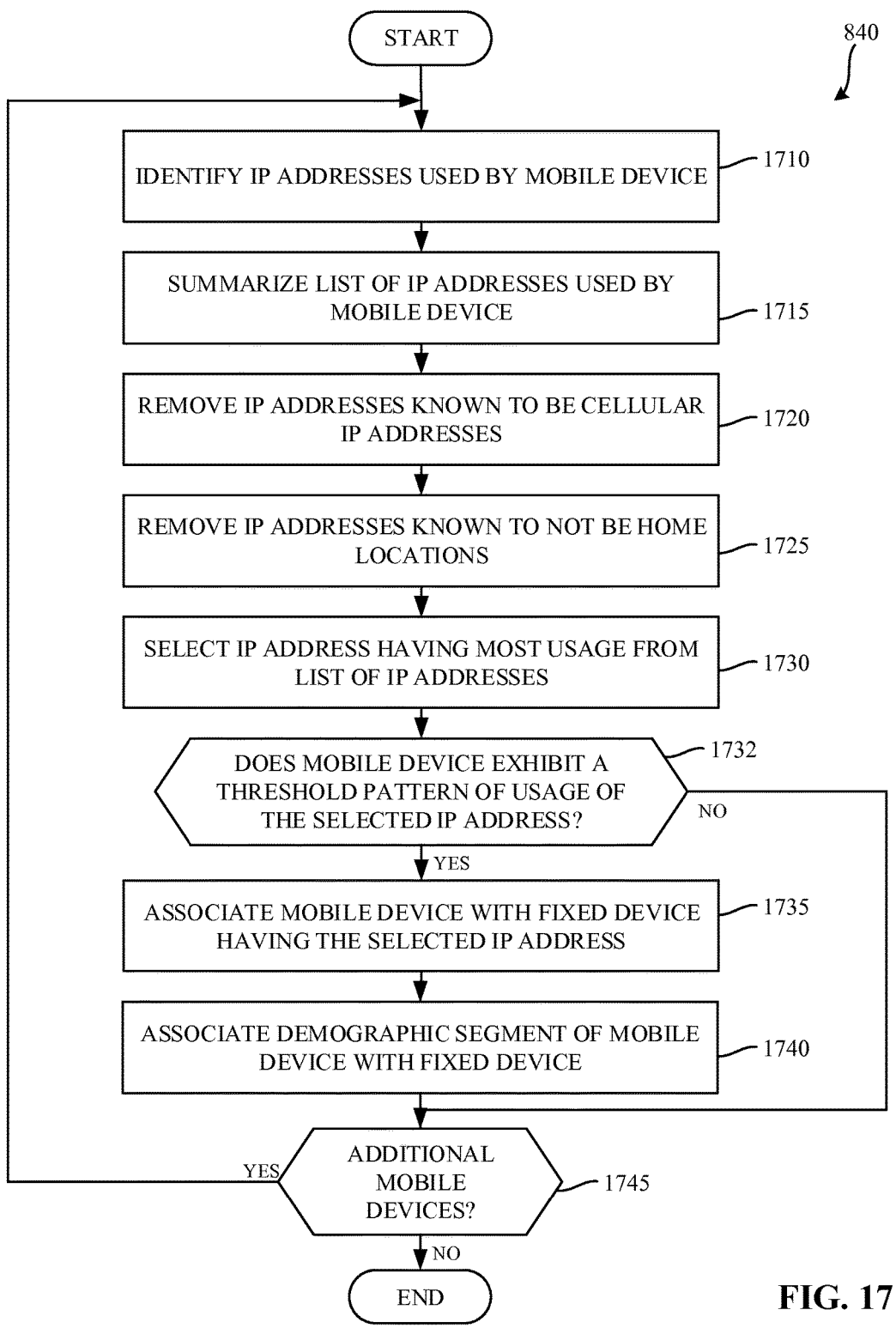
FIGS. 17 and 17A are flowcharts representative of example machine-readable instructions which may be executed by the example central facility to associate the mobile device of FIGS. 1, 5, and/or 6 with the fixed device of FIGS. 1, 2, 3, and/or 4.

FIG. 17 is a flowchart representative of example machine-readable instructions which may be executed by the example central facility 170 of FIGS. 1 and/or 7 to associate the mobile device 140 of FIGS. 1, 5, and/or 6 with the fixed device 130 of FIGS. 1, 2, 3, and/or 4. The example process 840 of the illustrated example of FIG. 17 represents a mobile device centric approach to associating a mobile device with a fixed device. In contrast, FIG. 17A (described in detail below) represents a fixed device centric approach to associating the mobile device with the fixed device.

The example process 840 of the illustrated example of FIG. 17 begins when the monitoring data processor 740 identifies the public IP addresses used by a mobile device. (Block 1710). The example monitoring data processor 740 selects the public IP addresses used by reading the example IP address column from the data table 1400 of the illustrated example of FIG. 14 for a given mobile device identifier. The monitoring data processor 740 summarizes the list of public IP addresses used by the mobile device. (Block 1715). In the illustrated example, the monitoring data processor summarizes the list of public IP addresses used by the mobile device by removing duplicate public IP addresses.

Cellular IP addresses represent non-home access points and are not useful for determining a home access point with which the mobile device should be associated. Therefore, the example monitoring data processor 740 removes public IP addresses from summarized list of public IP addresses that are known to be cellular IP address (e.g. associated with a cellular network). (Block 1720). In the illustrated example, ranges of cellular IP addresses are stored in a list of cellular IP addresses within the example monitoring data database 745. The example monitoring data processor 740 removes IP addresses known to not be a home location. (Block 1725). In some examples, while an IP address used by a mobile device may not be a cellular address, it may also not be associated with a home access point. For example, if the mobile device is in a public location (e.g., a library, a coffee shop, etc.), the mobile device may use a public IP address of an access point at that public location. A list of non-home IP addresses is stored in the monitoring data database 745 and is used to remove IP address known to not be a home location from the list of IP addresses used by the mobile device.

The example monitoring data processor 740 then selects a public IP address from the summarized list that is associated with the most usage (e.g., the most number of occurrences of monitoring data). (Block 1730). However, any other approach to selecting the public IP address may additionally or alternatively be used. In the illustrated example, the example monitoring data processor 740 determines whether the mobile device exhibits a threshold pattern of usage of the selected IP address. (Block 1732). As used herein, a threshold pattern of usage is a periodic and/or a-periodic pattern of occurrences where the IP address of the mobile device matches the IP address of the fixed device. For example, the example monitoring data processor 740 may determine whether the IP address used by the mobile device is frequently used (e.g., more than once a day, more than once a week, more than once a year, etc.).

If the mobile device exhibits the threshold pattern of usage of the selected IP address, (Block 1732) the example monitoring data processor 740 associates the mobile device with a fixed device having the selected IP address by storing a record of the association of the mobile device and the fixed device. (Block 1735). The example monitoring data processor 740 stores an association of the demographic segment of the mobile device (e.g., a demographic segment associated with the mobile device in the example data table 1650 of the illustrated example of FIG. 16B) with the fixed device having the selected IP address. (Block 1740). The association of the demographic segment of the mobile device with the fixed device enables identification of demographic segments that may be physically present at the fixed device.

The association of the mobile device and the fixed device are stored in the example monitoring data database 745. An example data table 1800 is shown in the illustrated example of FIG. 18. Once the association has been stored (Blocks 1735, 1740) and/or if the mobile device does not exhibit the threshold pattern of usage of the selected IP address (Block 1732), the example monitoring data processor 740 then determines whether there are additional mobile devices to be associated with a fixed device. (Block 1745). If an additional mobile device exists (Block 1745), control returns to block 1710 and the monitoring data processor repeats the process for the additional mobile device(s) in the manner described above. The process of blocks 1710-1745 continues until all mobile devices have been processed (e.g., a "no" result breaks from block 1745 to terminate the process 840 of FIG. 17.)

While in the illustrated example a single association of the mobile device and a fixed device is made, in some examples, the mobile device may be associated with multiple fixed devices. For example, the mobile device may be associated with fixed devices that it is identified as regularly using the same address as the fixed device (e.g., an association may be made using a home address, an association may be made using a work address, an association may be made using a restaurant that the user frequently visits, etc.) Moreover, the example monitoring data processor 740 may make this determination for multiple IP addresses that have been used by the mobile device. For example, the example monitoring data processor 740 may make a determination of whether the mobile device frequently uses any IP addresses in the summarized list of IP addresses (e.g., the three IP addresses having the greatest number of occurrences, the ten IP addresses having the greatest number of occurrences, etc.)

Figure 17A:
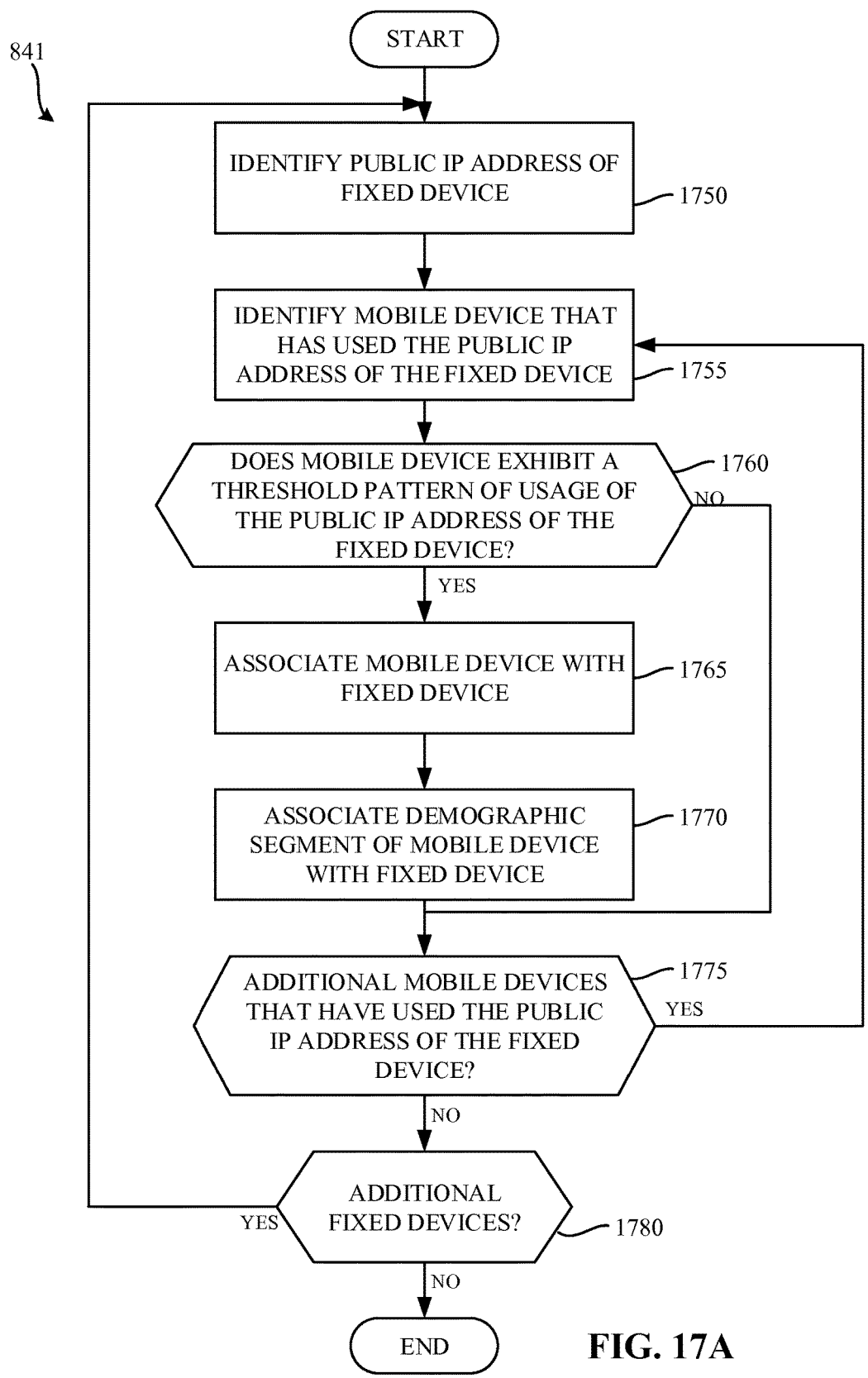

FIG. 17A is a flowchart representative of example machine-readable instructions 841 which may be executed by the example central facility 170 of FIGS. 1 and/or 7 to associate the mobile device 140 of FIGS. 1, 5, and/or 6 with the fixed device 130 of FIGS. 1, 2, 3, and/or 4. As noted above, the example process 841 of FIG. 17A represents a fixed device centric approach to associating the mobile device with the fixed device. Using a fixed device centric approach to associate a mobile device with a fixed device is advantageous because it is expected that there will be many more mobile devices than fixed devices. As a result, processing requirements are reduced.

The example process 841 of the illustrated example of FIG. 17A begins when the monitoring data processor 740 identifies the public IP addresses used by a fixed device. (Block 1750). The example monitoring data processor 740 selects the public IP addresses used by reading the example IP address column from the data table 1100 of the illustrated example of FIG. 11 for a given fixed device identifier. The monitoring data processor 740 inspects monitoring data received from mobile devices to identify a mobile device that has used the public IP address of the fixed device. (Block 1755).

The example monitoring data processor 740 then determines whether the mobile device exhibits a threshold pattern of usage of the public IP address of the fixed device. (Block 1760). In the illustrated example, different threshold patterns of usage may be used based on, for example, the type, location, and/or usage of the fixed device. In the illustrated example, the threshold pattern is a frequency of occurrence of when the mobile device is present at the fixed device.

In the illustrated example, the fixed device is a device that is used in a home. Because usage of mobile devices in a home location is a regular occurrence, the example monitoring data processor 740 inspects monitoring data associated with the mobile device to identify whether the mobile device exhibits a pattern of home usage (e.g., the mobile device is present at the fixed device at least once a day). However, any other threshold pattern of usage may additionally or alternatively be used. For example, if the fixed device were at a retail location (e.g., an electronics store, a shopping mall, etc.), a dining establishment (e.g., a coffee shop, a restaurant, etc.), etc. a threshold pattern of usage indicating that the mobile device was present at the location of the fixed device once a week, once a month, etc. may additionally or alternatively be used.

If the mobile device exhibits the threshold pattern of usage of the public IP address of the fixed device, the example monitoring data processor 740 associates the mobile device with the fixed device. (Block 1765). In the illustrated example, the example monitoring data processor 740 associates the mobile device with the fixed device by storing a record of the association of the mobile device and the fixed device. (Block 1765). In some examples, the mobile device may exhibit the threshold pattern(s) of usage in association with multiple fixed devices. For example, the mobile device may exhibit a first threshold pattern of usage for a home location and may also exhibit a second threshold pattern of usage for a retail location. In some examples, the second threshold pattern of usage is different from the first threshold pattern of usage. For example, an association may be made using a home location, an association may be made using a work location, and an association may be made using a restaurant that the user frequently visits.

The example monitoring data processor 740 stores an association of the demographic segment of the mobile device (e.g., a demographic segment associated with the mobile device in the example data table 1650 of the illustrated example of FIG. 16B) with the fixed device having the selected IP address. (Block 1770). The association of the demographic segment of the mobile device with the fixed device enables identification of demographic segments that may be physically present at the fixed device. The association of the mobile device and the fixed device are stored in the example monitoring data database 745. An example data table 1800 is shown in the illustrated example of FIG. 18. The example monitoring data processor 740 then determines whether there are additional mobile devices that have used the public IP address of the fixed device. (Block 1775). If an additional mobile device has used the public IP address of the fixed device (Block 1775), the monitoring data processor 740 identifies and processes the mobile device in the manner described above. The process of blocks 1755-1775 continues until all mobile devices that have used the public IP address of the fixed device have been analyzed (e.g., a "no" result breaks from block 1755 to block 1780). Likewise, once all of the mobile devices that have used the public IP address of the fixed device have been processed (Blocks 1755-1775), the monitoring data processor 740 determines if there are additional fixed devices to process. (Block 1780). If additional fixed devices exist for processing, control proceeds to block 1750. The example monitoring data processor 740 then associates mobile devices that have used the public IP address of the fixed device and exhibit a threshold pattern of usage in the manner described above. (Blocks 1750-1775). The process of blocks 1750-1775 continues until each of the fixed devices has been analyzed (e.g., a "no" result breaks from block 1780 to terminate the process of FIG. 17A).

The example associations created as a result of FIGS. 17 and/or 17A create a model of the users that are periodically present at the fixed device. As such, the model can later be used to predict when those users will be present at the fixed device.

FIG. 18 is an example data table 1800 that may be stored by the example central facility 170 of FIGS. 1 and/or 7 to associate mobile device(s) of FIGS. 1, 5, and/or 6 with respective fixed device(s) of FIGS. 1, 2, 3, and/or 4. The example data table 1800 of the illustrated example of FIG. 18 represents associations of fixed devices with mobile devices. Moreover, the example data table 1800 illustrated in the example of FIG. 18 includes an association of the fixed device with an estimated demographic segment of the corresponding mobile device that is associated with the fixed device. In the illustrated example, the example data table 1800 includes a fixed device identifier column 1810, a mobile device identifier column 1820, and an estimated demographic segment column 1830. The example data table 1800 of the illustrated example of FIG. 18 includes three example rows 1840, 1850, 1860. While, in the illustrated example, three rows are shown, in practice many additional associations of fixed devices and mobile devices may additionally be made. In the illustrated example, the fixed device FD001 is associated with both the mobile device MD001 and the mobile device MD002, which indicates that two mobile devices are associated with the fixed device and, moreover the media presentation location of the fixed device FD001. In examples disclosed herein, mobile devices are only associated with a single fixed device. However, in some examples, because of the nature of mobile devices being mobile, some mobile devices may be associated with multiple fixed locations. Moreover, the associations of a mobile device with a fixed location may be periodically and/or a-periodically re-evaluated (e.g., once a week, once a month, when the mobile device does not return to the associated fixed device for an extended period of time, etc.). While mobile devices are mobile, in some examples it is assumed that the mobile device is always associated with the same user. In examples where the mobile device is no longer associated with the same user, (e.g., the mobile device is sold or otherwise given to another user) it is assumed that data stored on the mobile device (e.g., including the mobile device identifier) will be deleted. In such an example, the mobile device receives a new mobile device identifier for subsequent use and may be later associated with a different fixed device.

Figure 19:
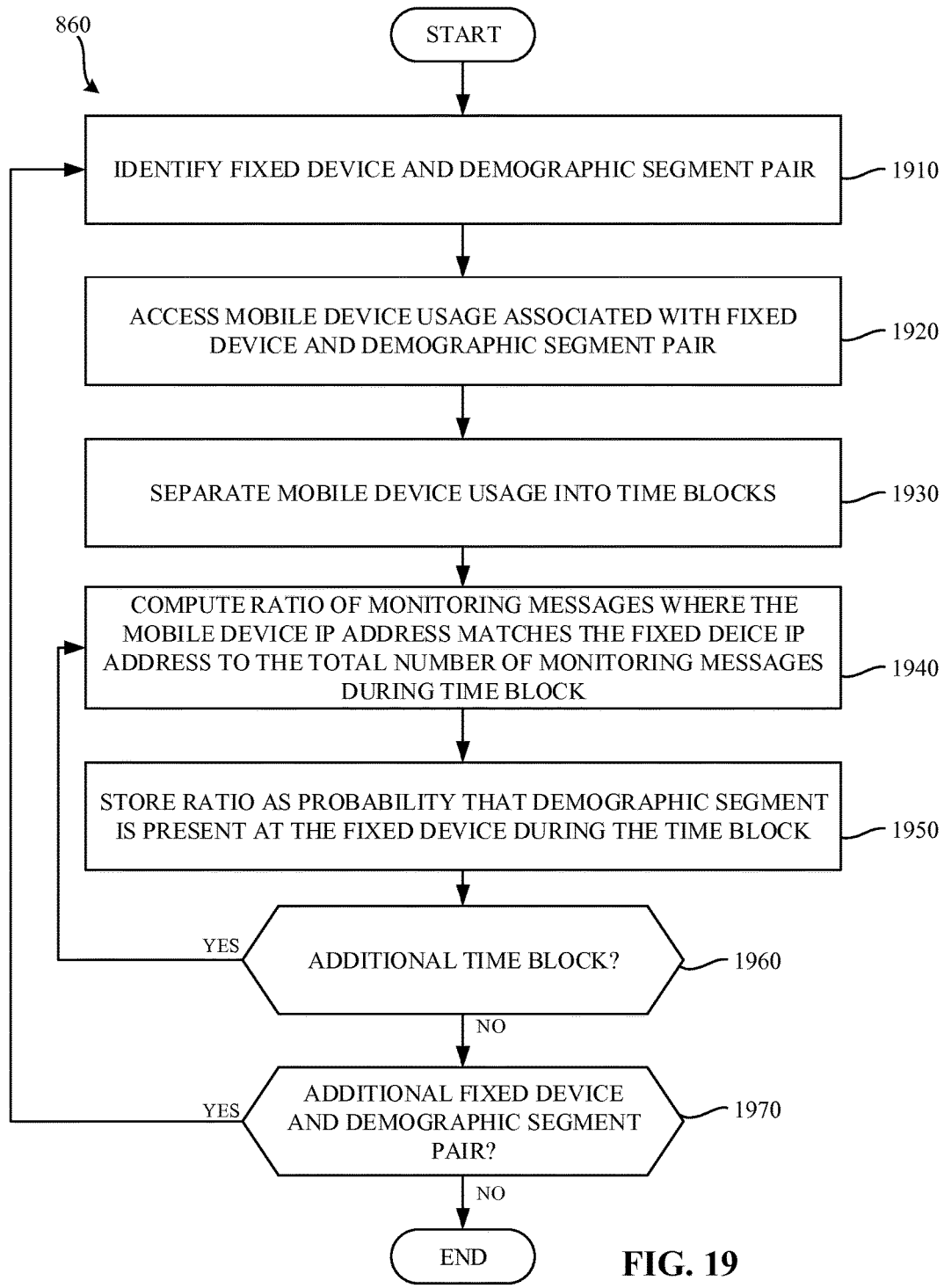
FIG. 19 is a flowchart representative of example machine-readable instructions which may be executed by the example central facility of FIGS. 1 and/or 7 to compute one or more probabilities that a demographic segment is physically present at the fixed device of FIGS. 1, 2, 3, and/or 4.

FIG. 19 is a flowchart representative of example machine-readable instructions which may be executed by the example central facility 170 of FIGS. 1 and/or 7 to compute one or more probabilities that a demographic segment is physically present at the fixed device 130 of FIGS. 1, 2, 3, and/or 4. The example process 860 of the illustrated example of FIG. 19 begins when the monitoring data processor 740 identifies a fixed device and demographic segment pair from, for example, the example data table 1800 of the illustrated example of FIG. 18. As noted below in connection with block 1970, the example monitoring data processor 740 progressively selects each fixed device and demographic pair for analysis. The example monitoring data processor 740 accesses mobile device usage information associated with the fixed device and demographic segment pair. (Block 1920) When accessing mobile device usage associated with the fixed device and demographic segment pair, the example monitoring data processor 740 may, in some examples, select usage information of multiple mobile devices (assuming the multiple mobile devices are associated with the same demographic segment).

The example monitoring data processor 740 separates the usage information into time blocks. (Block 1930). In the illustrated example, the time blocks are fifteen minute increments throughout a day. However, any other time block sizes may additionally or alternatively be used such as, for example, a day of the week, and hour within a day, etc. Within each time block, the example monitoring data processor 740 computes a ratio of monitoring data messages where the mobile device IP address matches the IP address of the fixed device to the total number of monitoring data messages within that time block. (Block 1940). The ratio represents a probability that a demographic segment was present at the fixed device during the time block. For example, the example monitoring data processor 740 may determine that between 12:00 PM and 12:15 PM (which may include monitoring data records from multiple days), a total of fifty messages were received in association with the fixed device and demographic segment pair, thirty of which having a public IP address matching the public IP address of the fixed device. In such an example, the example monitoring data processor 740 determines the ratio to be sixty percent. However, the ratio may be computed in any other fashion. The example monitoring data processor 740 then stores the ratio in the monitoring data database 745. (Block 1950).

To ensure that ratios are computed for all time blocks for the fixed device and demographic segment pair, the example monitoring data processor 740 determines whether an additional time block exists for ratio computation. (Block 1960). If an additional time block exists, control proceeds to block 1940, where the example monitoring data processor 740 computes the ratio for the time block in the manner described above. (Block 1940). The process of blocks 1940 and 1950 continues until all time blocks are processed (e.g., a "no result breaks from block 1960 to proceed to block 1970). To ensure that ratios are computed for all fixed device and demographic segment pairs, the example monitoring data processor 740 determines whether an additional fixed device and demographic pair exists. (Block 1970). If an additional fixed device and demographic pair exists, control returns to block 1910 where the example monitoring data processor 740 identifies the fixed device and demographic segment pair and computes ratios for the same in the manner described above. As such, the example monitoring data processor 740 creates a data table representing probabilities over time of a demographic segment being present at a fixed device. Such an example table is shown in the illustrated example of FIG. 20. The process of blocks 1910-1970 continues until all fixed device and demographic segment pairs have been processed (e.g., a "no" result breaks from block 1970 to terminate the process of FIG. 19).

Figure 20:
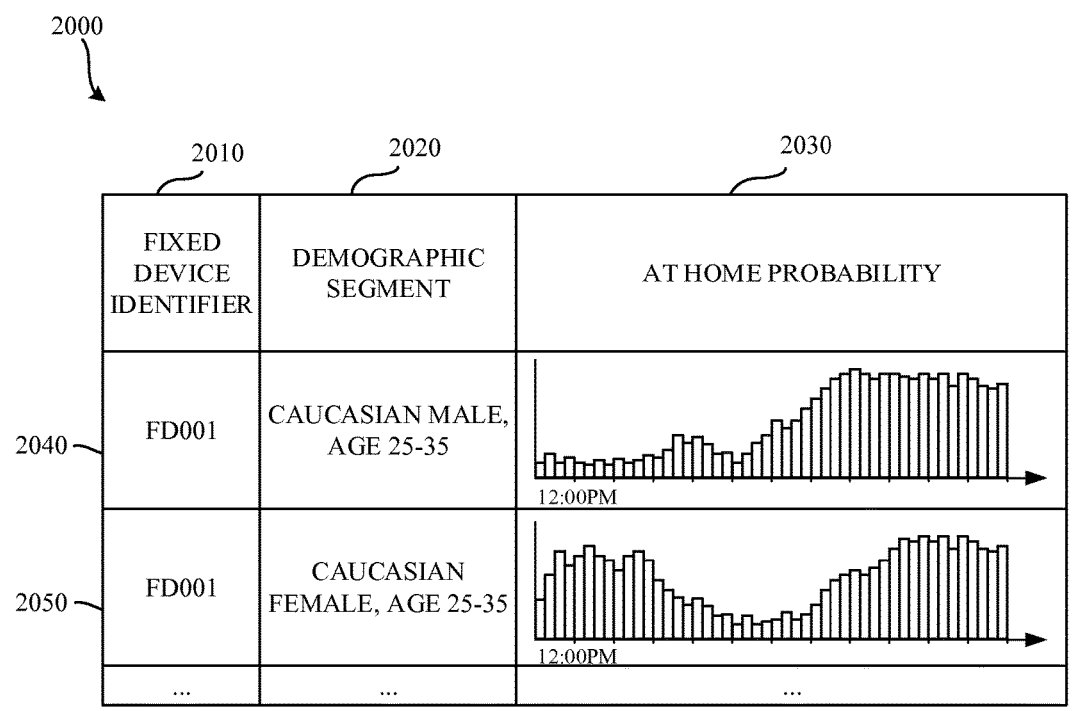
FIG. 20 is an example data table that may be stored by the example central facility of FIGS. 1 and/or 7 to represent one or more probabilities that a demographic segment is physically present at the fixed device.

FIG. 20 is an example data table 2000 that may be stored by the example central facility 170 of FIGS. 1 and/or 7 to represent one or more probabilities that a demographic segment is physically present at the fixed device 130. The example data table 2000 of the illustrated example of FIG. 20 includes a fixed device identifier column 2010, a demographic segment column 2020, and an at-home probability column 2030.

The at-home probability column 2030 of the illustrated example includes a graph for each fixed device identifier and demographic segment pair. The graph(s) of the at-home probability column 2030 represent respective probabilities of whether the demographic segment is physically present at the fixed device identifier at various times. In the illustrated example, the graph is a bar graph, where each bar is representative of a respective time block. As noted above, each time block in the illustrated example represents a fifteen minute increment. However, any other duration of time block may additionally or alternatively be used.

The example data table 2000 of the illustrated example of FIG. 20 includes two example rows 2040, 2050. The first example row 2040 represents the fixed device and demographic segment pair of the fixed device FD001 and a Caucasian male between the ages of 25 and 35. The probabilities illustrated in the example at-home probability column 2030 represent probabilities calculated using the example procedure 860 of FIG. 19. As shown in the at-home probability column 2030 for the first example row 2040, the Caucasian male between the ages of 25 and 35 has a low probability of being at home in the afternoon, whereas the probability of the Caucasian male between the ages of 25 and 35 has a higher probability of being at home in the evening. As shown in the at-home probability column 2030 for the second example row 2050, the Caucasian female between the ages of 25 and 35 has a heightened probability of being at home in the early afternoon, and lesser probability of being at home during the late afternoon, and a high probability of being at home in the evening.

Figure 21:
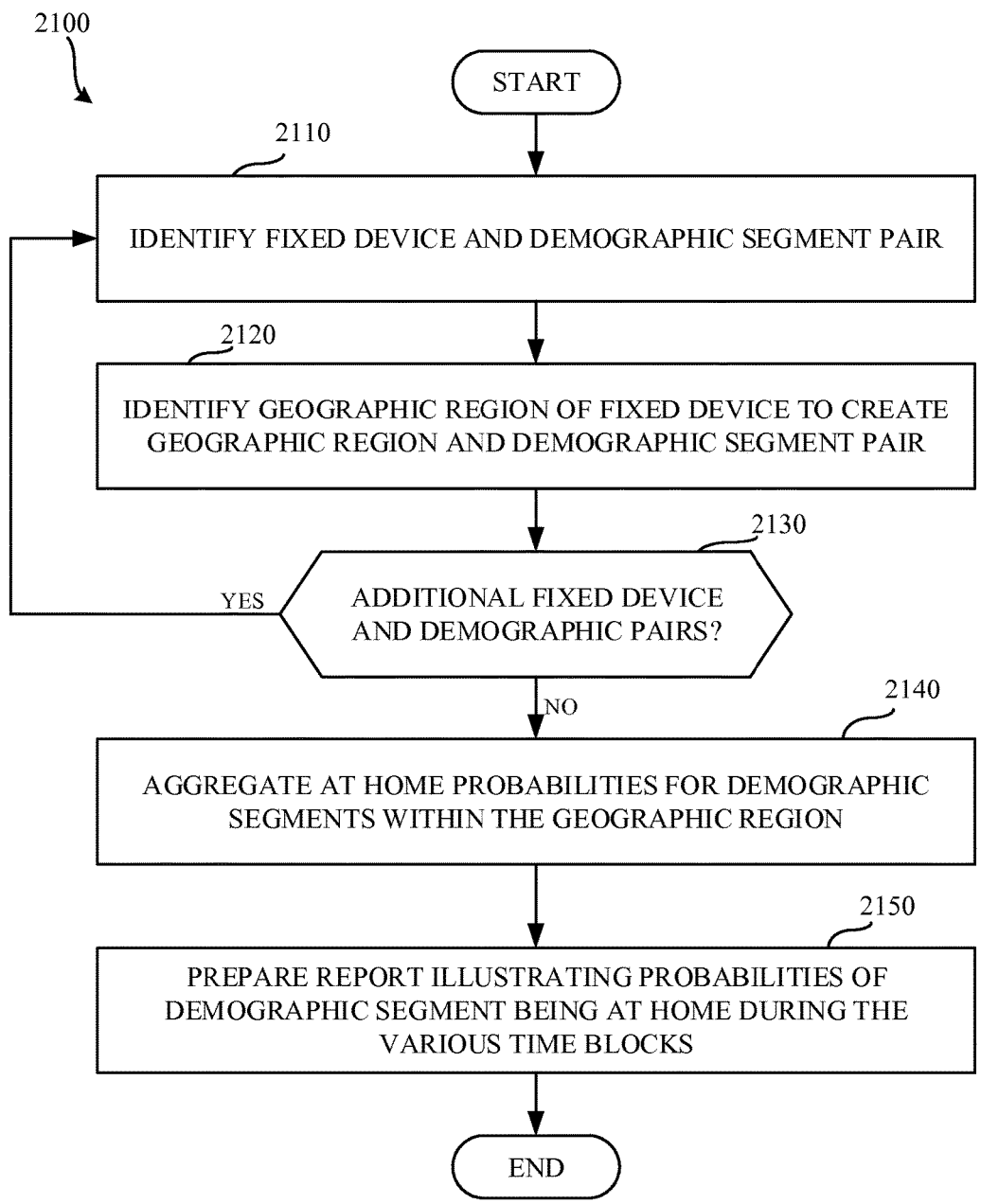
FIG. 21 is a flowchart representative of example machine-readable instructions which may be executed by the example central facility of FIGS. 1 and/or 7 to compute one or more probabilities that a demographic segment is physically present at a fixed device within a geographic region.

FIG. 21 is a flowchart representative of example machine-readable instructions which may be executed by the example central facility 170 of FIGS. 1 and/or 7 to compute one or more probabilities that a demographic segment is physically present at a fixed device within a geographic region. The example process 2100 of the illustrated example of FIG. 21 begins when the example monitoring data processor 740 identifies fixed device and demographic segment pairs by querying the monitoring data database 745 (e.g., by querying the example data table 1800 of FIG. 18 stored in the example monitoring data database 745). (Block 2110). The geographic region determiner 780 determines a geographic region of the fixed device, thereby creating a geographic region and demographic segment pair. In the illustrated example, the geographic region determiner 780 determines the geographic region by performing an IP address to location lookup using the IP address of the fixed device. The example monitoring data processor 740 then determines if additional fixed device and demographic pairs exist (Block 2130), and, if so identifies the pair by selecting a next result of the query of the monitoring data database 745 in the manner described above until all fixed device and demographic pairs have been identified. (Block 2110). The example monitoring data processor 740 aggregates the at-home probabilities for demographic segments within the identified geographic region. (Block 2140). In the illustrated example, the at-home probabilities for demographic segments within the identified geographic region are aggregated by averaging each of the at-home probabilities of the various time blocks for each demographic segment within the geographic region. The reporter 795 prepares a report illustrating probabilities of various demographic segments being at home during various time blocks. (Block 2150). In the illustrated example, the reporter 795 stores the report in the monitoring data database 745. An example data table 2200 representative of such a report is shown in the illustrated example of FIG. 22.

Figure 22:
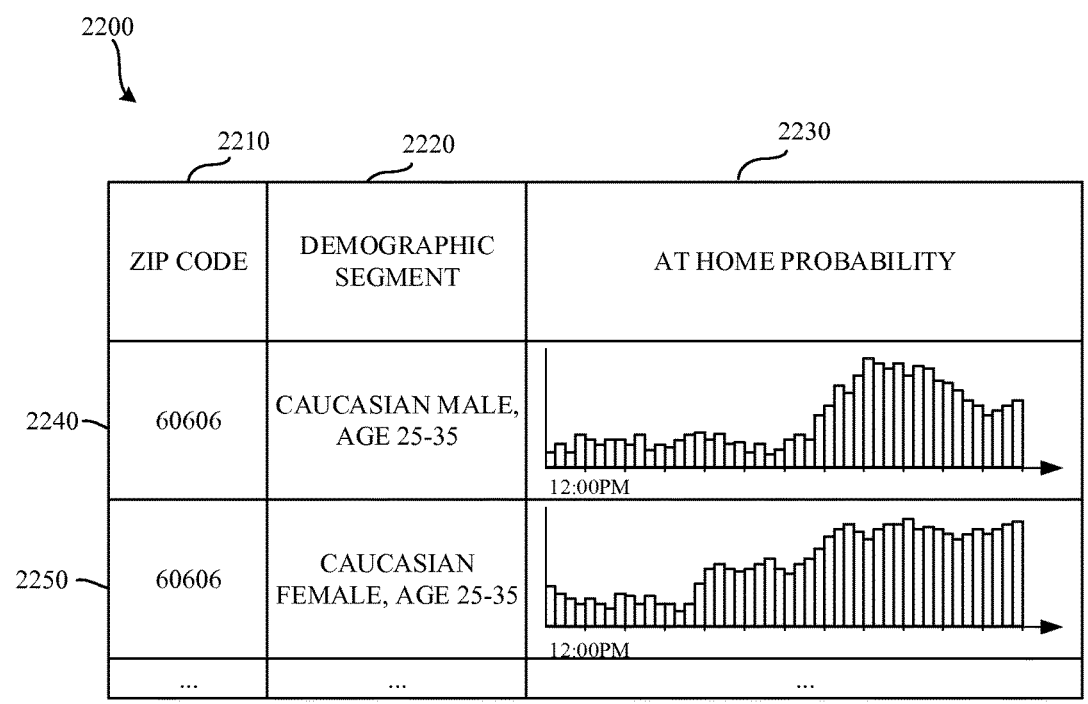
FIG. 22 is an example data table that may be stored by the example central facility of FIGS. 1 and/or 7 to represent one or more probabilities that a demographic segment is physically present at a fixed device within a geographic region.

FIG. 22 is an example data table that may be stored by the example central facility 170 of FIGS. 1 and/or 7 to represent one or more probabilities that a demographic segment is physically present at a fixed device within a geographic region. The example data table 2200 of the illustrated example of FIG. 22 includes a zip code column 2210, a demographic segment column 2220, and an at-home probability column 2230. The example zip code column 2210 represents a postal code of the geographic region. While, in the illustrated example, a zip code is used, any other geographic region identifier may additionally or alternatively be used such as, for example, a state name, a city name, GPS coordinates, etc. The probabilities illustrated in the example at-home probability column 2240 represent probabilities calculated using the example procedure 2100 of FIG. 21. The example data table 2200 of the illustrated example of FIG. 22 includes two example rows 2240, 2250. The first example row 2240 indicates at-home probabilities of Caucasian males between the ages of 25 and 35 within the zip code of 60606. The second example row 2250 represents at-home probabilities of Caucasian females between the ages of 25 and 35 within the zip code of 60606. Such a report is useful to advertisers and/or media providers as it represents the likelihood that a user within a particular geographic region and having a particular demographic is within a media presentation location (e.g., at home) at certain times. An advertiser may use this information to select an advertisement to be presented. As a result, the advertiser may provide more targeted advertising to those persons who are at home at a particular time.

The above disclosed approaches to identifying whether a demographic segment is physically present at a media presentation location rely on mobile device monitoring information. If, for example, a user does not frequently use their mobile device when at the media presentation location (e.g., when at home a user prefers to use a desktop computer instead of a smartphone), such mobile device monitoring information may be sparse. To improve the accuracy of the mobile monitoring information (e.g., supplement the generation of data), in some examples, the fixed device 130 includes the example mobile device discoverer 360 of FIG. 3 to perform a scan of a local area network hosted by the home access point 122.

FIG. 23 is a flowchart representative of example machine-readable instructions which may be executed by the example fixed device 130 of FIGS. 1, 2, 3, and/or 4 to perform a scan of a local area network. The example process 2300 of the illustrated example of FIG. 23 begins when the example mobile devices discoverer 360 determines whether to perform a local area network scan. (Block 2310). In the illustrated example, a local area network scan is performed periodically. As such, the example mobile device discoverer 360 determines whether a threshold time has been reached by consulting a counter or other time tracking device. However, any other periodic and/or aperiodic approach to determining whether a local area network scan should be performed may additionally or alternatively be used.

In the illustrated example, the mobile device discoverer 360 identifies potential local area network IP addresses that may be used by mobile devices. In the illustrated example, the mobile device discoverer 360 identifies potential local area network IP addresses based on a subnet that the private IP address of the fixed device 130 is part of. Identifying potential local area network IP addresses based on the subnet of which the fixed device is a part of reduces the overall search space of potential addresses (e.g., any potential private IP address) to potential IP addresses that are in use on the local area network. The example mobile device discoverer transmits a message (e.g., an ICMP echo request) to each potential IP address from the reduced search space. (Block 2330). The example mobile device discoverer 360 awaits a response to the message. (Block 2340).

If a response is received, the mobile device discoverer 360 performs a lookup of a hardware identifier of the device that responded at the tested IP address. (Block 2350). In the illustrated example, the lookup is implemented using an address resolution protocol (ARP) table. In the illustrated example, the ARP table is maintained by the network communicator 220. For example, the ARP table is updated by the network communicator 220 as IP address of devices in communication with the fixed device 130 (e.g., device responding to the ICMP Echo requests of the network scan) are discovered and/or changed. In the illustrated example, the mobile device discoverer 360 queries the network communicator 220 using the tested IP address to identify the hardware identifier of the device that responded at the tested IP address. In the illustrated example, the hardware identifier is the media access control (MAC) address of the mobile device. However, any other approach to determining a hardware identifier of the device responding to an ICMP echo request may additionally or alternatively be used.

The example mobile device discoverer 360 reports the hardware address as being present on the local area network. (Block 2360). In the illustrated example, the example mobile device discoverer 360 reports the discovered hardware address using an HTTP message transmitted to the central facility 170. In the illustrated example, the mobile device discoverer 360 includes the identifier of the fixed device and a timestamp in the HTTP message to the central facility 170. However, any other past, present, and/or future approach to informing the central facility of devices on the local-area network may additionally or alternatively be used.

The example mobile device discoverer 360 waits a threshold amount of time to determine if a response has been received from the tested IP address. In the illustrated example, the mobile device discoverer 360 waits for one second, as most devices on a local area network will return a response within a matter of milliseconds. However, any other threshold amount of time may additionally or alternatively be used. If no response was received from a tested IP address within the threshold amount of time (Block 2340), or once the hardware address has been reported (Block 2360), the example mobile device discoverer 360 determines whether there are additional IP addresses to scan. (Block 2370). If there are additional IP addresses to scan, control returns to block 2330, where the additional IP addresses are scanned in the manner described above. The example mobile device discoverer 360 continues to perform the network scan until all potential local-area network IP addresses have been tested. Once all IP addresses have been tested (e.g., a "no" result breaks from block 2370 to block 2310), the example mobile device discoverer 360 waits until an additional local area network scan is to be performed. (Block 2310).

Figure 24:
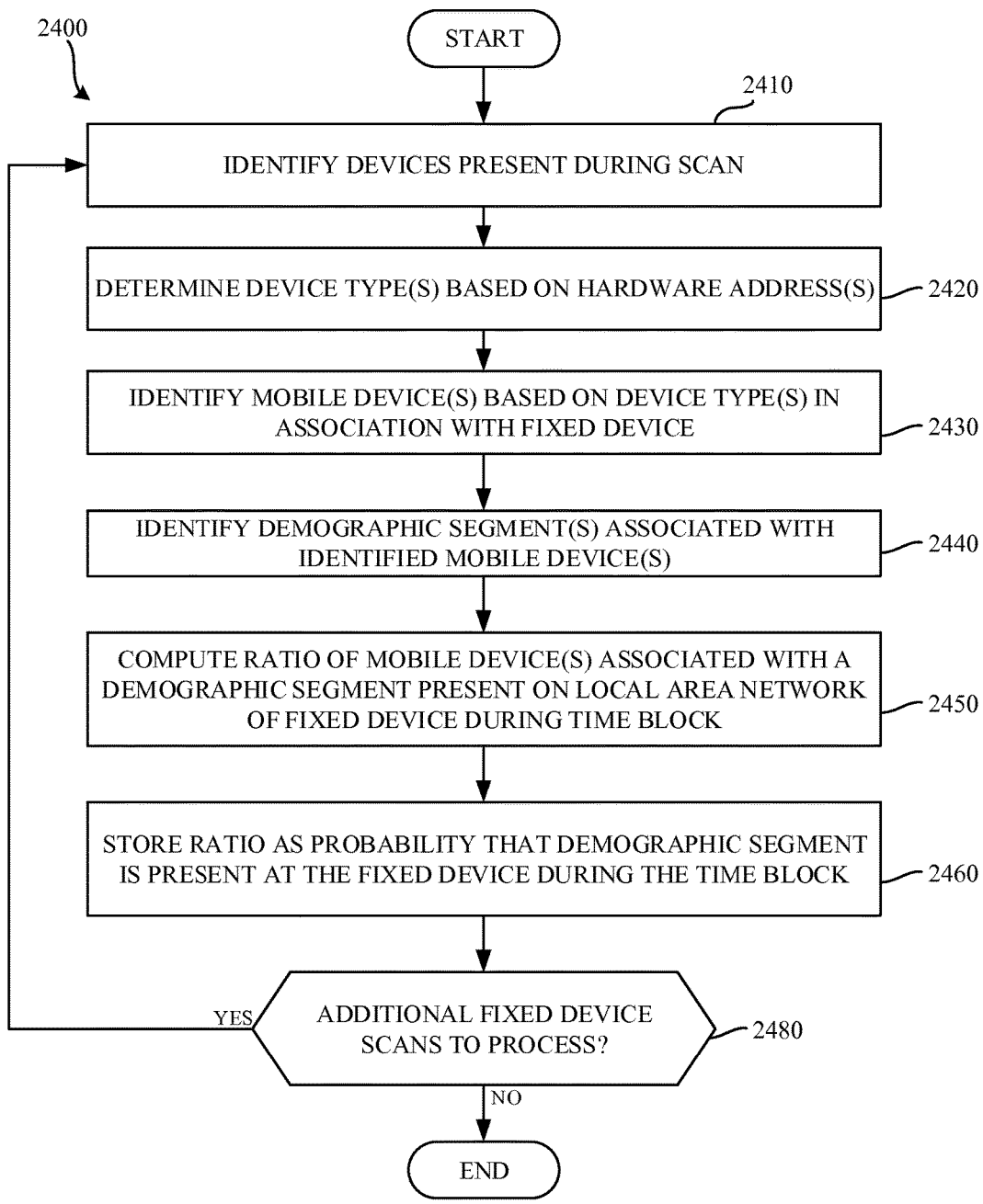
FIG. 24 is a flowchart representative of example machine-readable instructions which may be executed by the example central facility of FIGS. 1 and/or 7 to compute one or more probabilities that a demographic segment is physically present at the fixed device based on the scan of the local area network.

FIG. 24 is a flowchart representative of example machine-readable instructions which may be executed by the example central facility 170 of FIGS. 1 and/or 7 to compute one or more probabilities that a person associated with a demographic segment is physically present at the fixed device 130 based on the scan of the local area network. The example process 2400 of the illustrated example of FIG. 24 begins when the monitoring data processor 740 identifies devices that were present during the local-area network scan. (Block 2410). An example data table 2500 shown in the illustrated example of FIG. 25A represents devices that were present during the local area network scan. The example data table 2500 includes a fixed device identifier column 2505, a timestamp column 2510, and a detected hardware address column 2515. The example data table 2500 shown in the illustrated example of FIG. 25A includes two example rows 2520, 2525. The example rows 2520, 2525 of the illustrated example of FIG. 25A indicate that two mobile devices were detected on the local area network used by the fixed device FD001.

The example monitoring data processor 740 of the illustrated example determines the device type based on the detected hardware address of the mobile device. (Block 2420). In the illustrated example, the monitoring data processor 740 identifies the mobile device type by consulting a hardware address to mobile device type lookup table. An example hardware address to mobile device type lookup table 2540 is shown in the illustrated example of FIG. 25B. The example data table 2540 includes a hardware address range column 2545 and a mobile device type column 2550. The example data table 2540 includes three example rows

2555, 2560, 2565. The first example row 2555 identifies hardware addresses that are associated with a Samsung Galaxy S4. The second example row 2560 identifies hardware addresses their associated with an Apple iPhone 5S. The third example row 2565 identifies hardware addresses that are associated with an Apple iPad.

In order to determine an identifier of the mobile device that was identified as present during the network scan, the example monitoring data processor 740 attempts to associate the identified device type (identified in Block 2420) with a mobile device that is associated with the fixed device that provided the network scan results. Referring to FIG. 14, the monitoring data indicates the mobile device type (e.g., via the mobile device information column 1420) of the mobile device in question. In the example of FIG. 24, the mobile device identifier is obtained by querying the example data table (e.g., the example data table 1400 of FIG. 14) for mobile device identifiers having a mobile device type (e.g., from the example mobile device information column 1420) that matches the mobile device type identified via the lookup using the example data table 2540 of FIG. 25B. (Block 2430).

The example monitoring data processor 740 stores the mobile device identifier of the mobile device having the identified mobile device type in the example monitoring data database 745. An example data table 2580 showing associations of the fixed device identifier and the detected mobile device identifier is shown in the illustrated example of FIG. 25C. The example data table 2580 includes a fixed device identifier column 2585, a timestamp column 2590, and a detected mobile device column 2595. The example data table 2580 (like the example data table 2500 of FIG. 25A) includes two example rows 2597, 2598. The first example row 2597 (corresponding to the first example row 2520 of FIG. 25A) indicates that the mobile device MD001 was detected (because the hardware address of the example row 2520 of FIG. 25A indicated that the mobile device was a Samsung galaxy S4, which correlated with the mobile device information of MD001 in the example data table 1400 of FIG. 14). Similarly, the second example row 2598 (corresponding to the second example row 2525 of FIG. 25A) indicates that the mobile device MD002 was detected (because the hardware address of the example row 2525 of FIG. 25A indicated that the mobile device was an Apple iPhone 5S, which correlated with the mobile device information of MD002 and the example data table 1400 of FIG. 14).

The example monitoring data processor 740 then identifies demographic segment(s) associated with the identified mobile device(s). (Block 2440). In the illustrated example, the demographic segments identified by performing a lookup of the demographic segment associated with the identified mobile device via, for example, the example data table 1600 of the illustrated example of FIG. 16. The example probability estimator 760 computes a ratio of mobile devices associated with the demographic segments that are present on the local-area network of fixed device during a given time block (e.g., at the time of a network scan). (Block 2450). The ratio of mobile devices associated with the demographic segments is computed by dividing the number of mobile devices associated with the demographic segment and fixed device pair that were present at the time of the network scan by the total number of mobile devices associated with the demographic segment and fixed device pair. For example, if two mobile devices were associated with a fixed device and demographic segment pair, and both mobile devices were detected by the fixed device during the network scan, the computed ratio would be one hundred percent. A ratio of one hundred percent indicates that all mobile devices (which may, in some examples, have only been a single mobile device) associated with the fixed device and demographic pair were physically present at the location of the fixed device during the network scan.

The example monitoring data processor 740 stores the computed ratio in the monitoring data database 745. (Block 2460). To ensure that all network scans are accounted for, the example monitoring data processor 740 determines whether additional fixed device scans are available for processing. (Block 2480). If additional fixed device scans are available, the example monitoring data processor processes the scan information in the manner described above. The process of blocks 2410-2480 continues until all fixed device scans have been processed (e.g., a "no" result breaks from block 2480 to terminate the process of FIG. 24).

The above disclosed approaches determine probabilities of whether a mobile device and, as a result, a demographic segment, is physically present within a media presentation location. However, in some examples, the mobile device might be present in a media presentation location (e.g., a home), but might not be within a presentation proximity of a fixed device (e.g., the mobile device may be in a different room from the fixed device). Likewise, the user of the mobile device may be in the media presentation location, but not within the presentation proximity of the fixed device. Example approaches disclosed herein collect audio samples at both the fixed device and the mobile device to enable detection of whether the mobile device was within the presentation proximity of the fixed device. Such audio comparison may be used to supplement the calculation of the probability of whether a user associated with the mobile device is physically present in the media presentation location.

FIG. 26 is a flowchart representative of example machine-readable instructions which may be executed by the example fixed device 130 of FIGS. 1, 2, 3, and/or 4 to capture audio and relay the captured audio to the central facility 170 of FIGS. 1 and/or 7. The example process 2600 of the illustrated example of FIG. 26 begins when the audio capturer 470 of the example fixed device 130 of the illustrated example of FIG. 4 captures audio. (Block 2610). The example audio capturer 470 determines whether the captured audio exceeds a volume threshold. (Block 2620). In the illustrated example, the volume threshold is a decibel level of the captured audio. In the illustrated example, the volume threshold is fifty decibels, which is an approximate decibel level of a conversation. However, any other volume threshold may additionally or alternatively be used. For example, a volume threshold of seventy decibels, approximating an audio volume of a television may be used.

If the audio does not exceed the volume threshold, the example audio capturer 470 continues to capture audio until an audio sample that exceeds the volume threshold is captured. In the illustrated example, audio is captured in short segments (e.g., a one second segment, a two second segment, etc.) If the audio sample exceeds the volume threshold (Block 2620), the example timestamper 230 generates a timestamp to enable comparison of the correct audio samples (e.g., so that the samples are temporally aligned). (Block 2630). The example network communicator 220 then transmits the captured audio to the central facility. (Block 2640). In the illustrated example, the network communicator 220 transmits the audio sample using an HTTP message that includes cookie data that identifies the fixed device. However, any other approach to transmitting data and/or identifying the fixed device may additionally or alternatively be used.

Figure 27:
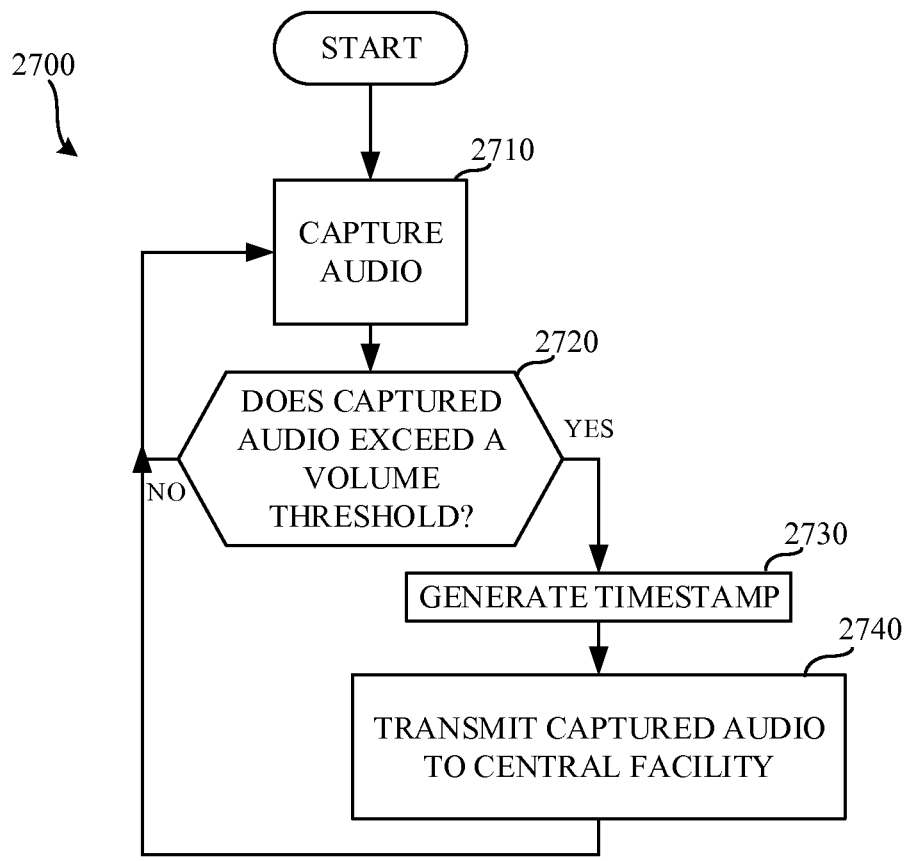
FIG. 27 is a flowchart representative of example machine-readable instructions which may be executed by the example mobile device 140 of FIGS. 1, 5, and/or 6 to capture audio and relay the captured audio to the central facility 170 of FIGS. 1 and/or 7.

FIG. 27 is a flowchart representative of example machine-readable instructions which may be executed by the example mobile device 140 of FIGS. 1, 5, and/or 6 to capture audio and relay the captured audio to the central facility 170 of FIGS. 1 and/or 7. The example process 2700 of the illustrated example of FIG. 27 begins when the audio capturer 630 of the example mobile device 140 of the illustrated example of FIG. 6 captures audio. (Block 2710). The example audio capturer 630 determines whether the audio exceeds a volume threshold. (Block 2720). In the illustrated example, the volume threshold is a decibel level of the captured audio. In the illustrated example, the volume threshold is fifty decibels, which is an approximate decibel level of a conversation. However, any other volume threshold may additionally or alternatively be used.

If the audio does not exceed the volume threshold, the example audio capturer 630 continues to capture audio until an audio sample that exceeds the volume threshold is captured. In the illustrated example, audio is captured in short segments (e.g., a one second segment, a two second segment, etc.) If the audio sample exceeds the volume threshold (Block 2720), the example timestamper 660 generates a timestamp to enable comparison of the correct audio samples (e.g., so that the samples are temporally aligned). (Block 2730). The example wireless communicator 520 then transmits the captured audio to the central facility 170. (Block 2740). In the illustrated example, the wireless communicator 520 transmits the audio sample using an HTTP message. In the illustrated example, the HTTP message includes cookie data that identifies the mobile device. However, any other approach to transmitting data and/or identifying the mobile device may additionally or alternatively be used.

Figure 28:
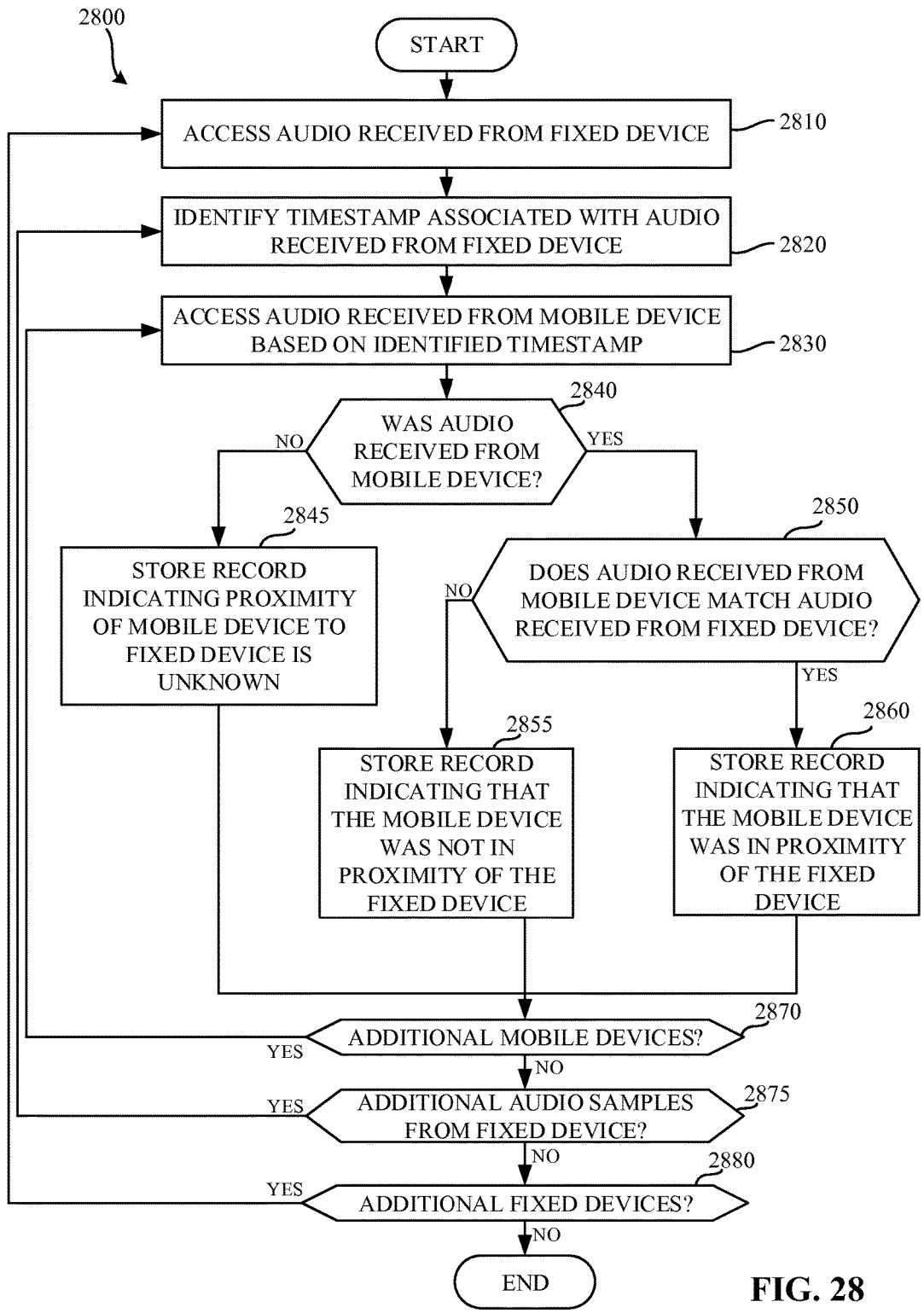
FIG. 28 is a flowchart representative of example machine-readable instructions which may be executed by the example central facility of FIGS. 1 and/or 7 to compare audio received from the fixed device of FIGS. 1, 2, 3, and/or 4 with audio received from the mobile device of FIGS. 1, 5, and/or 6.

FIG. 28 is a flowchart representative of example machine-readable instructions which may be executed by the example central facility 170 of FIGS. 1 and/or 7 to compare audio received from the fixed device 130 of FIGS. 1, 2, 3, and/or 4 with audio received from the mobile device 140 of FIGS. 1, 5, and/or 6. The example process 2800 of the illustrated example of FIG. 28 begins when the monitoring data processor 740 accesses an audio sample received from a fixed device. (Block 2810). The example monitoring data processor 740 identifies a timestamp associated with audio received from the fixed device 130. (Block 2820). The example monitoring data processor 740 accesses audio received from a mobile device associated with the fixed device based on the identified timestamp. (Block 2830). As an initial check, the example audio comparator 790 determines whether audio was received from the mobile device at the time indicated by the timestamp. (Block 2840). If, for example, audio was not received from the mobile device at or within a threshold period of time of the timestamp of the audio received from the fixed device, the example audio comparator 790 stores a record indicating that the proximity of the mobile device to the fixed device is unknown. (Block 2845). The location of the mobile device is unknown in this scenario because, for example, the mobile device may have been present at the media presentation location, but was not powered on and, therefore, did not capture audio. Furthermore, the example mobile device may have captured audio but determined that the audio did not meet the volume threshold for reporting purposes.

If audio was received from the mobile device (Block 2840), the audio comparator 790 compares the audio received from the fixed device to audio received from the mobile device to determine whether the two audios match. (Block 2850). If the audio does not match, the audio comparator stores a record indicating that the mobile device was not in proximity of the fixed device. (Block 2855). If the audio does match, the example audio comparator 790 stores a record indicating that the mobile device was in proximity of the fixed device. (Block 2860). In the illustrated example, the example audio comparator 790 stores the identification of the location of the mobile device in the monitoring data database 745. An example data table 2900 for storing such indication is shown in the illustrated example of FIG. 29. After the indication is stored, the example monitoring data processor 740 determines whether there are additional mobile devices associated with the fixed device to be analyzed. (Block 2870). If there are additional mobile devices to be analyzed, control proceeds to block 2830, where the example data processor 740 accesses audio received from that mobile device based on the identified timestamp and processes the same in the manner described above. The process of blocks 2830-2870 continues until all mobile devices have been processed (e.g., a "no" result breaks from block 2870 to block 2875). At block 2875, the example monitoring data processor 740 determines whether there are additional audio samples received from the fixed device to be analyzed. (Block 2875). If there are additional timestamps to be analyzed, control returns to block 2820 where the example data processor 740 identifies the timestamp, and proceeds to analyze audio having that timestamp received from the fixed device and the associated mobile devices in the manner described above. The process of blocks 2820-2875 continues until all audio received from the fixed device has been processed (e.g., a "no" result breaks from block 2875 to block 2880). To ensure that audio samples from all fixed devices are processed, the example monitoring data processor 740 then determines whether there are additional fixed devices to be analyzed. (Block 2880). If there are additional fixed devices to be analyzed, control returns to block 2810 where the example data processor accesses audio received from the fixed device to be analyzed, and proceeds to identify whether any mobile devices associated with the fixed device were present at the time that the audio samples were captured by the fixed device in the manner described above. The process of block 2810-2880 continues until all audio samples received from fixed devices have been processed (e.g., a "no" result breaks from block 2880 to terminate the process of FIG. 28).

FIG. 29 is an example data table representing captured audio comparisons performed by the example central facility 170 of FIGS. 1 and/or 7. The example data table 2900 of the illustrated example of FIG. 29 includes a timestamp column 2910, fixed device column 2920, an audio from fixed device, 2930, a mobile device, 2940, an audio from mobile device column 2950, and a presence detected column 2960. In the illustrated example of FIG. 29, the example data table 2900 includes four example rows 2970, 2975, 2980, 2985.

The first example row 2970 represents a comparison of audio received from the fixed device FD001 and audio received from the mobile device MD001 having the same timestamp. In the illustrated example, the audio received from the fixed device FD001 (shown in the audio from fixed device column 2930) matches the audio received from the mobile device MD001 (shown in the audio from mobile device column 2950). As such, the audio comparator 790 stores an indication that the mobile device MD001 was detected at the media presentation location at the time indicated by the timestamp.

The second example row 2975 represents a comparison of audio received from the fixed device FD001 and audio received from the mobile device MD002 having the same timestamp. In the illustrated example, the second example row 2975 indicates that audio was not received from the mobile device MD002. Accordingly, the example audio comparator 790 stores an indication that the presence of the mobile device MD002 is unknown.

The third example row 2980 represents a comparison of audio received from the fixed device FD001 and audio received from the mobile device MD001 having the same timestamp. In the illustrated example, the third example row 2980 indicates that audio received from the fixed device FD001 does not match the audio received from the mobile device MD001. Accordingly, the audio comparator 790 stores an indication that the mobile device was not present at the media presentation location at the time indicated by the timestamp.

The fourth example row 2985 represents a comparison of audio received from the fixed device FD001 and audio received from the mobile device MD002 having the same timestamp. In the illustrated example, the audio received from the fixed device FD001 matches the audio received from the mobile device MD002. As such, the audio comparator 790 stores an indication that the mobile device MD002 was detected at the media presentation location at the time indicated by the timestamp.

As noted above, comparisons of audio samples are part of a larger system for determining whether a particular mobile device (and/or a particular demographic segment associated with the user of that mobile device) is physically present at a media presentation location. For example, a user may be at a location other than the media presentation location, but be presented with the same media as is presented at the media presentation location. In such an example, relying on the audio comparison alone might result in a false positive that the mobile device was present at the media presentation location. Conversely, the mobile device might be at the media presentation location but be in a separate room (e.g., out of presentation proximity). In such an example, relying on the audio comparison alone might result in a false negative that the mobile device was not present at the media presentation location (whereas a network scan may indicate that the mobile device is present).

In some examples, in addition to determining a probability that a mobile device and, in extension, a probability that a demographic segment of a user associated with the mobile device was present at a media presentation, example methods, apparatus, and articles of manufacture disclosed herein enable monitoring of media presented at a media presentation location. Identifications of media are, in some examples, used in connection with the probabilities to determine, for example, whether identified media was presented to a particular demographic segment.

Figure 30:
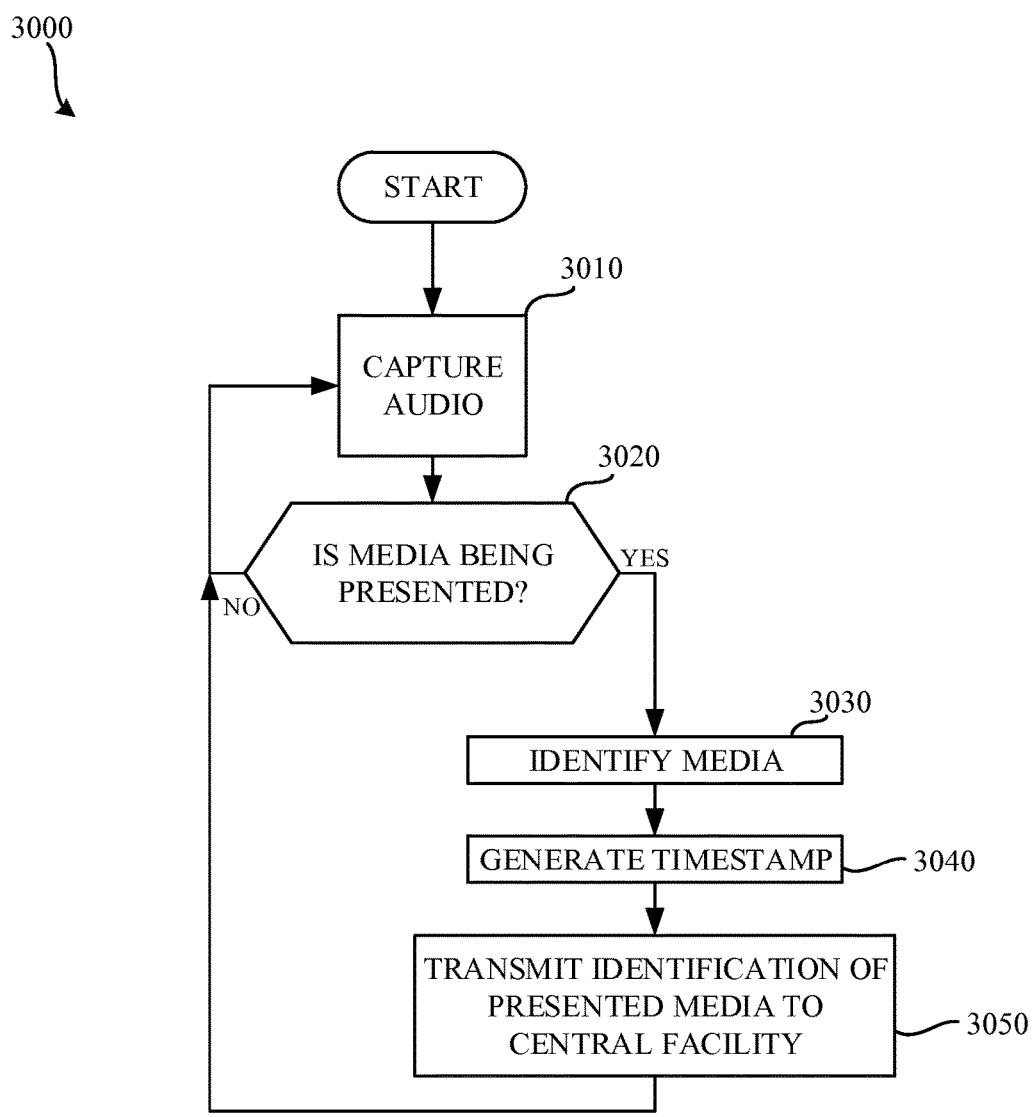
FIG. 30 is a flowchart representative of example machine-readable instructions which may be executed by the example fixed device of FIGS. 1, 2, 3, and/or 4 to monitor media presented at the fixed device.

FIG. 30 is a flowchart representative of example machine-readable instructions which may be executed by the example fixed device 130 of FIGS. 1, 2, 3, and/or 4 to monitor media presented at the fixed device 130. The example process 3000 of the illustrated example of FIG. 30 begins when the audio capturer 470 of the example fixed device 130 of the illustrated example of FIG. 4 captures audio. (Block 3010). The example media monitor 480 of the illustrated example of FIG. 4 then determines whether media is being presented. (Block 3020). The example media monitor 480 identifies whether media is being presented by attempting to detect a code and/or signature within the captured audio. If media is being presented (e.g., a code and/or signature is detected) the media monitor 480 identifies the media (Block 3030). In the illustrated example, the example media monitor 480 identifies the media using codes and/or signatures. However, any other approach to identifying media may additionally or alternatively be used. For example, the media monitor may interface with the native fixed device functionality 210 of the fixed device 130 to retrieve an identifier of the media presented by the native fixed device functionality 210. Upon media identification, the example timestamper 230 generates a timestamp indicative of the time of the media presentation. (Block 3040).

The example media monitor 480 of the illustrated example transmits the identification of the presented media to the central facility 170 via the network communicator 220. (Block 3050). In the illustrated example, the network communicator 220 transmits the media identifier using an HTTP message. In the illustrated example, the HTTP message includes cookie data that identifies the fixed device. However, any other approach to transmitting data and/or identifying the fixed device may additionally or alternatively be used. For example, the fixed device identifier may be transmitted as part of a payload of the HTTP message.

In some examples, the example fixed device 130 does not perform media identification and, instead, captures audio samples and transmits the captured audio samples to the central facility 170. In such an example, the central facility 170 may include a media monitor to identify presented media using the captured audio samples. Using such an approach results in lessened processing and/or memory requirements required to operate such media monitor because the example fixed device does not perform media identification and, instead, functions as a conduit to capture and transmit audio samples to the central facility 170.

FIG. 31 is an example data table representing media identifications of media presented at the fixed device 130. The example data table 3100 of the illustrated example of FIG. 31 includes a fixed device identifier column 3110, an identified media column 3120, and a timestamp column 3130. The example data table 3100 of the illustrated example of FIG. 31 includes three example rows 3140, 3150, 3160. While, in the illustrated example of FIG. 31, three example rows are shown for the sake of ease of explanation, in practice, many additional rows representing many additional identified media presentations will additionally be used. The first example row 3140 identifies that the fixed device FD001 presented the media "GAME OF THRONES" on October 18. The second example row 3150 identifies that the fixed device FD002 presented the media "FAMILY GUY" on October 19. The third example row 3160 identifies that the fixed device FD001 presented the media "@MIDNIGHT" on October 20.

Figure 32:
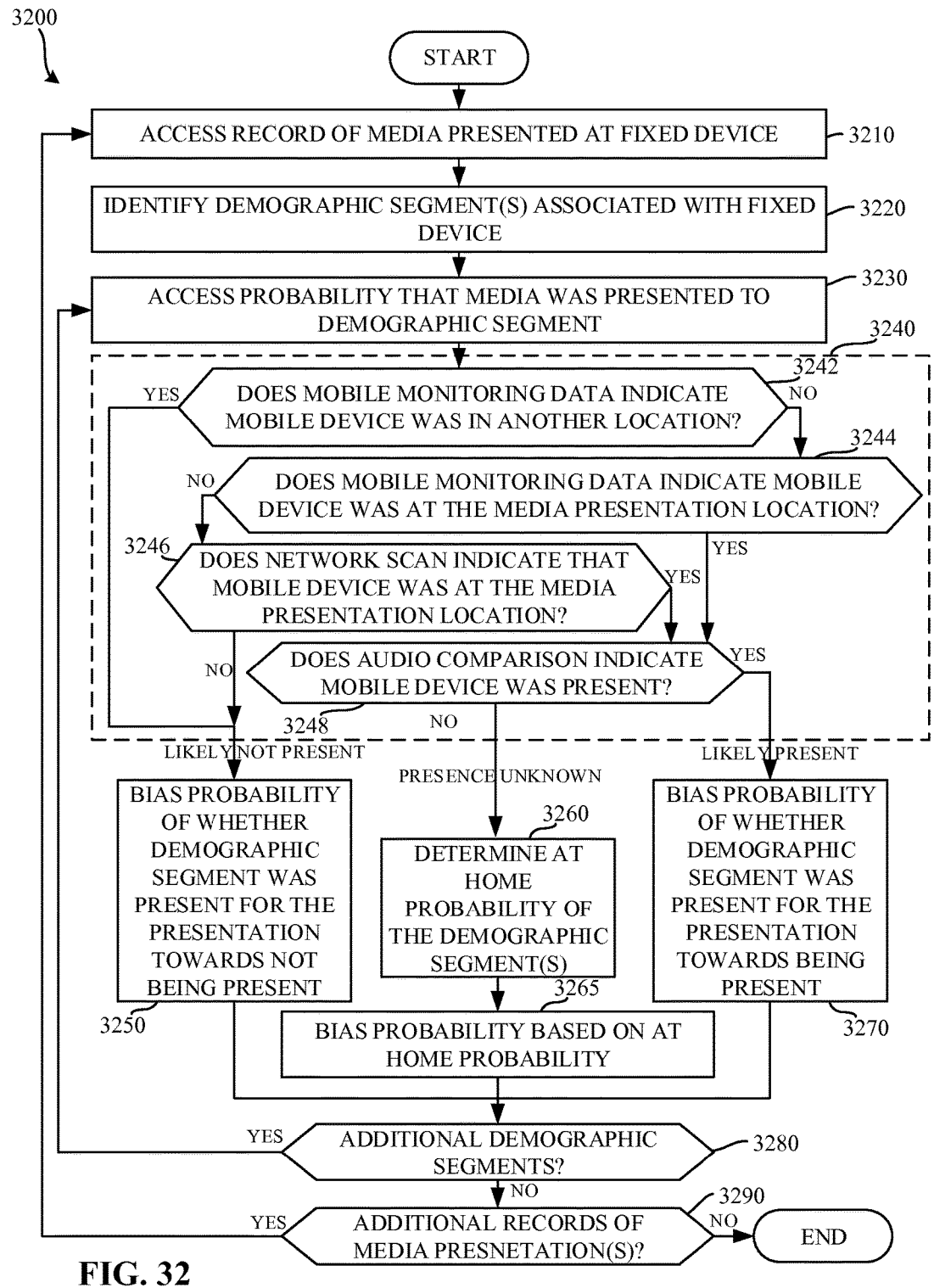
FIG. 32 is a flowchart representative of example machine-readable instructions which may be executed by the example central facility of FIGS. 1 and/or 2 to bias a probability of whether a demographic segment was present during a media presentation.

FIG. 32 is a flowchart representative of example machine-readable instructions which may be executed by the example central facility of FIGS. 1 and/or 2 to bias a probability of whether a demographic segment was present during a media presentation.

The example process 3200 of the illustrated example of FIG. 32 begins when the monitoring data processor 740 accesses a record of media presented at the fixed device. (Block 3210). The monitoring data processor 740 then identifies demographic segments associated with fixed device. (Block 3220). In the illustrated example, the monitoring data processor 740 identifies the demographic segments associated with fixed device by performing a look up in the monitoring data database 745 keyed off of the fixed device identifier (e.g., a lookup in the example data table 1800 of the illustrated example of FIG. 18).

The example monitoring data processor 740 accesses a probability that the identified media was presented to the identified demographic segments from the census and panelist monitoring data database 755. (Block 3230). In the illustrated example, the probability is a baseline probability that is generic to all users having demographic segment. The example baseline probabilities are stored in the examples census and panelist monitoring data database 755 as a result of other monitoring efforts such as, for example, panelist and/or census monitoring systems (e.g., systems that monitor media exposure of persons having known demographic information). An example data table representing baseline probabilities is shown in the illustrated example of FIG. 33. The example data table 3300 of the illustrated example of FIG. 33 includes a media identification column 3310, a demographic segment column 3320, and a baseline probability column 3330. The example data table 3300 includes three example sets of media identification and demographic segment pairs 3340, 3350, 3360. The media identification and demographic segment pairs each have a baseline probability. The baseline probability forms a starting point for further analysis by the probability estimator 760.

In the illustrated example, the probability estimator 760 determines whether mobile device(s) associated with the fixed device and demographic segment pair were present during the identified media presentation. (Block 3240). In the illustrated example, the example probability estimator 760 determines whether mobile device(s) associated with the fixed device and demographic segment pair were present by consulting (1) the results of the audio comparison, (2) the results of the network scan, and/or (3) the mobile monitoring data received from the mobile device. To determine whether a user of the demographic segment was present, the example probability estimator 760 determines whether the mobile monitoring data associated with the fixed device and demographic segment pair indicates that the mobile device(s) associated with that fixed device and demographic segment pair indicates that the mobile device(s) was/were in another location (e.g., actively using a non-home access point) at the corresponding time. (Block 3242). In the illustrated example, the determination is based on whether the public IP address of the mobile device(s) matches the public IP address of the fixed device at the time of the presentation of the media. If the mobile monitoring data indicates that the mobile device(s) was/were in another location (e.g., using a non-home access point), the example probability estimator 760 identifies that the user of the demographic segment associated with the mobile device(s) was not likely present at the time of the media presentation.

If the mobile monitoring data does not indicate that the mobile device(s) was/were in another location (e.g., a non-home access point was not actively used by the corresponding mobile device at the time of the media presentation), the example probability estimator 760 determines whether the mobile monitoring data from the mobile device(s) associated with the fixed device and demographic segment pair indicates that the mobile device(s) was/were using the home access point (e.g., the home access point 122) at the time of the media presentation. (Block 3244). In the illustrated example, the determination is based on whether the public IP address of the mobile device(s) matches the public IP address of the fixed device at the time of the presentation of the media. If the public IP address of the mobile device(s) matches the public IP address of the fixed device at the time of the presentation of the media, the example probability estimator 760 proceeds to determine whether an audio comparison of audio received from the mobile device(s) matches audio received from the fixed device. (Block 3248). Such comparison ensures that, in the event that the mobile device was within the media presentation location but was not near (e.g., not within presentation proximity of) the media presentation, that the media presentation is not credited with exposure to the identified device.

If the mobile monitoring data comparison is inconclusive (e.g., no mobile monitoring data was received from the mobile device(s) in association with the time of the media presentation) (Block 3242), the probability estimator 760 determines whether a network scan (e.g., the local area network scan performed by the fixed device) indicates that the mobile device(s) was/were present at the time of the media presentation. (Block 3246). The example network scan may provide such an indication because, for example, the mobile device(s) was/were at the media presentation location (and responsive to messages involved in the network scan), but was not generating mobile monitoring data at the time of the media presentation. If the network scan does not identify that the mobile device(s) was/were present, the probability estimator 760 identifies that the user of the demographic segment associated with the mobile device(s) was likely present at the time of the media presentation.

If the network scan identifies that the mobile device(s) was/were present at the fixed device at the time of the presentation (Block 3246), the example probability estimator 760 proceeds to determine whether an audio comparison of audio received from the mobile device(s) matches audio received from the fixed device. (Block 3248). Such comparison ensures that, in the event that the mobile device was within the media presentation location but was not near (e.g., not within presentation proximity of) the media presentation, that the media presentation is not credited with an exposure to the mobile device. If the audio comparison indicates the presence of the mobile device in presentation proximity of the media presentation location, the probability estimator identifies that the user of the demographic segment was likely present at the media presentation location of the fixed device. (Block 3270) If the audio comparison does not indicate the presence of the mobile device in presentation proximity of the media presentation location, the probability estimator 760 identifies that the location of the user of the demographic segment is unknown. (Block 3260).

While, in the illustrated example, (1) the results of the audio comparison, (2) the results of the network scan, and/or (3) the mobile monitoring data received from the mobile device, are used to determine the presence of the mobile device (and, as an extension, a user of a particular demographic segment) is present at a media presentation location and/or within presentation proximity of the media in question, any other approach may additionally or alternatively be used. For example, the determination may be based on any combination of the above-referenced factors such as, for example, the determination may be based on the mobile monitoring data alone. Moreover, instead of the logical flow presented in block 3240 (e.g., blocks 3242, 3244, 3246, 3248), any other approach to detecting the presence of the mobile device may additionally or alternatively be used. For example, weighting factors applied to each of the criteria may be used to produce a likelihood score of whether the mobile device is present.

If mobile devices associated with the fixed device and demographic segment pair were not likely present during the media presentation, the probability estimator 760 biases (e.g., modifies) the baseline probability of whether the demographic segment was present for the media presentation towards having not been present (e.g., the baseline probability is lowered). (Block 3250). In the illustrated example, the baseline probability is lowered by averaging the baseline probability with a low probability (e.g., zero percent, five percent, ten percent, etc.). However, any other approach to biasing the probability may additionally or alternatively be used. For example, a weighted average may be used, the probability may be set to zero percent, etc. For example, if a particular show was presented, but the user of that demographic segment was not present at the media presentation location during the media presentation, it is not as likely that the demographic segment was presented with the identified media. The example probability estimator 760 stores the modified probability in the example monitoring data database 745. In some examples, the modified probability is stored in the example monitoring data database 745 by executing an update statement against a currently stored probability. An example data table 3400 illustrating example modified probability is shown in the illustrated example of FIG. 34.

If the location of the mobile device(s) associated with the fixed device and demographic segment is unknown, the example probability estimator 760 determines the at home probability of the demographic segment associated with the fixed device at the time of the media presentation. (Block 3260). In the illustrated example, the example probability estimator 760 performs a lookup to determine the at home probability via, for example, the example data table 2000 of the illustrated example of FIG. 20. The example probability estimator 760 then biases (e.g., modifies) the baseline probability based on the identified at home probability. (Block 3265). In the illustrated example, the baseline probability is biased by averaging the baseline probability with the identified at-home probability (from the at-home probability column 2030 of FIG. 20). However, any other approach to biasing the probability may additionally or alternatively be used. For example, a weighted average may be used, the at-home probability from the example at-home probability column 2030 of FIG. 20 may be used, etc.

If the mobile device(s) associated with the fixed device and demographic segment pair was/were present during the media presentation, the probability estimator 760 biases (e.g., modifies) the probability of whether the demographic segment was present for the media presentation towards having been present. (Block 3270). In the illustrated example, the baseline probability is raised by averaging the baseline probability with a high probability (e.g., one hundred percent, ninety five percent, ninety percent, etc.). However, any other approach to biasing the probability may additionally or alternatively be used. For example, a weighted average may be used, the probability may be set to one hundred percent, etc. For example, if a particular media was presented, and the mobile device associated with a user of the demographic segment in question was present at the media presentation location during the media presentation, it is likely that the demographic segment was presented with the identified media, and the baseline probability is increased to indicate the stronger likelihood of the user of the demographic segment being present. The example probability estimator 760 of the illustrated example stores the modified probability in the example monitoring data database 745.

The example monitoring data processor 740 identifies whether additional demographic segments are associated with the fixed device. (Block 3280). If additional demographic segments are associated with the fixed device, the example monitoring data processor 740 accesses a baseline probability that media was presented to the additional demographic segment, and proceeds to bias (e.g., modify) the baseline probability according to whether the mobile device(s) associated with the fixed device and demographic segment pair were present during the presentation in the manner described above. The process of blocks 3230-3280 continues until all demographic segments associated with the fixed device have been processed (e.g., a "no" result breaks from block 3280 to block 3290). If no additional demographic segments are associated with the fixed device (Block 3280), the example monitoring data processor 740 determines whether additional records of media presentations exist for analysis. (Block 3290). If additional records exist, the example monitoring data processor 740 accesses a record of the media presented at the fixed device, and processes the identification of the media to determine probabilities of particular demographic segments being present for the media presentation in the manner described above. The process of blocks 3210-3290 continues until all records of media presentation(s) have been processed (e.g., a "no" result breaks from block 3290 to terminate the process of FIG. 32).

FIG. 34 is an example data table 3400 representing modified probabilities of media exposure based on whether a mobile device associated with a demographic segment was present during a media presentation. The example data table 3400 the illustrated example of FIG. 34 includes a fixed device identifier column 3410, an identified media column 3420, a timestamp column 3430, a demographic segment column 3440, a baseline probability column 3450, a modified probability column 3460, and a modification reason column 3470.

The example data table 3400 of the illustrated example of FIG. 34 includes four example rows 3480, 3485, 3490, 3495. The four example rows include data indicating probabilities that a particular demographic segment was presented with particular media. The first example row 3480 identifies that the Caucasian male between the ages of 2535 has increased probability of having been presented with "GAME OF THRONES", because the presence of the mobile device ME001 (associated with the Caucasian male between the ages of 25 and 35) at the fixed device FD001 was detected. The second example row 345 identifies that the Caucasian female between the ages of 25 and 35 has a lower probability of having been presented "GAME OF THRONES". In the illustrated example, the second example row 3485 indicates the user location was unknown. However, as shown in the second example row 2050 of the example data table 2000 of the illustrated example of FIG. 20, the Caucasian female between the ages of 25 and 35 associated with the fixed device FD001 has a lower probability of being at home in the late afternoon (i.e., when the "GAME OF THRONES" was presented). The third example row 3490 indicates that the Caucasian male between the ages of 25 and 35 has a low probability of having been presented the show "@MIDNIGHT", because the Caucasian male between the ages of 25 and 35 associated with the fixed device FD001 was known to be away at the time of presentation. The fourth example row 3495 indicates a heightened probability that the Caucasian female between the ages of 25 and 35 was presented with the show "@MIDNIGHT", because the presence of the Caucasian female between the ages of 25 and 35 associated with the fixed device FD001 was detected at the time of the presentation.

Figure 35:
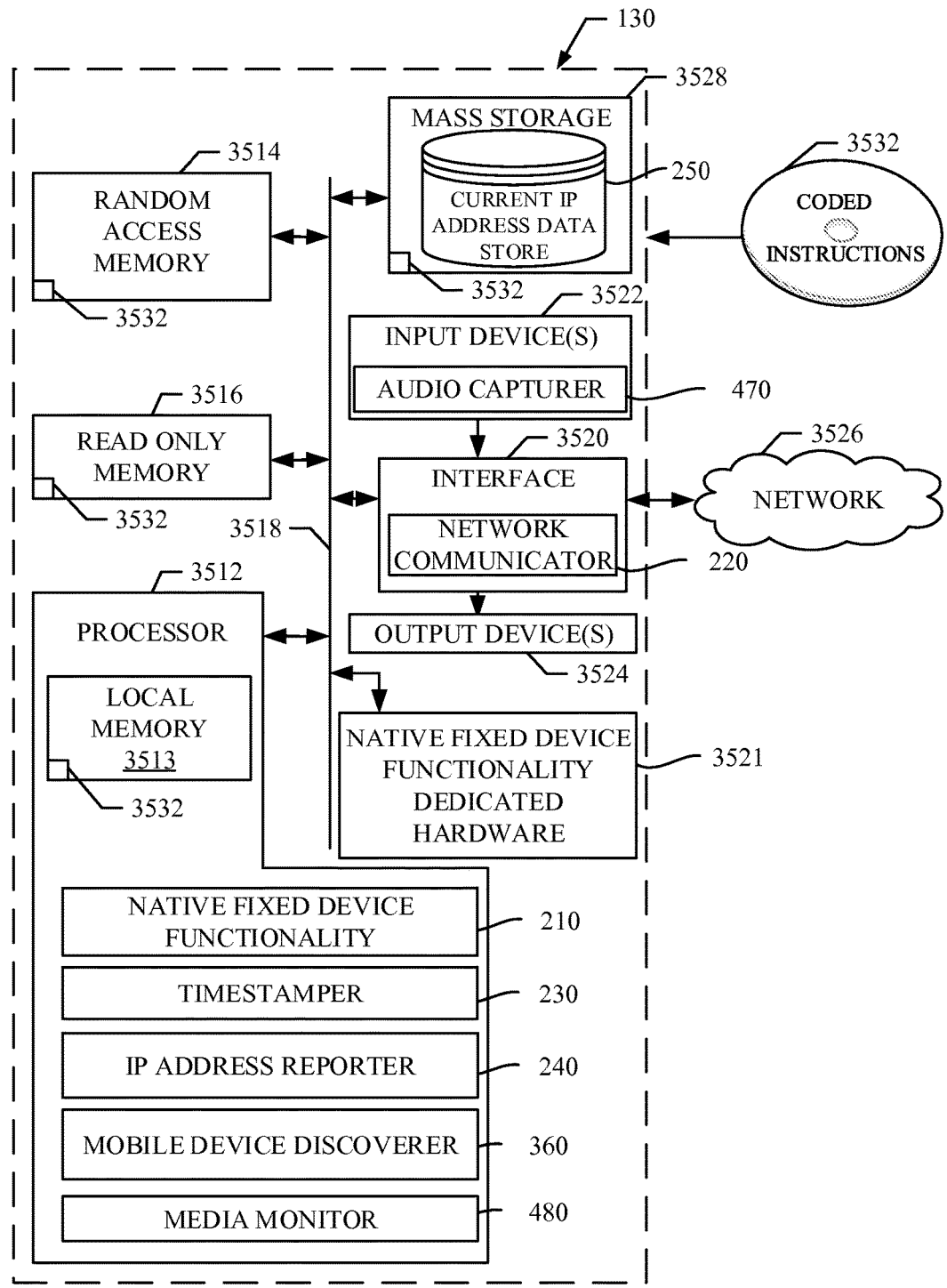
FIG. 35 is a block diagram of an example fixed device structured to execute the example machine-readable instructions of FIGS. 9, 22, 26, and/or 28 to implement the example fixed device of FIGS. 1, 2, 3, and/or 4.

FIG. 35 is a block diagram of example hardware structured to execute the instructions of FIGS. 9, 23, 26, and/or 30 to implement the fixed device 130 of FIGS. 1, 2, 3, and/or 4. The fixed device 130 can be, for example, a personal computer, an Internet appliance, a DVD player, a CD player, a digital video recorder, a Blu-ray player, a gaming console, a personal video recorder, a set top box, an Internet enabled thermostat, a television, an Internet enabled refrigerator, a home automation system, a home security system, an IOT device, and/or any other type of computing device.

The fixed device 130 of the illustrated example includes a processor 3512. The processor 3512 of the illustrated example is hardware semiconductor based hardware device. For example, the processor 3512 can be implemented by one or more integrated circuits, logic circuits, microprocessors, or controllers from any desired family or manufacturer.

The processor 3512 of the illustrated example includes a local memory 3513 (e.g., a cache), and executes instructions to implement the example native fixed device functionality 210, the example timestamper 230, the example IP address reporter 240, the example mobile device discoverer 360, and/or the example media monitor 480. The processor 3512 of the illustrated example is in communication with a main memory including a volatile memory 3514 and a non-volatile memory 3516 via a bus 3518. The volatile memory 3514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3516 may be implemented by flash memory and/or any other desired type of memory device. Access to the main memory 3514, 3516 is controlled by a memory controller.

In the illustrated example, the example processor 3512 of the illustrated example is in communication with native fixed device functionality dedicated hardware 3521 via the bus 3518. The example native fixed device functionality dedicated hardware 3521 of the illustrated example implements the native fixed device functionality 210. In the illustrated example, the example native fixed device functionality dedicated hardware 3521 is implemented by a hardware processor. However, the example native fixed device functionality dedicated hardware 3521 may be implemented in any other fashion such as, for example, a wireless communication interface, a sensor (e.g., a gyroscope, a microphone, etc.), etc.

The fixed device 130 of the illustrated example also includes an interface circuit 3520. The interface circuit 3520 may be implemented by any type of interface standard, such as an Ethernet interface, a universal serial bus (USB), and/or a PCI express interface.

In the illustrated example, one or more input devices 3522 are connected to the interface circuit 3520. The input device(s) 3522 permit(s) a user to enter data and commands into the processor 3512. The input device(s) can be implemented by, for example, an audio sensor, a microphone, a camera (still or video), a keyboard, a button, a mouse, a touchscreen, a track-pad, remote control, a trackball, isopoint and/or a voice recognition system. The example input devices 3522 implement the example audio capturer 470.

One or more output devices 3524 are also connected to the interface circuit 3520 of the illustrated example. The output devices 3524 can be implemented, for example, by display devices (e.g., a light emitting diode (LED), an organic light emitting diode (OLED), a liquid crystal display, a cathode ray tube display (CRT), a touchscreen, and/or speakers). The interface circuit 3520 of the illustrated example, thus, typically includes a graphics driver card, a graphics driver chip or a graphics driver processor.

The interface circuit 3520 of the illustrated example also includes a communication device such as a transmitter, a receiver, a transceiver, a modem and/or network interface card to facilitate exchange of data with external machines (e.g., computing devices of any kind) via a network 3526 (e.g., an Ethernet connection, a digital subscriber line (DSL), a telephone line, coaxial cable, a cellular telephone system, etc.). The example interface circuit 3520 implements the example network communicator 220.

The fixed device 130 of the illustrated example also includes one or more mass storage devices 3528 for storing software and/or data. Examples of such mass storage devices 3528 include floppy disk drives, hard drive disks, compact disk drives, Blu-ray disk drives, RAID systems, and digital versatile disk (DVD) drives. The example mass storage 3528 implements the example current IP address data store 250.

The coded instructions 3532 of FIGS. 9, 23, 26, and/or 30 may be stored in the mass storage device 3528, in the volatile memory 3514, in the non-volatile memory 3516, and/or on a removable tangible computer readable storage medium such as a CD or DVD.

Figure 36:
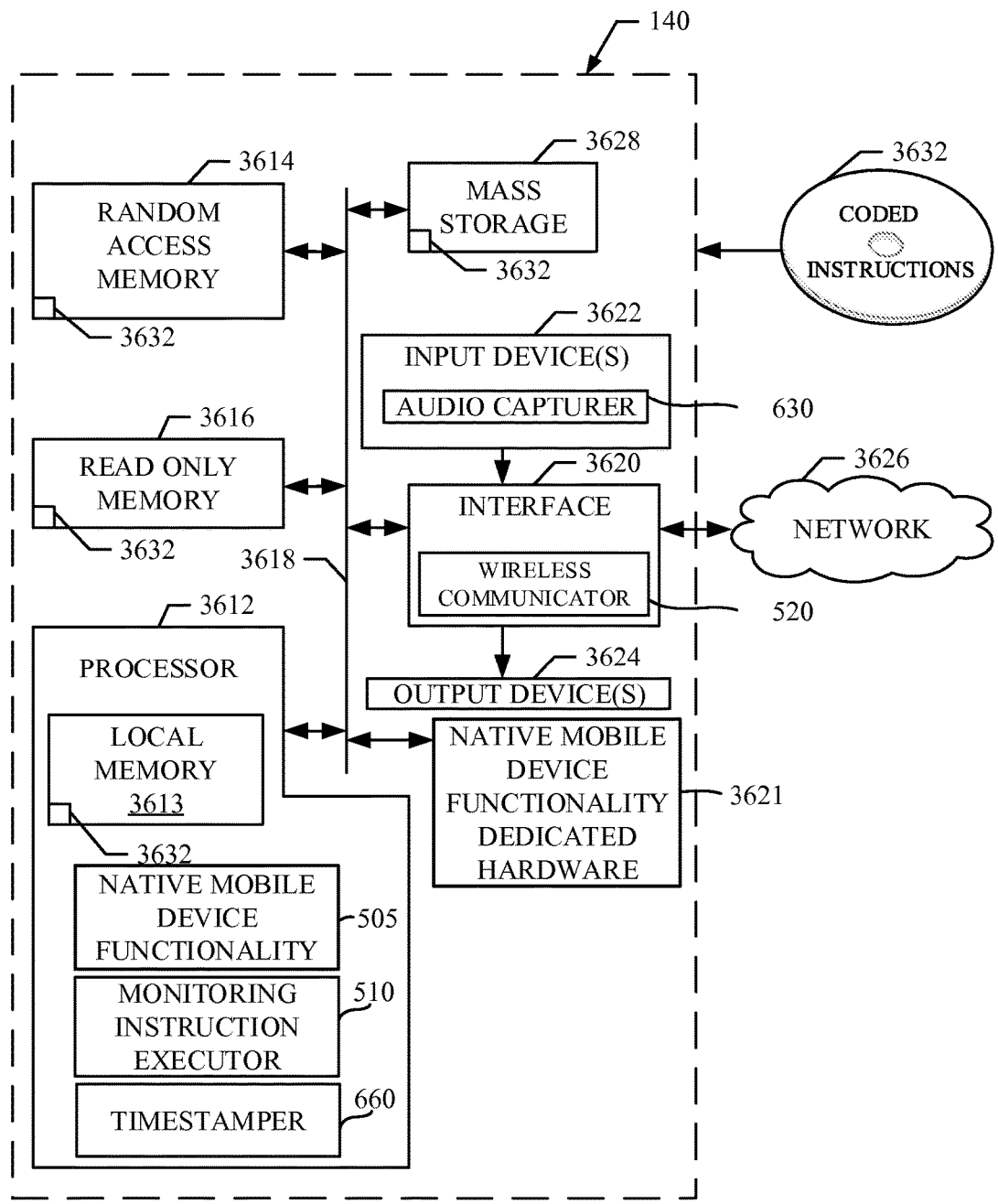
FIG. 36 is a block diagram of an example mobile device structured to execute the example machine-readable instructions of FIGS. 12 and/or 29 to implement the example mobile device of FIGS. 1, 5, and/or 6.

FIG. 36 is a block diagram of example hardware structured to execute the instructions of FIGS. 12 and/or 27 to implement the example mobile device 140 of FIGS. 1, 5, and/or 6. The mobile device 140 can be, for example, a personal computer (e.g., a laptop computer), a cell phone, a smart phone, a tablet (e.g., an iPad™), a personal digital assistant (PDA), and/or any other type of computing device.

The mobile device 140 of the illustrated example includes a processor 3612. The processor 3612 of the illustrated example is a semiconductor based hardware device. For example, the processor 3612 can be implemented by one or more integrated circuits, logic circuits, microprocessors, or controllers from any desired family or manufacturer.

The processor 3612 of the illustrated example includes a local memory 3613 (e.g., a cache), and executes instructions to implement the example native mobile device functionality 505, the example monitoring instruction executor 510, and/or the example timestamper 660. The processor 3612 of the illustrated example is in communication with a main memory including a volatile memory 3614 and a non-volatile memory 3616 via a bus 3618. The volatile memory 3614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3616 may be implemented by flash memory and/or any other desired type of memory device. Access to the main memory 3614, 3616 is controlled by a memory controller.

In the illustrated example, the example processor 3612 of the illustrated example is in communication with native mobile device functionality dedicated hardware 3621 via the bus 3618. The example native mobile device functionality dedicated hardware 3621 of the illustrated example implements the native mobile device functionality 505. In the illustrated example, the example native mobile device functionality dedicated hardware 3621 is implemented by a hardware processor. However, the example native fixed device functionality dedicated hardware 3621 may be implemented in any other fashion such as, for example, a wireless communication interface, a sensor (e.g., a gyroscope, a microphone, etc.), etc.

The mobile device 140 of the illustrated example also includes an interface circuit 3620. The interface circuit 3620 may be implemented by any type of interface standard, such as an Ethernet interface, a universal serial bus (USB), and/or a PCI express interface.

In the illustrated example, one or more input devices 3622 are connected to the interface circuit 3620. The input device(s) 3622 permit(s) a user to enter data and commands into the processor 3612. The input device(s) can be implemented by, for example, an audio sensor, a microphone, a camera (still or video), a keyboard, a button, a mouse, a touchscreen, a track-pad, a trackball, isopoint, and/or a voice recognition system. The example input devices 3622 implement the example audio capturer 630.

One or more output devices 3624 are also connected to the interface circuit 3620 of the illustrated example. The output devices 3624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 3620 of the illustrated example, thus, typically includes a graphics driver card, a graphics driver chip or a graphics driver processor.

The interface circuit 3620 of the illustrated example also includes a communication device such as a transmitter, a receiver, a transceiver, a modem and/or network interface card to facilitate exchange of data with external machines (e.g., computing devices of any kind) via a network 3626 (e.g., an Ethernet connection, a digital subscriber line (DSL), a telephone line, coaxial cable, a cellular telephone system, etc.). The example interface circuit 3620 implements the example wireless communicator 520.

The processor platform 3600 of the illustrated example also includes one or more mass storage devices 3628 for storing software and/or data. Examples of such mass storage devices 3628 include floppy disk drives, hard drive disks, compact disk drives, Blu-ray disk drives, RAID systems, and digital versatile disk (DVD) drives.

The coded instructions 3632 of FIGS. 12 and/or 27 may be stored in the mass storage device 3628, in the volatile memory 3614, in the non-volatile memory 3616, and/or on a removable tangible computer readable storage medium such as a CD or DVD.

Figure 37:
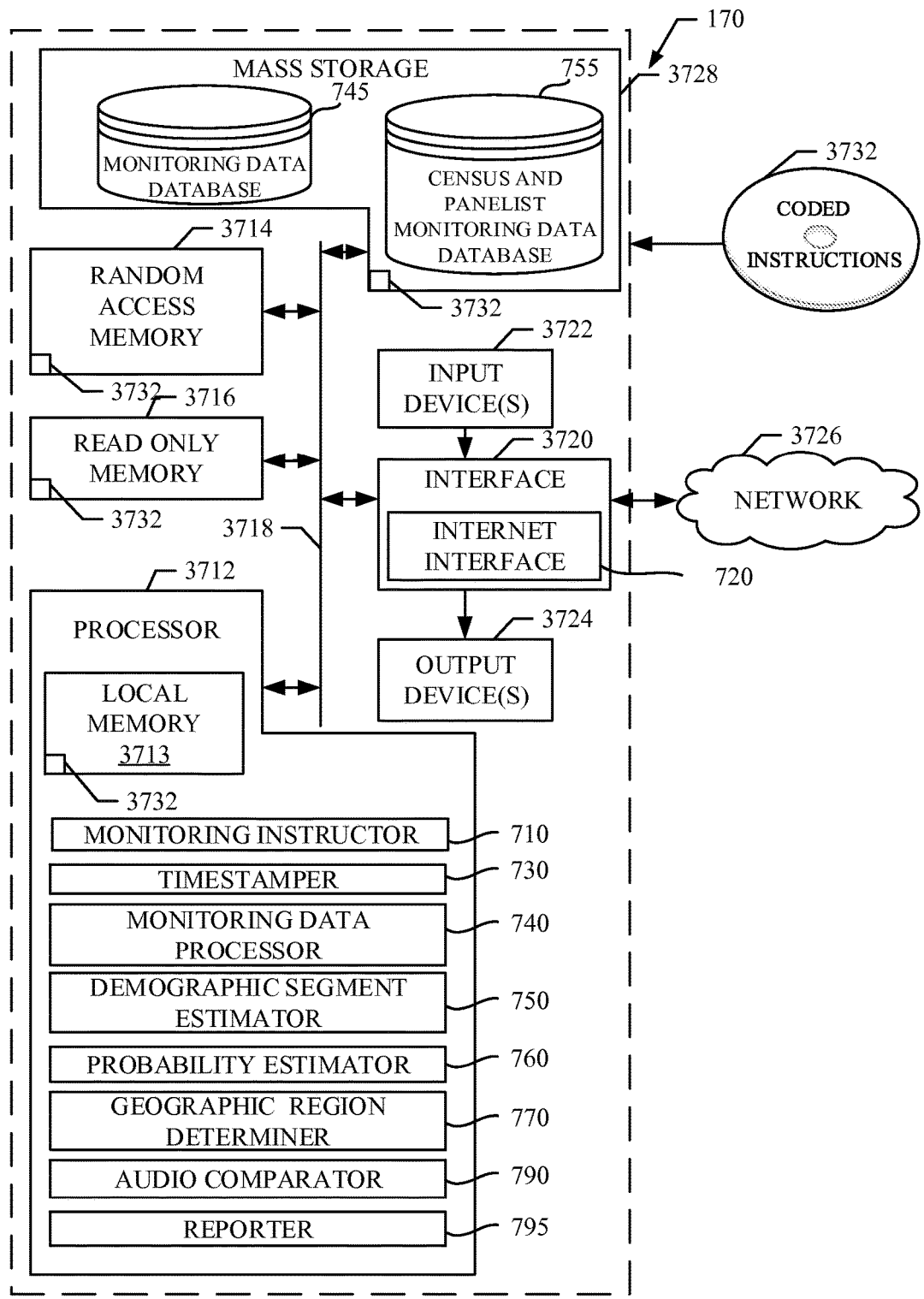
FIG. 37 is a block diagram of an example server structured to execute the example machine-readable instructions of FIGS. 8, 10, 13, 15, 17, 17A, 19, 21, 24, 30, and/or 32 to implement the example central facility of FIGS. 1 and/or 7.

FIG. 37 is a block diagram of example hardware structured to execute the instructions of FIGS. 8, 10, 13, 15, 17, 17A, 19, 21, 24, 28, and/or 32 to implement the example central facility 170 of FIGS. 1 and/or 7. The central facility 170 can be, for example, a server, a personal computer, and/or any other type of computing device.

The central facility 170 of the illustrated example includes a processor 3712. The processor 3712 of the illustrated example is semiconductor based hardware device. For example, the processor 3712 can be implemented by one or more integrated circuits, logic circuits, microprocessors, or controllers from any desired family or manufacturer.

The processor 3712 of the illustrated example includes a local memory 3713 (e.g., a cache), and executes instructions to implement the example monitoring instructor 710, the example timestamper 730, the example monitoring data processor 740, the example demographic segment estimator 750, the example probability estimator 760, the example geographic region determiner 770, the example audio comparator 790, and/or the example reporter 795. The processor 3712 of the illustrated example is in communication with a main memory including a volatile memory 3714 and a non-volatile memory 3716 via a bus 3718. The volatile memory 3714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3716 may be implemented by flash memory and/or any other desired type of memory device. Access to the main memory 3714, 3716 is controlled by a memory controller.

The central facility 170 of the illustrated example also includes an interface circuit 3720. The interface circuit 3720 may be implemented by any type of interface standard, such as an Ethernet interface, a universal serial bus (USB), and/or a PCI express interface.

In the illustrated example, one or more input devices 3722 are connected to the interface circuit 3720. The input device(s) 3722 permit(s) a user to enter data and commands into the processor 3712. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 3724 are also connected to the interface circuit 3720 of the illustrated example. The output devices 3724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer, and/or speakers). The interface circuit 3720 of the illustrated example, thus, typically includes a graphics driver card, a graphics driver chip or a graphics driver processor.

The interface circuit 3720 of the illustrated example also includes a communication device such as a transmitter, a receiver, a transceiver, a modem and/or network interface card to facilitate exchange of data with external machines (e.g., computing devices of any kind) via a network 3726 (e.g., an Ethernet connection, a digital subscriber line (DSL), a telephone line, coaxial cable, a cellular telephone system, etc.). The example interface circuit 3720 implements the example Internet interface 720.

The central facility 170 of the illustrated example also includes one or more mass storage devices 3728 for storing software and/or data. Examples of such mass storage devices 3728 include floppy disk drives, hard drive disks, compact disk drives, Blu-ray disk drives, RAID systems, and digital versatile disk (DVD) drives. The example mass storage device(s) 3728 implement the example monitoring data database 745 and/or the example census and panelist monitoring data database 755.

The coded instructions 3732 of FIGS. 8, 10, 13, 15, 17, 17A, 19, 21, 24, 28, and/or 32 may be stored in the mass storage device 3728, in the volatile memory 3714, in the non-volatile memory 3716, and/or on a removable tangible computer readable storage medium such as a CD or DVD.

From the foregoing, it will be appreciated that methods, apparatus, and articles of manufacture have been disclosed which enable identification of whether a demographic segment is physically present at a media presentation location at a particular time. Moreover, when media is monitored at the media presentation location, example methods, apparatus, and articles of manufacture disclosed herein enable identification of whether a demographic segment was present for a particular media presentation.

Example methods, apparatus, and articles of manufacture disclosed herein utilize fixed devices within media presentation locations that report their public IP address to the central facility of the AME. In some examples, the fixed devices are consumer electronics devices that have been implemented to return the IP address information to the central facility. In such examples, the fixed devices are devices that would otherwise still be operating at the media presentation location. For example, users will likely own and/or operate a fixed device (e.g., a television, a thermostat, etc.) regardless of whether the fixed device was implemented to return the IP address information. As a result, set top boxes need not be provided by the AME to the media presentation location. Consequently, there are less devices operating in the media presentation location than would otherwise be required to gather the same amount of data. When fewer devices are operating at the media presentation location, less power is consumed. Consuming less power compared to systems that would otherwise be used to gather the same data is more efficient and complies with environmental efforts to conserve energy. Furthermore, when the fixed device is implemented using an Internet of Things (IoT) device, power consumption is further reduced because IoT devices typically consume very little power.

Example methods, apparatus, and articles of manufacture disclosed herein report an IP address from a fixed device to a central facility of the AME. In examples disclosed herein, the fixed device determines if the IP address has changed, and only informs the central facility of the IP address upon detection of a change. Even in dynamic IP address systems, Internet Service Providers (ISPs) typically allocate public IP addresses using relatively long term leases (e.g., one week, one month, etc.). Upon expiration of the lease, the ISP issues a new public IP address. By transmitting the public IP address of the fixed device to the central facility upon detection of a change, bandwidth requirements of the fixed device are reduced.

Example methods, apparatus, and articles of manufacture disclosed herein report captured audio to the central facility from the fixed device and/or the mobile device. In examples disclosed herein, captured audio is only reported when the captured audio meets or exceeds a volume threshold. As a result, the fixed device and/or the mobile device will not transmit captured audio when media is not presented (e.g., when the audio does not meet or exceed the volume threshold). Consequently, bandwidth requirements for transmitting the captured audio to the central facility are reduced.

In example methods, apparatus, and articles of manufacture disclosed herein, the example home access point may, in some examples, aggregate and/or filter monitoring information transmitted to the central facility. In some examples, multiple fixed devices 130 may be present in the media presentation location 120. Each such fixed device 130 may attempt to transmit information to the central facility 170. However, this amount of data may be unnecessary as, for example, another fixed device 130 may have already recently reported the information (e.g., the public IP address). Reducing (e.g., eliminating) redundant transmission of data by, for example transmitting the information in one compressed transmission, as compared to many separate uncompressed transmissions, increases bandwidth efficiency. In some examples, the example home access point 122 aggregates and/or filters information as it is transmitted to the central facility 170. For example, if the fixed device were implemented as an Internet enabled motion sensor (e.g., a motion sensor as part of a home security system), the example fixed device does not need to report every movement detected, but only higher-level events like "a person entered the house." The example home access point, in some examples, compares data transmitted from different fixed devices in the media presentation location such as smartphones, connected cars, and/or other sensors such as a garage door opener. This distributed approach to data collection and aggregation using the Internet of Things (IoT) capabilities of in home electronics results in an overall reduction (e.g., elimination) of redundant information that is transmitted to the central facility, thereby reducing the processing requirements of the central facility 170 and the bandwidth requirements of the home access point 122.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of identifying a demographic segment associated with a fixed device, the method comprising:
accessing a record indicating a public Internet Protocol (IP) address used by the fixed device;
accessing monitoring data records received from a mobile device;
determining, with a processor, a demographic segment of a user of the mobile device;
associating, with the processor, the mobile device with the fixed device when an IP address of the mobile device from at least one of the monitoring data records matches the public IP address used by the fixed device;
separating the monitoring data records into corresponding time blocks based on timestamps associated with respective ones of the monitoring data records;
identifying at least one of a first monitoring data record or a second monitoring data record within a selected time block of the corresponding time blocks;
determining a baseline probability that the user was present at the fixed device during the selected time block based on the demographic segment of the user of the mobile device;
in response to the first monitoring data record received from the mobile device within the selected time block having an IP address that does not match the public IP address of the fixed device, negatively biasing the baseline probability that the user of the mobile device was present at the fixed device during the selected time block;
in response to the second monitoring data record received from the mobile device within the selected time block having an IP address that matches the public IP address of the fixed device, positively biasing the baseline probability that the user of the mobile device was present at the fixed device during the selected time block; and
preparing a report based on the biased baseline probability, the report indicating the probability that the demographic segment will be present at the fixed device during the selected time block.

2. The method as defined in claim 1, further including comparing a first audio sample associated with the fixed device at approximately a first time to a second audio sample associated with the mobile device at approximately the first time, the first time within a first time block, and wherein the determination of the probability that the user was present at the fixed device during the first time block is further based on whether the first audio sample matches the second audio sample.

3. The method as defined in claim 1, further including analyzing a result of a scan of a local area network performed by the fixed device during a first time block, and wherein the determination of the probability that the user was present at the fixed device during the first time block is further based on whether the mobile device is detected within the result of the scan of the local area network.

4. The method as defined in claim 3, wherein the scan of the local area network is a port scan.

5. The method as described in claim 1, further including estimating the demographic segment by:
  comparing the monitoring data records to media habits of users having a known demographic; and
  selecting a demographic segment that exhibits media habits matching those of the monitoring data records.

6. The method as described in claim 1, further including associating the mobile device with the fixed device by determining whether the mobile device exhibits a threshold pattern of usage of the public IP address of the fixed device.

7. The method as described in claim 6, wherein the threshold pattern of usage is a frequency of at least once a week.

8. The method as described in claim 1, further including determining the demographic segment of the user of the mobile device by requesting the demographic segment of the user from a database proprietor.

9. An apparatus comprising:
  a monitoring data processor to access a record indicating a public Internet Protocol (IP) address used by a fixed device, the monitoring data processor to access a monitoring data records received from a mobile device, the monitoring data processor to associate the mobile device with the fixed device when an IP address of the mobile device from at least one of the monitoring data records matches the public IP address used by the fixed device;
  a demographic segment estimator to estimate a demographic segment of a user of the mobile device, the demographic segment estimator to impute the demographic segment of the user of the mobile device to the fixed device based on the association of the mobile device and the fixed device;
  a probability estimator to:
    separate the monitoring data records into corresponding time blocks based on timestamps associated with respective ones of the monitoring data records;
    identify at least one of a first monitoring data record or a second monitoring data record within a selected time block of the corresponding time blocks;
    determine a baseline probability that the user was present at the fixed device during the selected time block based the demographic segment of the user of the mobile device;
    in response to the first monitoring data record received from the mobile device within the selected time block having an IP address that does not match the public IP address of the fixed device, negatively bias the probability that the user was present at the fixed device during the selected time block; and
    in response to the second monitoring data record received from the mobile device within the selected time block having an IP address that matches the public IP address of the fixed device, positively biasing the baseline probability that the user of the mobile device was present at the fixed device during the selected time block; and
  a reporter to prepare a report based on the biased baseline probability, the report indicating the probability that the demographic segment will be present at the fixed device during the selected time block.

10. The apparatus as described in claim 9, wherein the fixed device is an Internet of Things device.

11. The apparatus as described in claim 9, wherein the fixed device is a connected television.

12. The apparatus as described in claim 9, further including a geographic region determiner to determine a geographic region of the fixed device by performing a lookup using the public IP address of the fixed device.

13. The apparatus as described in claim 9, wherein the monitoring data processor is further to associate the mobile device with the fixed device when the IP address of the mobile device exhibits a pattern of matching the public IP address used by the fixed device.

14. The apparatus as described in claim 9, wherein the demographic segment estimator is to estimate the demographic segment of the user of the mobile device by requesting demographic information of the user of the mobile device from a database proprietor.

15. A tangible computer readable storage medium comprising instructions which, when executed, cause a machine to at least:
  access a record indicating a public Internet Protocol (IP) address used by a fixed device;
  access monitoring data records received from a mobile device;
  determine a demographic segment of a user of the mobile device;
  associate the mobile device with the fixed device when an IP address of the mobile device from at least one of the monitoring data records matches the public IP address used by the fixed device;
  separate the monitoring data records into corresponding time blocks based on timestamps associated with respective ones of the monitoring data records;
  identify at least one of a first monitoring data record or a second monitoring data record within a selected time block of the corresponding time blocks;
  determine a baseline probability that the user was present at the fixed device during the selected time block based on the demographic segment of the user of the mobile device;
  in response to the first monitoring data record received from the mobile device within the selected time block having an IP address that does not match the public IP address of the fixed device, negatively bias the baseline probability that the user was present at the fixed device during the selected time block;
  in response to the second monitoring data record received from the mobile device within the selected time block having an IP address that matches the public IP address of the fixed device, positively bias the baseline probability that the user of the mobile device was present at the fixed device during the selected time block; and
  prepare a report based on the biased baseline probability, the report indicating the probability that the demographic segment will be present at the fixed device during the selected time block.

16. The tangible computer readable storage medium as described in claim 15, wherein the instructions, when executed, cause the machine to compare a first audio sample received from the fixed device in association with a first time to a second audio sample received from the fixed device in association with the first time, the first time within a first time block, and wherein the determination of whether the demographic segment was present at the fixed device during the first time block is further based on whether the first audio sample matches the second audio sample.

17. The tangible computer readable storage medium as described in claim 15, wherein the instructions cause the machine to analyze a result of a scan of a local area network performed by the fixed device during a first time block, and wherein the determination of the probability that the user was present at the fixed device during the first time block is further based on whether the mobile device is detected within the result of the scan of the local area network.

18. The tangible computer readable storage medium as described in claim 17, wherein the scan of the local area network is a port scan.

19. The tangible computer readable storage medium as described in claim 15, wherein the instructions, when executed, cause the machine to at least:
   compare the monitoring data records to media habits of users having a known demographic; and
   select a demographic segment that exhibits media habits matching those of the monitoring data records.

20. The tangible computer readable storage medium as described in claim 15, wherein the instructions, when executed, cause the machine to at least associate the mobile device with the fixed device by determining whether the mobile device exhibits a threshold pattern of usage of the public IP address of the fixed device.

21. The tangible computer readable storage medium as described in claim 20, wherein the threshold pattern of usage is a frequency of at least once a week.

22. The tangible computer readable storage medium as described in claim 15, wherein the instructions, when executed, cause the machine to determine the demographic segment of the user of the mobile device by requesting the demographic segment of the user from a database proprietor.

* * * * *